(12) United States Patent  (10) Patent No.: US 12,445,583 B2
Ju et al.  (45) Date of Patent: Oct. 14, 2025

(54) ELECTRONIC APPARATUS AND CONTROLLING METHOD THEREOF

(71) Applicant: SAMSUNG ELECTRONICS CO., LTD., Suwon-si (KR)

(72) Inventors: Indon Ju, Suwon-si (KR); Donghee Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 162 days.

(21) Appl. No.: 18/220,631

(22) Filed: Jul. 11, 2023

(65) Prior Publication Data

US 2024/0073387 A1 Feb. 29, 2024

Related U.S. Application Data

(63) Continuation of application No. PCT/KR2023/007734, filed on Jun. 7, 2023.

(30) Foreign Application Priority Data

Aug. 24, 2022 (KR) .......................... 10-2022-0106335

(51) Int. Cl.
*H04N 9/31* (2006.01)
*G06F 3/01* (2006.01)

(52) U.S. Cl.
CPC .......... *H04N 9/3194* (2013.01); *G06F 3/017* (2013.01); *H04N 9/3185* (2013.01); *H04N 9/3188* (2013.01)

(58) Field of Classification Search
CPC ...... G06F 3/01; H04N 9/3141; H04N 9/3185; H04N 9/3188; H04N 9/3194
See application file for complete search history.

(56) References Cited

U.S. PATENT DOCUMENTS 5,144,425 A * 9/1992 Joseph ................... H04N 19/15
375/E7.091
6,263,022 B1 * 7/2001 Chen .................... H04N 19/126
375/240.03

(Continued)

FOREIGN PATENT DOCUMENTS

CN 109807881 A 5/2019
CN 114029952 A 2/2022

(Continued)

OTHER PUBLICATIONS

International Search Report (PCT/ISA/210) issued Sep. 20, 2023 by International Searching Authority in corresponding International Application No. PCT/KR2023/007734.

(Continued)

*Primary Examiner* — Michael B. Pierorazio
(74) *Attorney, Agent, or Firm* — Sughrue Mion, PLLC

(57) ABSTRACT

The electronic apparatus includes sensor circuitry to obtain sensing data; projection circuitry; and at least one processor configured to, based on a preset gesture of a user being identified based on the sensing data, identify a first position corresponding to a first part of the user and a second position corresponding to a second part of the user, the first position and the second position indicating the preset gesture, obtain direction information corresponding to the preset gesture based on the first position and the second position, obtain a projection position corresponding to the preset gesture based on a position of a projection surface and the direction information, and control the projection to project a projection image based on the projection position.

20 Claims, 42 Drawing Sheets

(56) References Cited

U.S. PATENT DOCUMENTS

| | | | | |
|---|---|---|---|---|
| 6,490,705 B1* | 12/2002 | Boyce | H04N 19/66 | 714/776 |
| 6,496,217 B1* | 12/2002 | Piotrowski | H04N 19/89 | 375/E7.005 |
| 6,501,797 B1* | 12/2002 | van der Schaar | H04N 19/34 | 708/203 |
| 6,674,477 B1* | 1/2004 | Yamaguchi | H04N 19/50 | 375/E7.113 |
| 7,095,782 B1* | 8/2006 | Cohen | H04N 21/2404 | 375/E7.02 |
| 7,958,532 B2* | 6/2011 | Paul | H04N 21/234327 | 725/135 |
| 8,064,389 B2* | 11/2011 | Khan | H04B 7/022 | 375/240 |
| 8,072,943 B2* | 12/2011 | Khan | H04L 1/0625 | 370/335 |
| 8,284,845 B1* | 10/2012 | Kovacevic | H04N 21/4345 | 375/240 |
| 8,467,656 B2* | 6/2013 | Kamio | G11B 27/105 | 386/200 |
| 8,904,445 B2* | 12/2014 | Britt | H04N 21/4583 | 725/54 |
| 9,848,217 B2* | 12/2017 | Choi | H04N 21/234327 | |
| 9,986,302 B2* | 5/2018 | Takahashi | H04L 69/16 | |
| 10,397,642 B2* | 8/2019 | Tsukagoshi | H04N 21/438 | |
| 10,595,066 B2* | 3/2020 | Czelhan | H04N 21/23439 | |
| 10,893,245 B1 | 1/2021 | Choi et al. | | |
| 11,687,976 B2* | 6/2023 | Publicover | H04L 67/306 | 725/35 |
| 11,711,573 B1* | 7/2023 | Wang | H04N 21/472 | 725/86 |
| 2002/0051095 A1* | 5/2002 | Su | H04N 9/3194 | 348/745 |
| 2002/0122161 A1* | 9/2002 | Nishida | H04N 9/3194 | 353/70 |
| 2003/0210381 A1* | 11/2003 | Itaki | H04N 5/74 | 353/70 |
| 2004/0208239 A1* | 10/2004 | Karlsson | H04K 3/82 | 375/219 |
| 2005/0237492 A1* | 10/2005 | Shinozaki | H04N 9/3185 | 353/69 |
| 2007/0179948 A1* | 8/2007 | Jennings, III | H04L 67/1068 | |
| 2007/0285626 A1* | 12/2007 | Miyasaka | G03B 21/206 | 353/85 |
| 2008/0062168 A1* | 3/2008 | Poullier | H04N 1/00132 | 345/419 |
| 2008/0120645 A1* | 5/2008 | Yun | H04N 21/426 | 725/33 |
| 2008/0170630 A1* | 7/2008 | Falik | H04L 47/26 | 375/E7.193 |
| 2009/0034629 A1* | 2/2009 | Suh | H04N 21/41407 | 375/240.27 |
| 2009/0187960 A1* | 7/2009 | Lee | H04N 21/234327 | 375/E7.078 |
| 2009/0222855 A1* | 9/2009 | Vare | H04L 12/189 | 725/39 |
| 2009/0268806 A1* | 10/2009 | Kim | H04N 21/84 | 375/316 |
| 2009/0278999 A1* | 11/2009 | Ofune | H04N 21/47 | 348/E3.048 |
| 2010/0002123 A1* | 1/2010 | Nozaki | H04N 23/00 | 348/E5.022 |
| 2010/0045942 A1* | 2/2010 | Furui | H04N 9/3194 | 353/69 |
| 2010/0254370 A1* | 10/2010 | Jana | H04N 21/437 | 725/116 |
| 2010/0260254 A1* | 10/2010 | Kimmich | H04N 19/164 | 375/240 |
| 2010/0260268 A1* | 10/2010 | Cowan | H04N 13/178 | 348/E13.001 |
| 2011/0002397 A1* | 1/2011 | Wang | H04N 19/30 | 375/240.26 |
| 2011/0096828 A1* | 4/2011 | Chen | H04N 21/440227 | 375/E7.126 |
| 2011/0164683 A1* | 7/2011 | Takahashi | H04N 19/31 | 375/E7.123 |
| 2011/0187503 A1* | 8/2011 | Costa | H05K 7/1498 | 340/8.1 |
| 2011/0210979 A1* | 9/2011 | Furui | G03B 37/04 | 345/619 |
| 2011/0234994 A1* | 9/2011 | Uchiyama | H04N 9/3185 | 353/121 |
| 2011/0239078 A1* | 9/2011 | Luby | H04N 21/23106 | 714/752 |
| 2011/0267265 A1 | 11/2011 | Stinson | | |
| 2011/0285971 A1* | 11/2011 | Oka | H04N 9/3185 | 353/70 |
| 2011/0289542 A1* | 11/2011 | Kitazato | H04H 20/40 | 725/115 |
| 2012/0117592 A1* | 5/2012 | Strein | H04N 21/2355 | 725/32 |
| 2012/0185907 A1* | 7/2012 | Park | H04N 21/242 | 725/110 |
| 2012/0224651 A1* | 9/2012 | Murakami | H04L 25/03898 | 375/295 |
| 2012/0250619 A1* | 10/2012 | Twitchell, Jr. | H04W 40/28 | 370/328 |
| 2012/0320168 A1* | 12/2012 | Yun | H04N 21/4347 | 348/51 |
| 2013/0136193 A1* | 5/2013 | Hwang | H04L 65/80 | 714/776 |
| 2013/0247094 A1* | 9/2013 | Hardin | H04N 21/2385 | 725/33 |
| 2013/0305304 A1* | 11/2013 | Hwang | H04N 21/2381 | 725/109 |
| 2014/0050458 A1* | 2/2014 | Mochinaga | H04N 5/85 | 386/239 |
| 2014/0098289 A1* | 4/2014 | Jang | H04N 21/440263 | 348/441 |
| 2014/0115472 A1* | 4/2014 | Mochinaga | H04N 9/8205 | 715/719 |
| 2014/0119712 A1* | 5/2014 | Jang | G11B 27/105 | 386/248 |
| 2014/0204177 A1* | 7/2014 | Hattori | H04N 21/235 | 348/43 |
| 2014/0211861 A1* | 7/2014 | Lee | H04N 19/89 | 375/240.27 |
| 2014/0337892 A1* | 11/2014 | Phang | H04N 21/47217 | 725/52 |
| 2015/0020131 A1* | 1/2015 | Choi | H04N 21/234327 | 725/116 |
| 2015/0371604 A1* | 12/2015 | Park | H04N 21/4122 | 345/173 |
| 2016/0037193 A1* | 2/2016 | Kasatani | H04N 21/234309 | 725/110 |
| 2016/0277778 A1* | 9/2016 | Kwon | H04N 21/615 | |
| 2016/0373821 A1* | 12/2016 | Nair | H04N 21/26258 | |
| 2017/0111692 A1* | 4/2017 | An | H04N 21/4622 | |
| 2017/0164033 A1* | 6/2017 | Tsukagoshi | H04N 21/4545 | |
| 2017/0188112 A1* | 6/2017 | Takahashi | H04L 12/5601 | |
| 2017/0238061 A1* | 8/2017 | Deshpande | H04N 21/4382 | 725/139 |
| 2017/0366830 A1* | 12/2017 | Czelhan | G10L 25/57 | |
| 2017/0374421 A1* | 12/2017 | Yim | H04N 21/4622 | |
| 2018/0146022 A1* | 5/2018 | Kwon | H04L 65/70 | |
| 2018/0270539 A1* | 9/2018 | Kim | H04W 4/06 | |
| 2020/0372712 A1 | 11/2020 | Yamagishi | | |
| 2020/0404232 A1 | 12/2020 | Choi et al. | | |
| 2022/0203248 A1 | 6/2022 | Rico et al. | | |
| 2023/0205803 A1* | 6/2023 | Frieder | G06V 40/172 | 709/204 |
| 2023/0283848 A1* | 9/2023 | Kocienda | H04N 21/2747 | 725/14 |
| 2023/0319341 A1* | 10/2023 | Li | H04N 21/4318 | 725/44 |

(56) References Cited

U.S. PATENT DOCUMENTS

FOREIGN PATENT DOCUMENTS

| | | |
|---|---|---|
| JP | 2005-062486 A | 3/2005 |
| KR | 10-1016805 B1 | 2/2011 |
| KR | 10-2015-0123062 A | 11/2015 |
| KR | 10-2019-0132885 A | 11/2019 |
| KR | 10-2020-0145642 A | 12/2020 |
| KR | 10-2336246 B1 | 12/2021 |
| KR | 10-2022-0094680 A | 7/2022 |

OTHER PUBLICATIONS

Written Opinion (PCT/ISA/237) issued Sep. 20, 2023 by International Searching Authority in corresponding International Application No. PCT/KR2023/007734.

* cited by examiner

FIG. 15
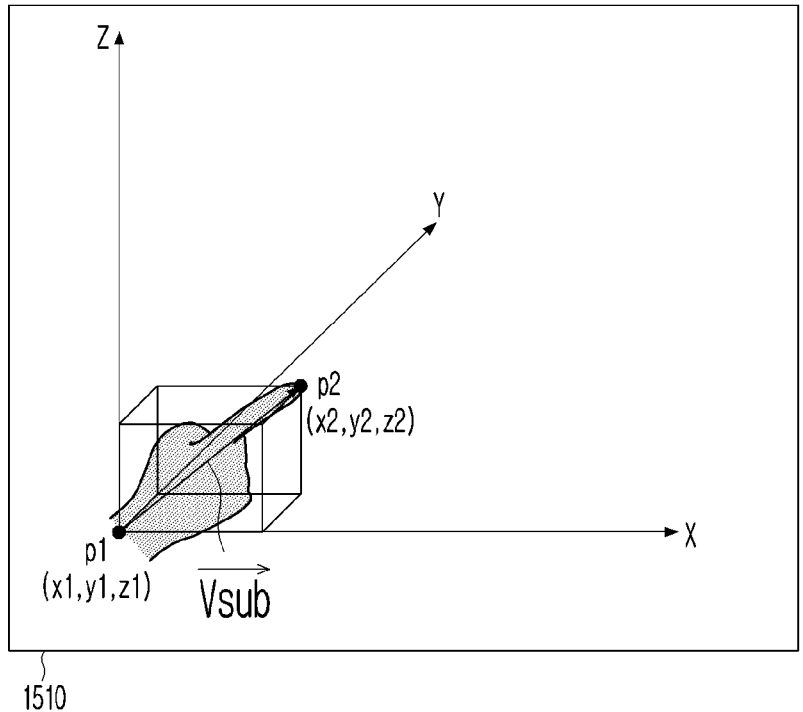
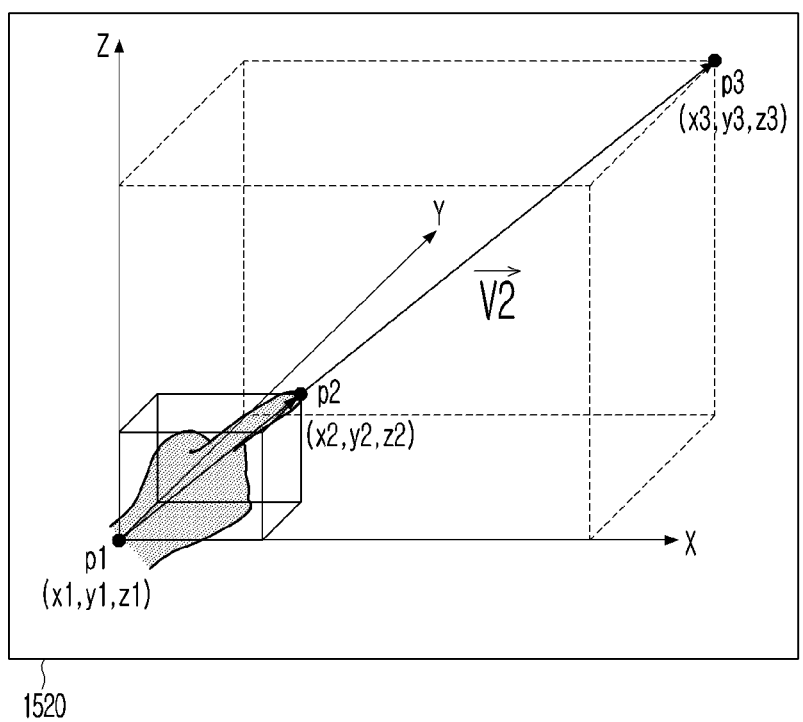

FIG. 16
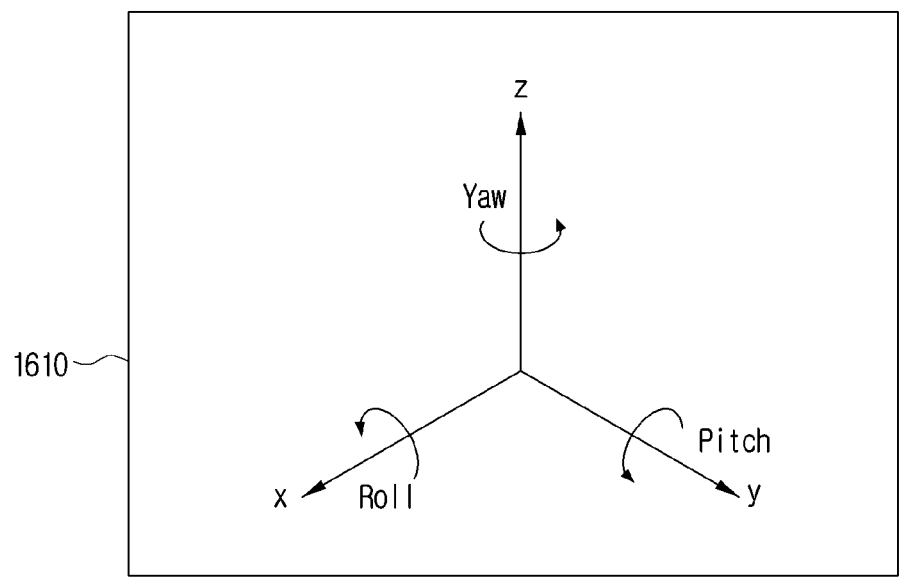
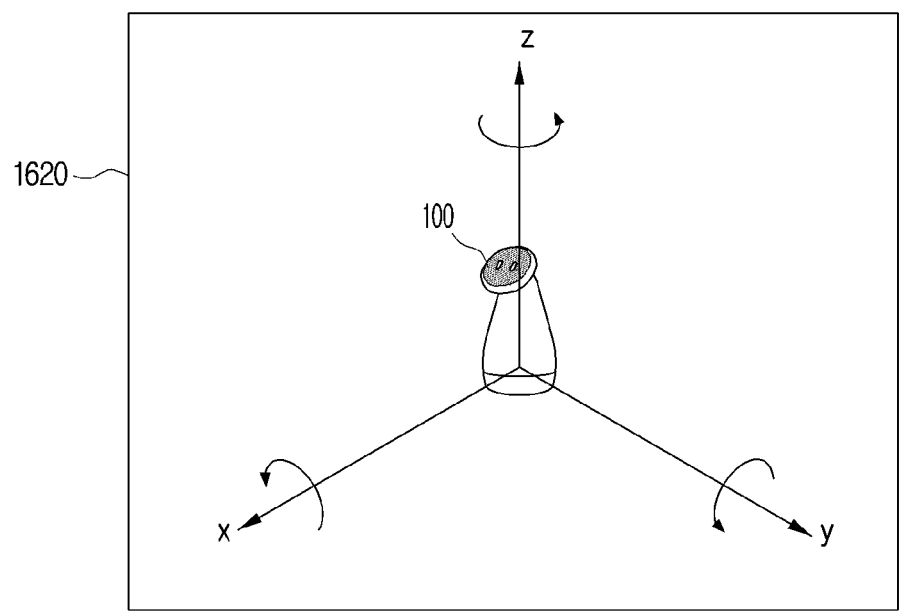

FIG. 18
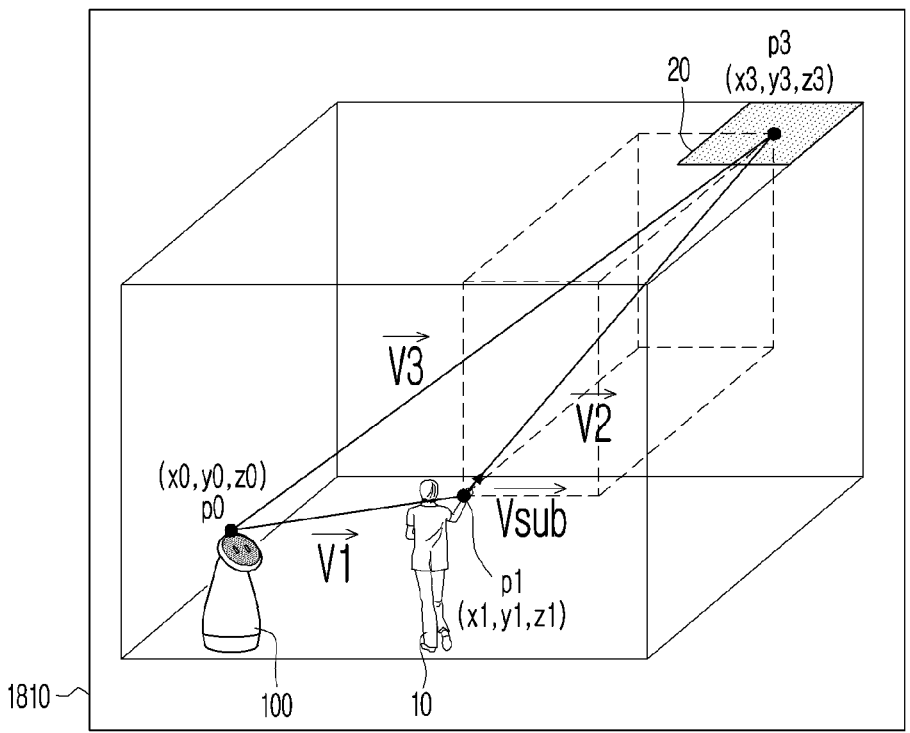
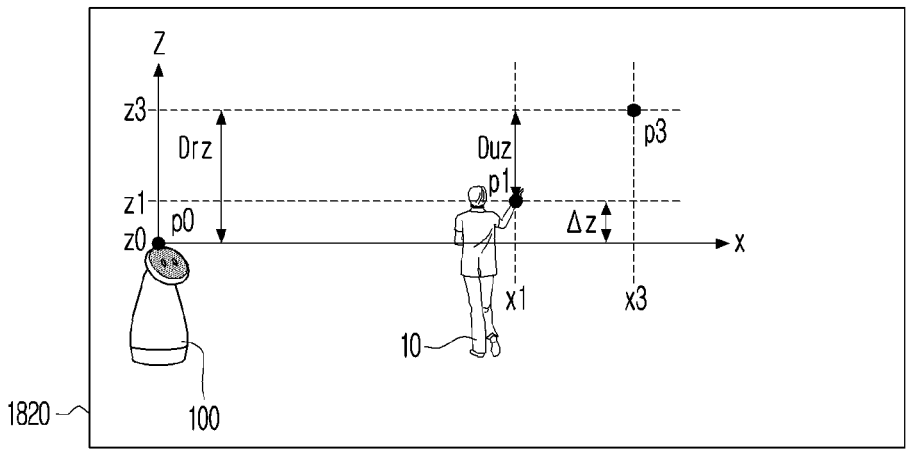
$Duz = Drz - \triangle z$
$Duz = Drz - z1$

FIG. 25
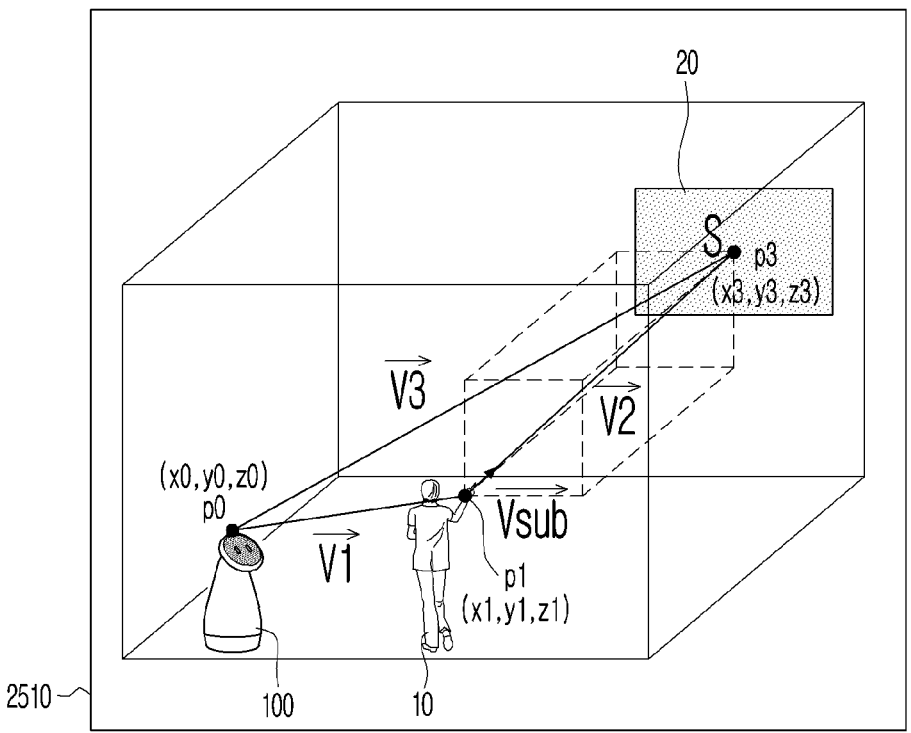
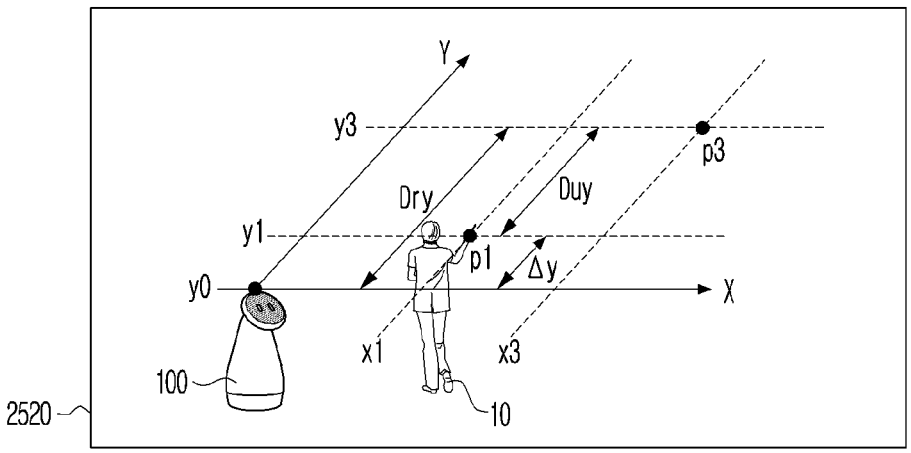

FIG. 26
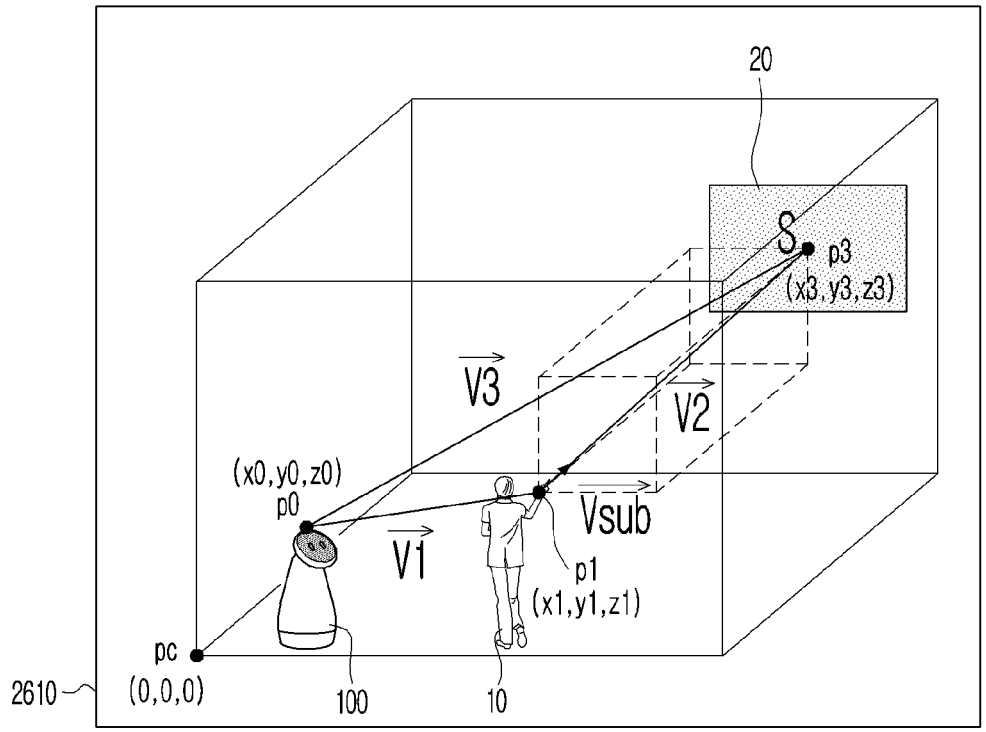
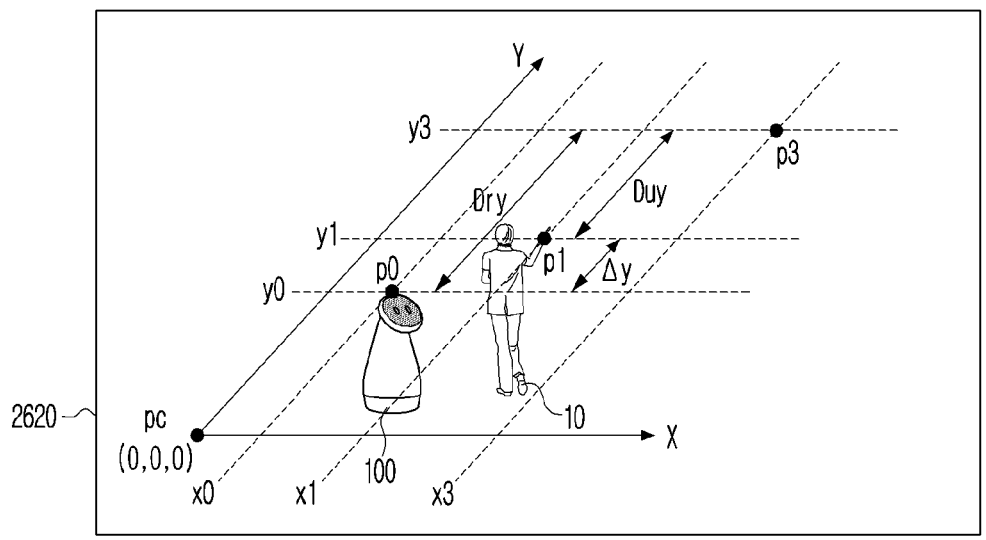

FIG. 28
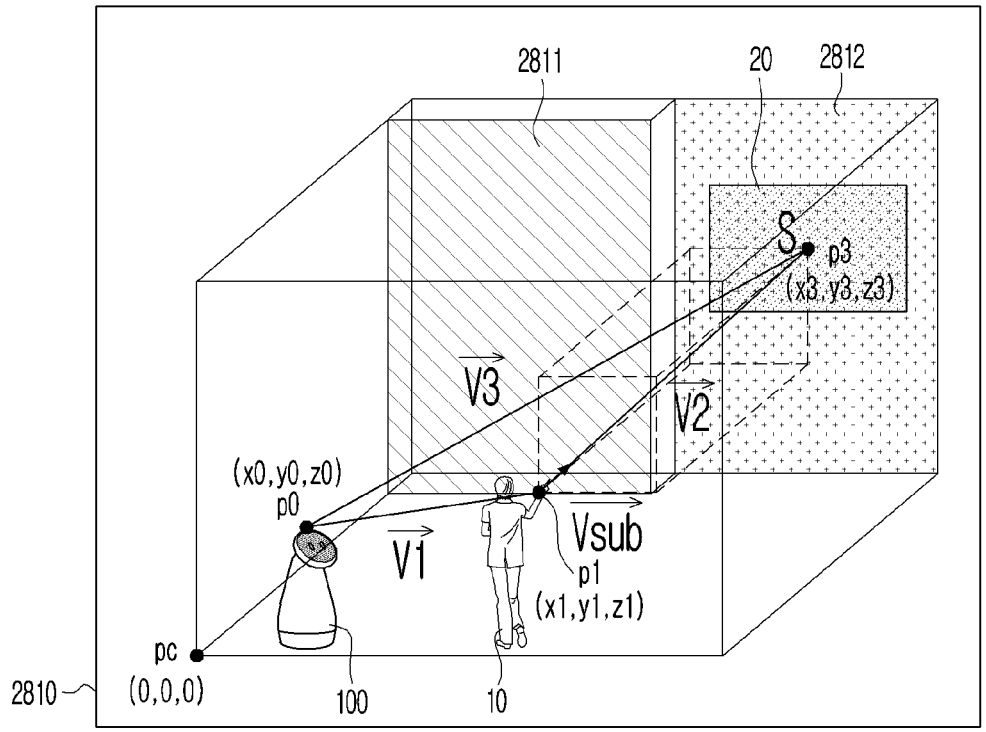
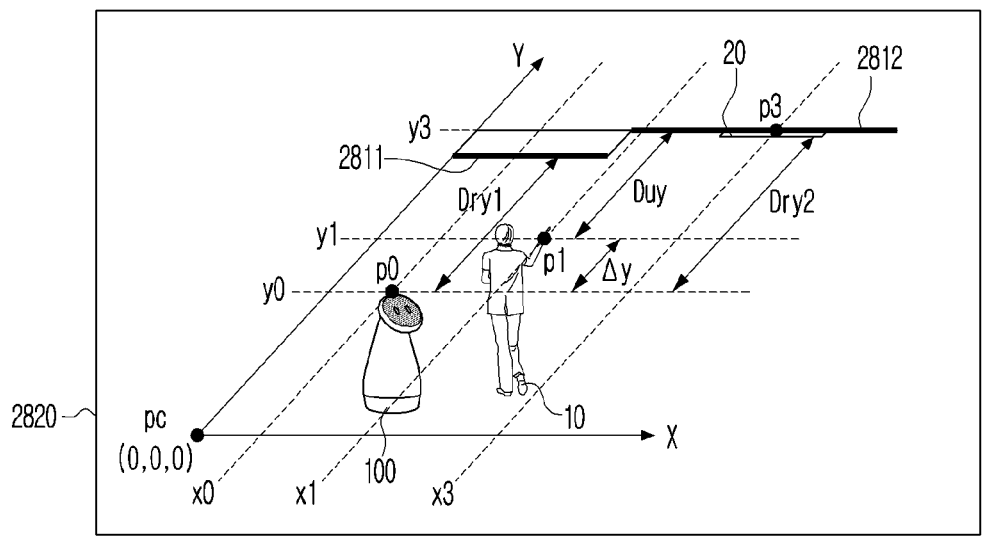

FIG. 31
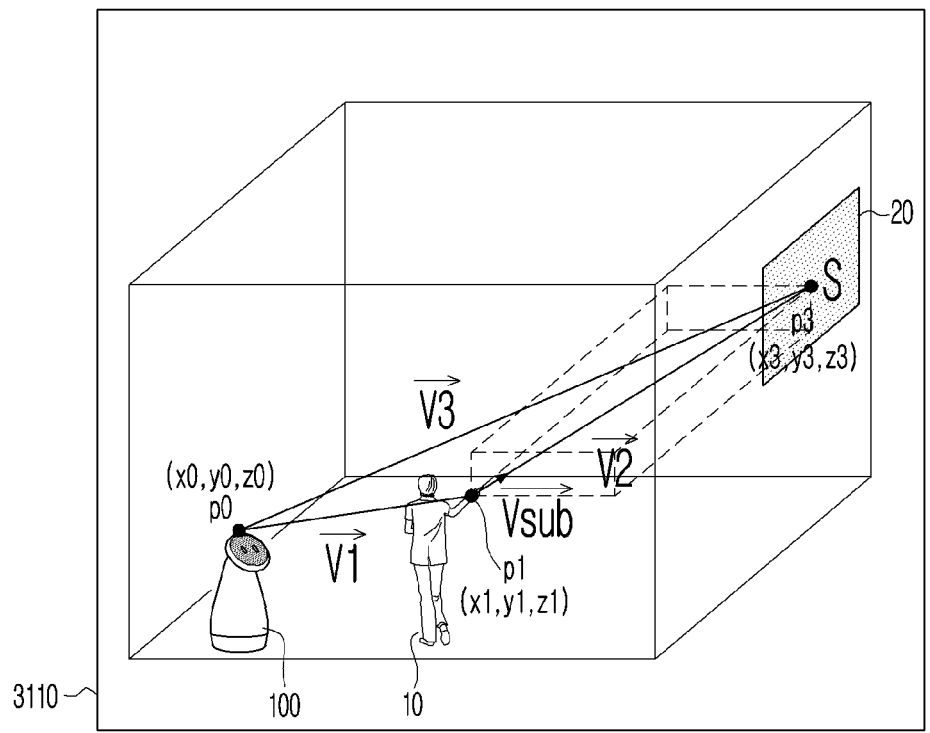
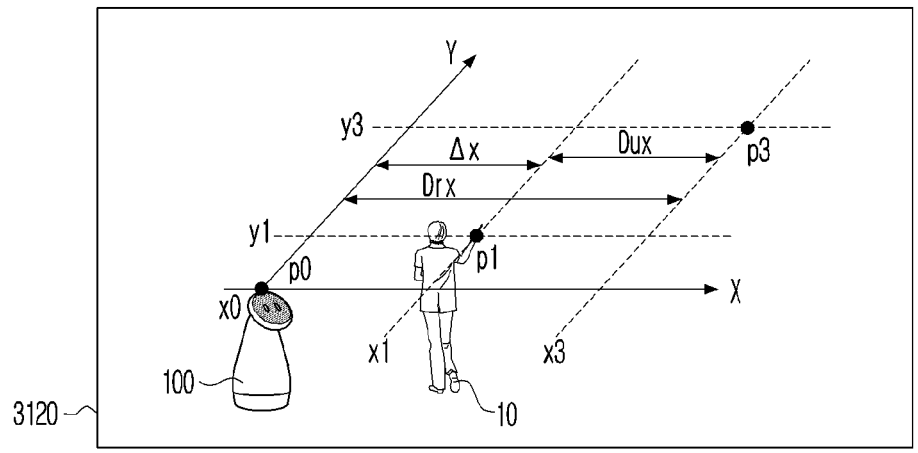

FIG. 32
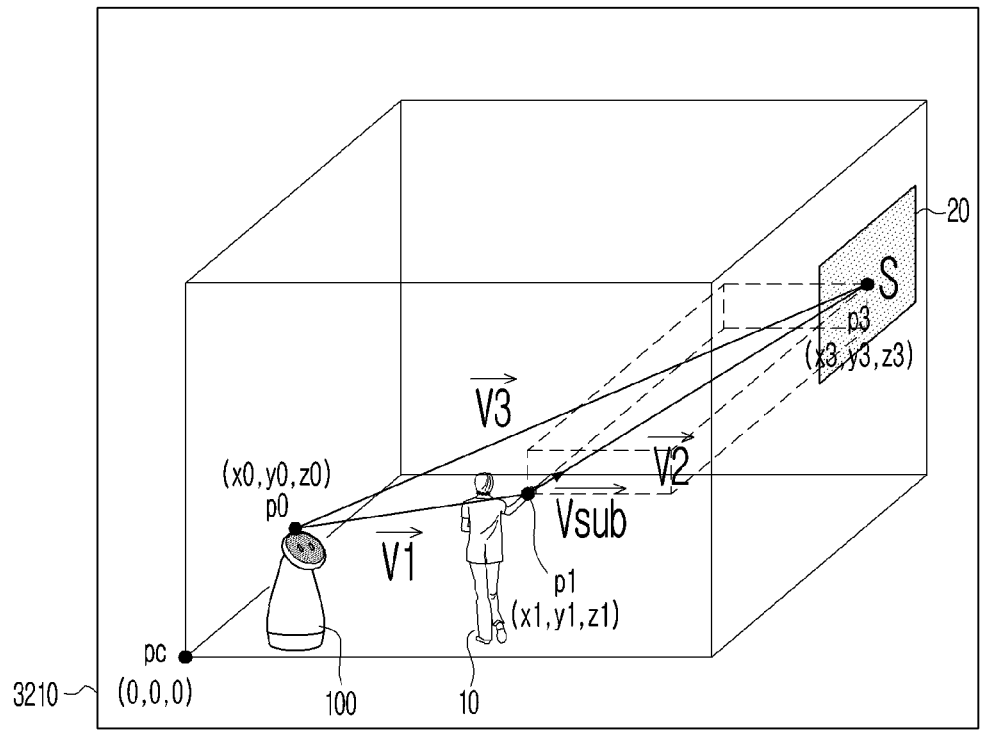
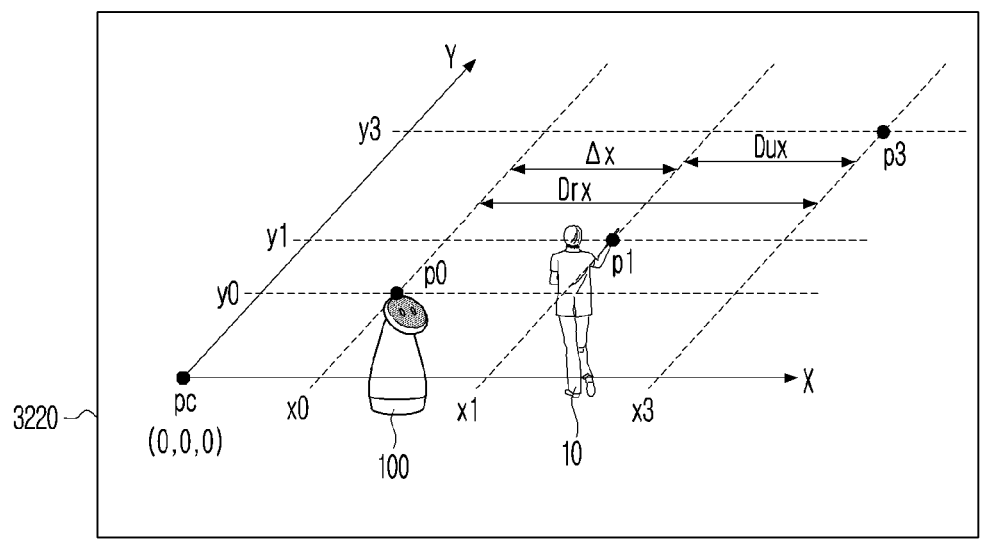
$Dux = Drx - \triangle x$
$Dux = Drx - (x1 - x0)$
$Dux = (Drx + x0) - x1$

FIG. 36
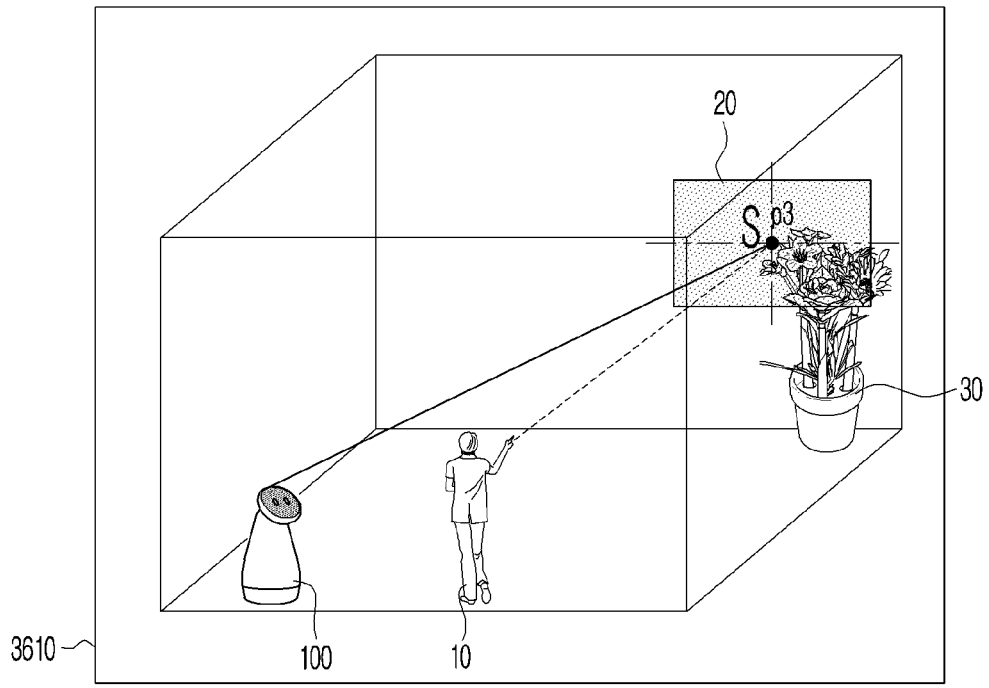
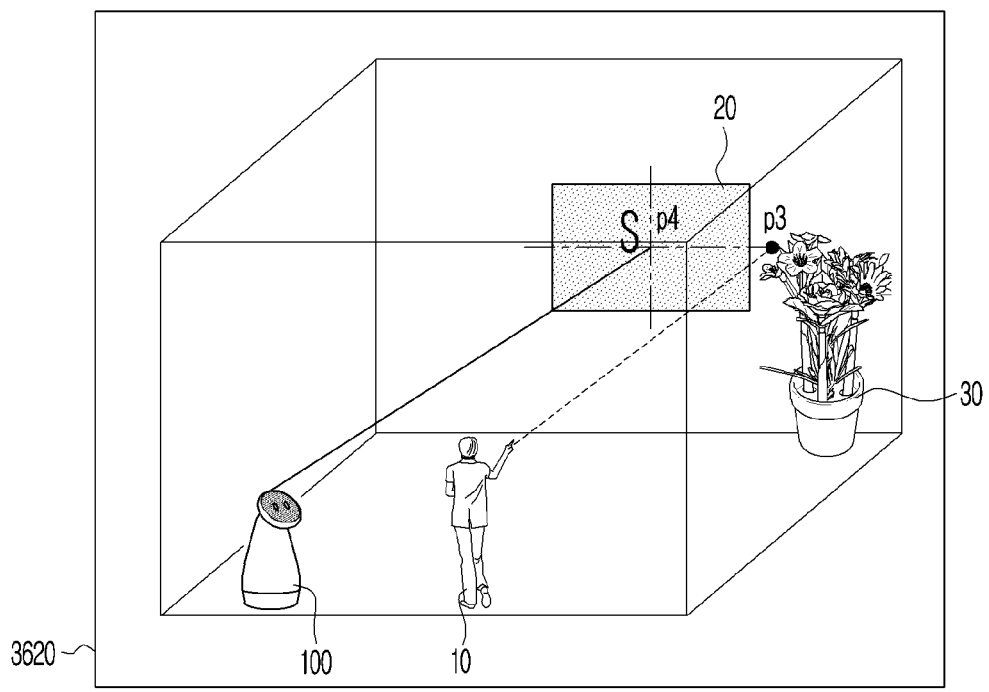

FIG. 37
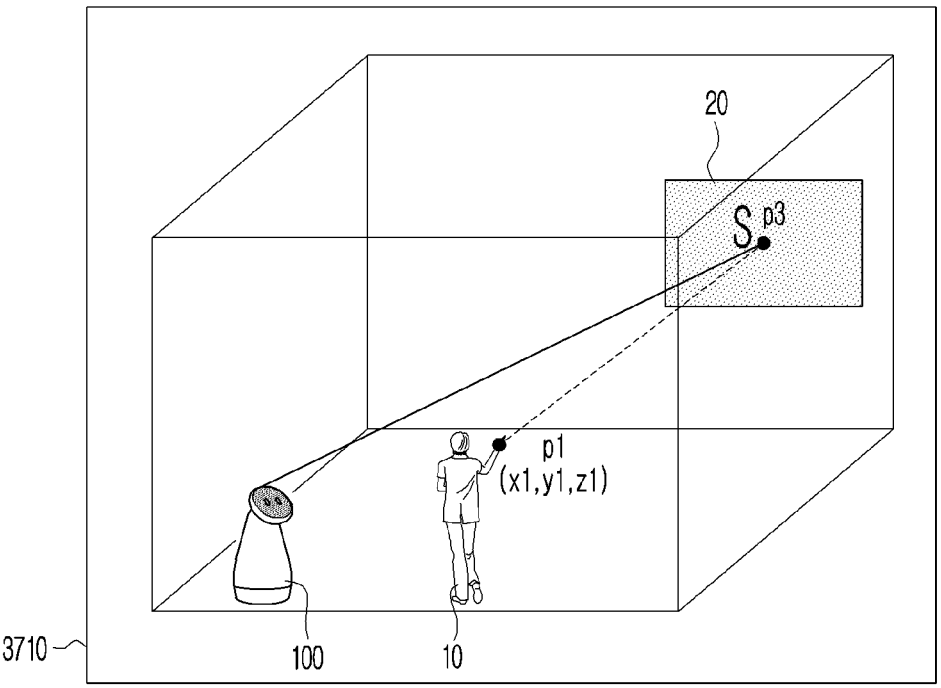
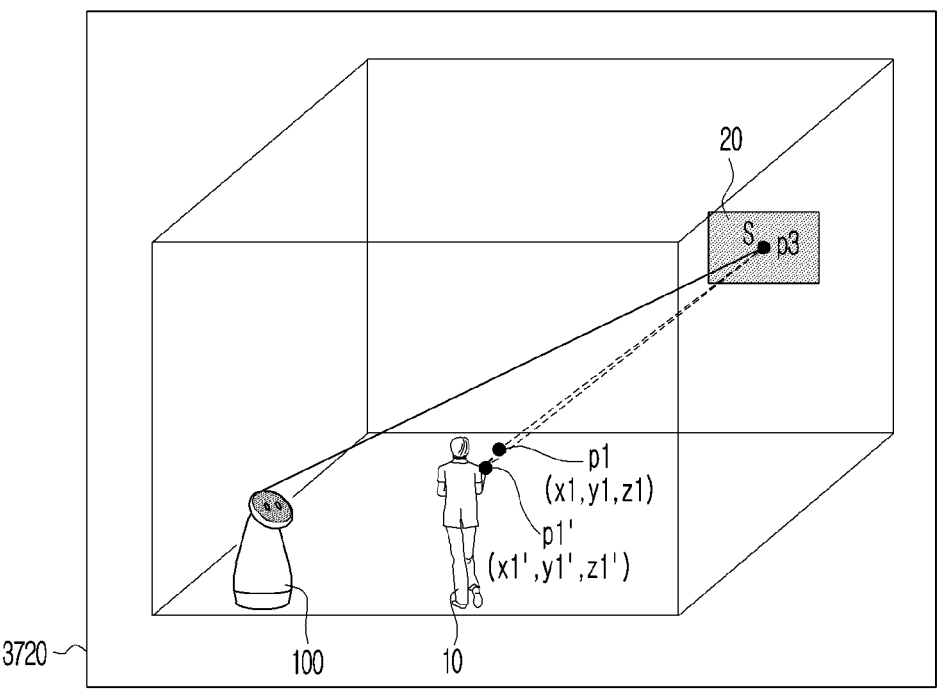

FIG. 38
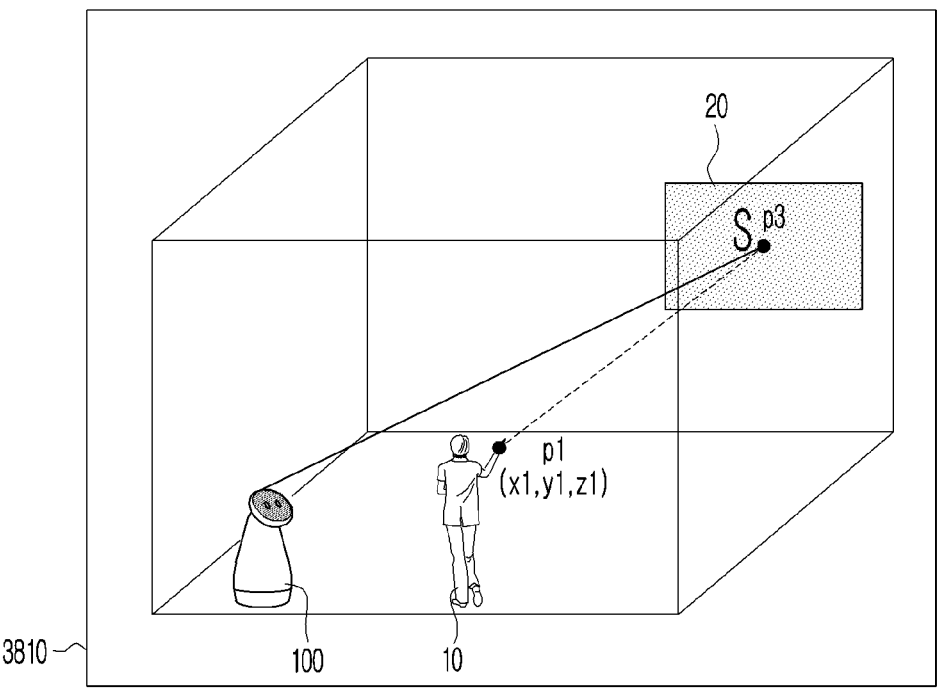
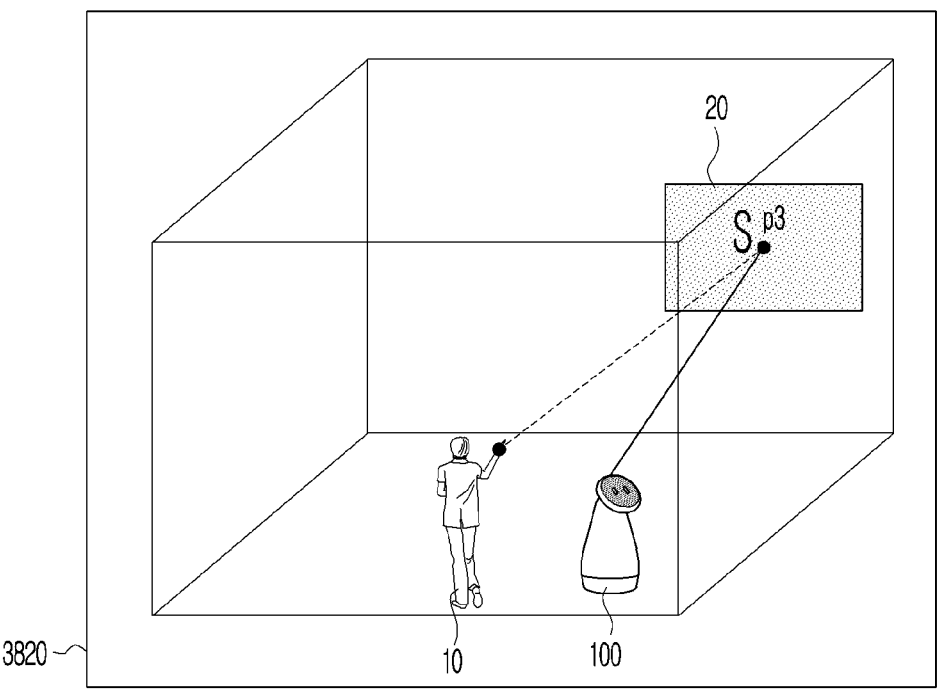

FIG. 39
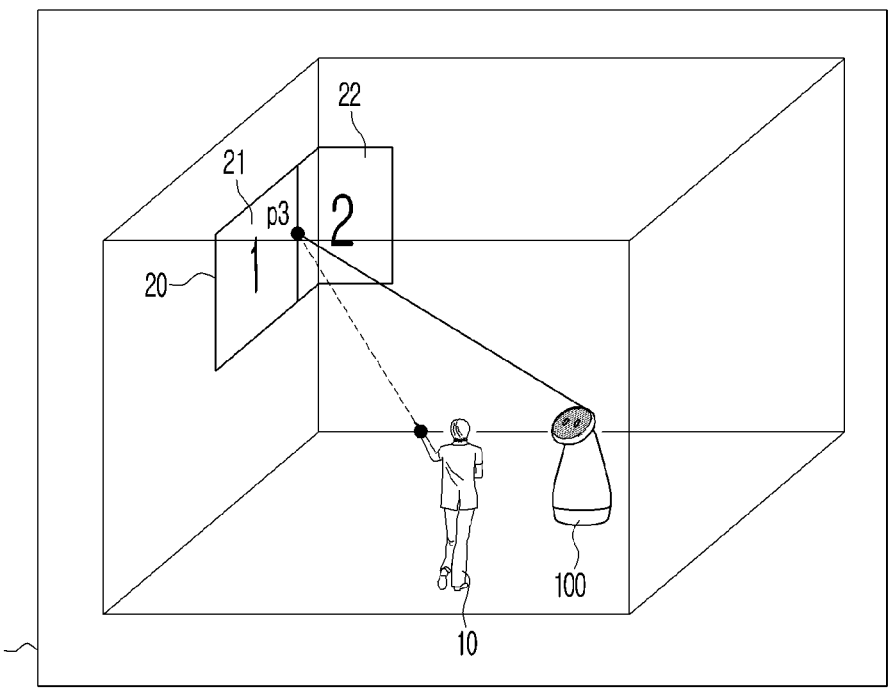
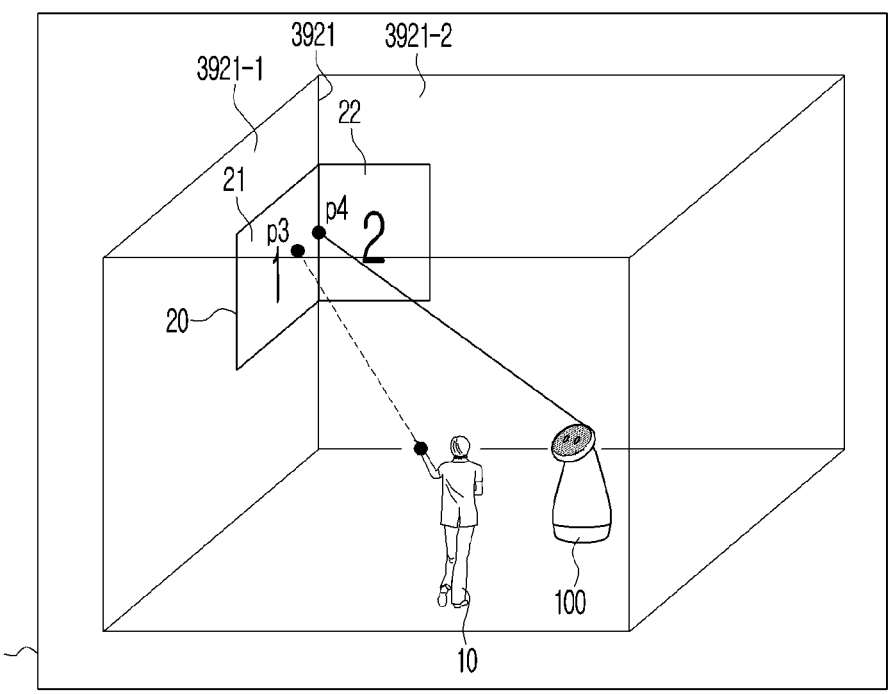

FIG. 40
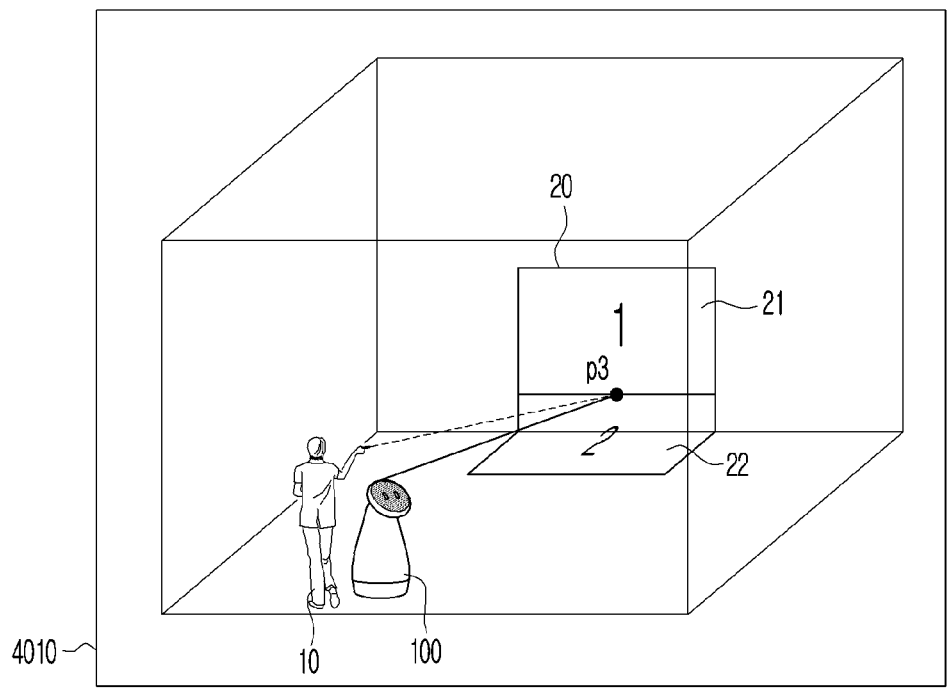
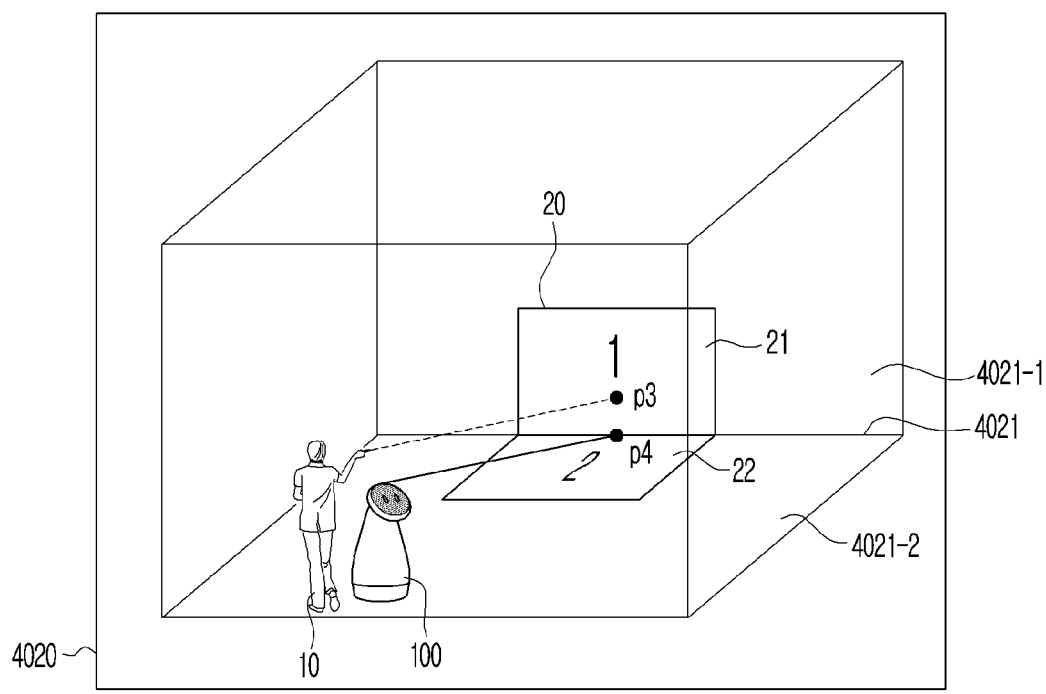

ELECTRONIC APPARATUS AND CONTROLLING METHOD THEREOF

CROSS-REFERENCE TO RELATED APPLICATION

This application is a bypass continuation of International Application No. PCT/KR2023/007734, filed on Jun. 7, 2023, which is based on and claims priority to Korean Patent Application No. 10-2022-0106335, filed on Aug. 24, 2022, in the Korean Intellectual Property Office, the disclosures of which are incorporated by reference herein in their entireties.

BACKGROUND

1. Field

The disclosure relates to an electronic apparatus and a controlling method thereof and, more specifically, to an electronic apparatus for projecting an image at a position indicated by a user, and a controlling method thereof.

2. Description of Related Art

A projection device (e.g., a projector) may project content designated by a user on a projection surface or projection screen in an image form. The projection device may project an image onto a projection surface according to a currently arranged position and a projection direction of a lens. An area of the entire projection surface, which an image is to be projected on, may be determined based on a projection ratio, an image size, a projection direction, or any other parameter known to one of ordinary skill in the art.

If the current projection area or projection direction is not satisfactory to a user, the user may manually manipulate the projection device. For example, a placement position of the projection device may be directly changed. However, manually adjusting the projection device may be inconvenient to the user.

Even when a projection device automatically searches for a projection area, there is a problem in that the processing time is too long or the automatically searched projection area is inaccurate.

SUMMARY

The disclosure is designed to improve the above-described problem, and the purpose of the disclosure is to provide an electronic apparatus and a control method thereof for recognizing a user's gesture, calculating a position corresponding to the user gesture, and projecting an image.

According to one or more embodiments, an electronic apparatus comprising: sensor circuitry to obtain sensing data; projection circuitry; and at least one processor configured to: based on a preset gesture of a user being identified based on the sensing data, identify a first position corresponding to a first part of the user and a second position corresponding to a second part of the user, the first position and the second position indicating the preset gesture, obtain direction information corresponding to the preset gesture based on the first position and the second position, obtain a projection position corresponding to the preset gesture based on a position of a projection surface and the direction information, and control the projection circuitry to project a projection image based on the projection position.

The first position may denote a start position of a direction indicated by the preset gesture, and the second position may denote an end position of a direction indicated by the preset gesture.

The at least one processor may identify the preset gesture based on image data included in the sensing data, and identify the position of the projection surface, the first position, and the second position based on distance data included in the sensing data.

The at least one processor may obtain a first vector representing a direction from a position of the electronic apparatus to the first position, obtain a first distance between the electronic apparatus and the projection surface based on a position of the electronic apparatus and a position of the projection surface, and obtain the projection position based on the first vector, the first distance, the first position, and the direction information.

The direction information may include a sub-vector, and the at least one processor may obtain a second distance between the first position and the projection surface based on the first distance and the first position, obtain the sub-vector corresponding to the preset gesture based on the first position and the second position, and obtain the projection position based on the first vector, the sub-vector, the first position, the second position, and the second distance.

The at least one processor may obtain an expansion ratio based on the first position, the second position, and the second distance, obtain a second vector indicating a direction from the first position to the projection position based on the sub-vector and the expansion ratio, and obtain the projection position based on the first vector and the second vector.

The projection position may be a first projection position, and the at least one processor may, based on the projection position being not included in a plane corresponding to the projection surface, update the first distance based on the position of the electronic apparatus, the position of the projection surface, and the first projection position, and obtain a second projection position based on the first vector, the re-obtained first distance, the first position, and the direction information.

The electronic apparatus may further include a microphone; and driving circuitry, and the at least one processor may, based on receiving a user voice including a preset user command through the microphone, identify a position of the user who uttered the user voice based on the sensing data, and control the driving circuitry to move the electronic apparatus based on the position of the user.

The at least one processor may, based on the first position and the second position not changing for a threshold time, control the projection circuitry to project the projection image based on the projection position.

The at least one processor may, based on receiving a user command for a multi-view function for projecting a merged image including first content and second content, identify an edge of the projection surface, based on the projection position being within a threshold distance from the edge, change the projection position to a position corresponding to the edge, and control the projection circuitry to project the merged image based on the changed projection position.

According to one or more embodiments, a method of controlling an electronic apparatus, the method comprising: based on a preset gesture of a user being identified based on the sensing data, identifying a first position corresponding to a first part of the user and a second position corresponding to a second part of the user, the first position and the second position indicating the preset gesture; obtaining direction information corresponding to the preset gesture based on the first position and the second position; obtaining a projection position corresponding to the preset gesture based on a position of a projection surface and the direction information; and projecting a projection image based on the projection position.

The first position may denote a start position of a direction indicated by the preset gesture, and the second position may denote an end position of a direction indicated by the preset gesture.

The identifying the first position and the second position may include identifying the preset gesture based on image data included in the sensing data, and identifying the position of the projection surface, the first position, and the second position based on distance data included in the sensing data.

The obtaining the projection position may include obtaining a first vector representing a direction from a position of the electronic apparatus to the first position, obtaining a first distance between the electronic apparatus and the projection surface based on a position of the electronic apparatus and a position of the projection surface, and obtaining the projection position based on the first vector, the first distance, the first position, and the direction information.

The direction information may include a sub-vector, and the obtaining the direction information may include obtaining a second distance between the first position and the projection surface based on the first distance and the first position, obtaining the sub-vector corresponding to the preset gesture based on the first position and the second position, and the obtaining the projection position may include obtaining the projection position based on the first vector, the sub-vector, the first position, the second position, and the second distance.

The obtaining the projection position may include obtaining an expansion ratio based on the first position, the second position, and the second distance, obtaining a second vector indicating a direction from the first position to the projection position based on the sub-vector and the expansion ratio, and obtaining the projection position based on the first vector and the second vector.

The projection position may be a first projection position, and the method may include, based on the projection position being not included in a plane corresponding to the projection surface, re-obtaining the first distance based on the position of the electronic apparatus, the position of the projection surface, and the first projection position, and obtaining a second projection position based on the first vector, the re-obtained first distance, the first position, and the direction information.

Based on receiving a user voice including a preset user command through the microphone, the method may further include identifying a position of the user who uttered the user voice based on the sensing data, and controlling to move the electronic apparatus based on the position of the user.

Based on the first position and the second position being not changed for a threshold time, the projecting the projection image may include projecting the projection image based on the projection position.

The projecting the projection image may include, based on receiving a user command for a multi-view function for projecting a merged image including first content and second content, identify an edge of the projection surface, based on the projection position being within a threshold distance from the edge, changing the projection position to a position corresponding to the edge, and projecting the merged image based on the changed projection position.

According to one or more embodiments, an electronic apparatus comprising: projection circuitry; at least one memory storing instructions; and at least one processor configured to execute the instructions to: identify a preset gesture of a user; identify, based on the identification of the preset gesture, a first position corresponding to a first part of the user and a second position corresponding to a second part of the user, the first position and the second position indicating the preset gesture, obtain direction information corresponding to the preset gesture based on the first position and the second position, obtain a projection position corresponding to the preset gesture based on a position of a projection surface and the direction information, and control the projection circuitry to project a projection image based on the projection position.

The first position denotes a start position of a direction indicated by the preset gesture, and wherein the second position denotes an end position of a direction indicated by the preset gesture.

The at least one processor is further configured to execute the instructions to: identify the preset gesture based on image data of the user, and identify the position of the projection surface, the first position, and the second position based on distance data.

The at least one processor is further configured to execute the instructions to: obtain a first vector representing a direction from a position of the electronic apparatus to the first position, obtain a first distance between the electronic apparatus and the projection surface based on a position of the electronic apparatus and a position of the projection surface, and obtain the projection position based on the first vector, the first distance, the first position, and the direction information.

The direction information comprises a sub-vector, wherein the at least one processor is further configured to execute the instructions to: obtain a second distance between the first position and the projection surface based on the first distance and the first position, obtain the sub-vector corresponding to the preset gesture based on the first position and the second position, and obtain the projection position based on the first vector, the sub-vector, the first position, the second position, and the second distance.

BRIEF DESCRIPTION OF THE DRAWINGS

FIG. 15 is a diagram for describing a process of calculating a projection position corresponding to a preset gesture according to various embodiments;

FIG. 16 is a diagram for describing a reference coordinate and a rotation angle related to an electronic apparatus according to various embodiments;

FIG. 18 is a diagram for describing an operation of calculating a projection position based on the position of an electronic apparatus when a projection surface is present in the z-axis direction, according to various embodiments;

FIG. 25 is a diagram for describing an operation of calculating a projection position based on the position of an electronic apparatus when a projection surface is present in the y-axis direction, according to various embodiments;

FIG. 26 is a diagram for describing an operation of calculating a projection position when a projection surface is present in a y-axis direction, according to various embodiments;

FIG. 28 is a diagram for describing an operation of calculating a projection position when a projection surface which is not flat in a y-axis direction exists, according to various embodiments;

FIG. 31 is a diagram for describing an operation of calculating a projection position based on the position of an electronic apparatus when a projection surface is present in the X-axis direction, according to various embodiments;

FIG. 32 is a diagram for describing an operation of calculating a projection position when a projection surface is present in an x-axis direction, according to various embodiments;

FIG. 36 is a diagram for describing an operation of changing a projection position when an obstacle object is identified according to various embodiments;

FIG. 37 is a diagram for describing an operation of changing the size of a projection image according to a gesture of a user according to various embodiments;

FIG. 38 is a diagram for describing an operation in which the electronic apparatus moves based on the projection position according to various embodiments;

FIG. 39 is a diagram for describing an operation of performing a multi-view function based on an edge, according to various embodiments;

FIG. 40 is a diagram for describing an operation of performing a multi-view function based on an edge, according to various embodiments;

DETAILED DESCRIPTION

The disclosure will be described in greater detail with reference to the attached drawings.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

Expressions such as "have," "may have," "include," "may include" or the like represent presence of corresponding numbers, functions, operations, or parts, and do not exclude the presence of additional features.

Expressions such as "at least one of A or B" and "at least one of A and B" should be understood to represent "A," "B" or "A and B."

As used herein, terms such as "first," and "second," may identify corresponding components, regardless of order and/or importance, and are used to distinguish a component from another without limiting the components.

In addition, a description that one element (e.g., a first element) is operatively or communicatively coupled with/to" or "connected to" another element (e.g., a second element) should be interpreted to include both the first element being directly coupled to the second element, and the first element being indirectly coupled to the second element through a third element.

A singular expression includes a plural expression, unless otherwise specified. It is to be understood that terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

A term such as "module," "unit," and "part," is used to refer to an element that performs at least one function or operation and that may be implemented as hardware or software, or a combination of hardware and software. Except when each of a plurality of "modules," "units," "parts," and the like may be realized in an individual hardware, the components may be integrated in at least one module or chip and be realized in at least one processor.

In the following description, a "user" may refer to a person using an electronic apparatus or an artificial intelligence electronic apparatus using an electronic apparatus (e.g., artificial intelligence electronic apparatus).

One or more embodiments of the disclosure will be described in more detail with reference to the accompanying drawings.

Figure 1:
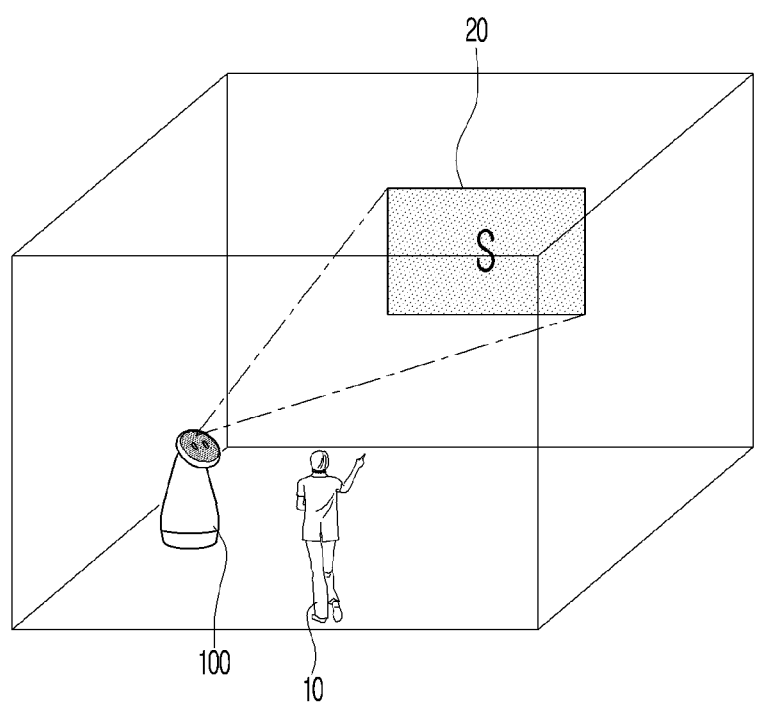
FIG. 1 is a diagram illustrating embodiment in which an electronic apparatus projects a projection image according to a gesture of a user according to various embodiments.

FIG. 1 is a diagram illustrating embodiment in which an electronic apparatus 100 projects a projection image 20 according to a gesture of a user 10.

Referring to FIG. 1, the electronic apparatus 100 may identify a projection area according to a preset gesture of a user 10. In one or more examples, the projection area may correspond to an area where a projection image 20 to be projected by the electronic apparatus 100 is projected. The projection area may be present on the projection surface. The projection surface may correspond to an entirety of a plane existing in a projection area where the projection image 20 is output. The projection surface may be a projection screen or a wall surface configured to display an image.

In one or more examples, the preset gesture may correspond to a gesture in which the user 10 indicates a specific direction. For example, the preset gesture may be a gesture that extends the arm and points a specific direction with the index finger. When the electronic apparatus 100 senses the appearance of the user 10 and the user 10 indicates a specific direction, the electronic apparatus 100 may project the projection image 20 in the corresponding direction.

Figure 2:
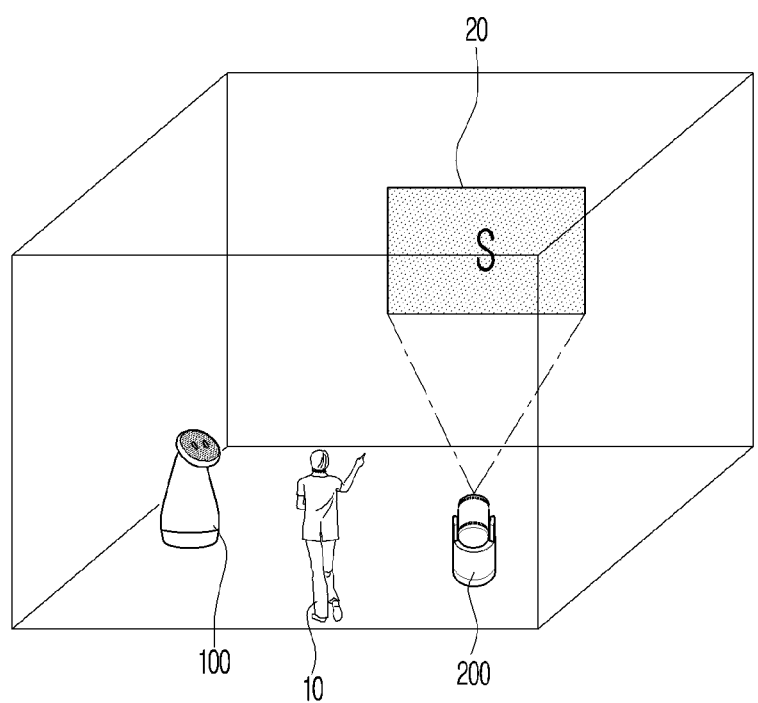
FIG. 2 is a diagram for describing one or more embodiments in which an electronic apparatus senses a user's gesture and an external device projects a projection image according to various embodiments.

FIG. 2 is a diagram for describing one or more embodiments in which the electronic apparatus 100 senses a user's gesture and the external device 200 projects the projection image 20.

In contrast to FIG. 1, the electronic apparatus 100 may identify whether the user 10 makes a preset gesture, and the actual projection image 20 may be output by the external device 200. In one or more examples, the electronic apparatus 100 may be a mobile service robot, and the external device 200 may correspond to a projector. The electronic apparatus 100 and the external device 200 may be connected with each other to separately perform respective functions.

When implemented as the embodiment of FIG. 2, the electronic apparatus 100 may not include the projection unit.

Figure 3:
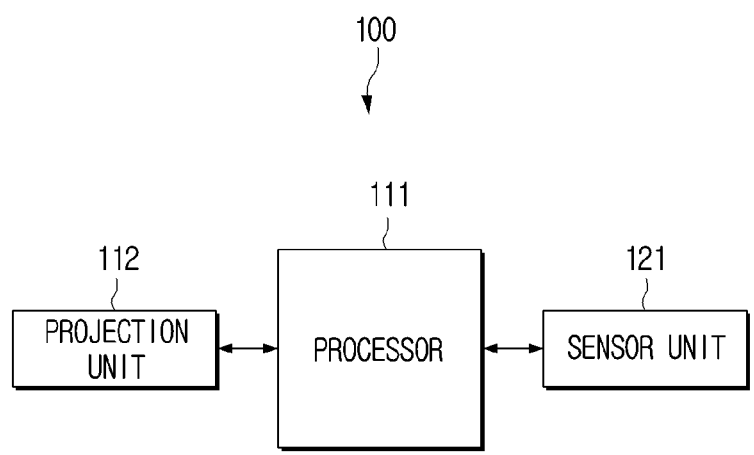
FIG. 3 is a block diagram illustrating an electronic apparatus according to various embodiments of the disclosure.

FIG. 3 is a block diagram illustrating the electronic apparatus 100 according to various embodiments of the disclosure.

Referring to FIG. 3, the electronic apparatus 100 may include at least one of at least one processor 111, a projection unit (or projection circuitry) 112, or a sensor unit (or sensor circuitry) 121.

The at least one processor 111 may perform an overall control operation of the electronic apparatus 100. For example, at least one processor 111 functions to control the overall operation of the electronic apparatus 100.

The at least one processor 111 may, based on a preset gesture of the user 10 being identified based on the sensing data, identify a first position p1 and a second position p2 indicating the preset gesture, obtain direction information corresponding to the preset gesture based on the first position p1 and the second position p2, obtain a projection position p3 corresponding to the preset gesture based on a position of a projection surface and the direction information, and control the projection unit 112 to project a projection image based on the projection position p3. The projection unit 112 may be comprised of projection circuitry configured to project an image.

The first position p1 may denote a start position of a direction indicated by the preset gesture, and the second position p2 may denote an end position of a direction indicated by the preset gesture.

In one or more examples, a preset gesture may correspond to a gesture indicating a specific direction. The at least one processor 111 may obtain direction information corresponding to a preset gesture. In one or more examples, the direction information may include information indicating which direction the preset gesture indicates. The direction information may include vector information or vector data or a vector component.

For example, a preset gesture may correspond to a gesture indicating a specific direction with a finger. The first position p1 may be a position corresponding to the wrist of the user 10. The second position p2 may be a position corresponding to the finger of the user 10. The second position p2 may be a position corresponding to an index fingertip portion or nail of the user. The at least one processor 111 may obtain direction information indicating a direction from a first position p1 corresponding to the wrist to a second position p2 corresponding to the finger.

In one or more examples, the preset gesture may be different according to the setting of the user 10. Additional description related to the preset gesture will be provided with reference to FIG. 15.

The at least one processor 111 may obtain a projection position p3 indicated by the user 10 based on a basic (or initial) position p0, a position of the projection surface, and direction information corresponding to a preset gesture.

According to various embodiments, the position of the projection surface may correspond to a point closest to the position p0 of the electronic apparatus 100 in the entire area of the projection surface According to various embodiments, the position of the projection surface may correspond to at least one position data. Since the projection surface is an area if not one point, the at least one processor 111 may obtain area information or spatial information indicating the position of the projection surface based on the sensing data. Accordingly, the position of the projection surface may correspond to position information of the projection surface, area information of the projection surface, space information of the projection surface, coordinate information of the projection surface, or any other suitable information known to one of ordinary skill in the art.

In one or more examples, the at least one processor 111 may determine which position of the entire area of the projection surface is a projection position based on the direction information corresponding to a preset gesture.

The at least one processor 111 may identify the preset gesture based on image data included in the sensing data, and identify the position of the projection surface, the first position p1, and the second position p2 based on distance data included in the sensing data.

Sensing data may be obtained through the sensor unit 121. In one or more examples, the sensor unit 121 may include at least one sensor. The sensor unit 121 may include a distance sensor for sensing a distance and may include an image sensor for sensing a captured image. The at least one processor 111 may obtain distance data through a distance sensor. In one or more examples, the at least one processor 111 may obtain image data through an image sensor. The distance data and the image data may be described as distance information and image information.

The distance sensor may denote time of flight (ToF) sensor or light detection and ranging LiDAR sensor, and an image sensor may denote a camera.

According to various embodiments, at least one processor 111 may obtain sensing data including both image data and distance data through one sensor. For example, the at least one processor 111 may sense distance data and image data together through a three-dimensional depth camera.

The at least one processor 111 may obtain the first vector V1 representing a direction from a position p0 of the electronic apparatus 100 to the first position p1, obtain the first distance Dr_z (or Drz), Dr_y (or Dry), and Dr_x (or Drx) between the electronic apparatus 100 and the projection surface based on a position p0 of the electronic apparatus 100 and a position of the projection surface, and obtain the projection position p3 based on the first vector V1, the first distance Dr_z (or Drz), Dr_y (or Dry), Dr_x (or Drx), the first position p1, and the direction information corresponding to the preset gesture.

A position p0 of the electronic apparatus 100 may be described as a initial position p0. The at least one processor 111 may obtain a first vector V1 based on the initial position p0 and a first position p1. In one or more examples, the vector may be described as direction information. For example, the first vector may be described as first direction information or a first direction component.

When the projection surface is present in the z-axis direction of the electronic apparatus 100, a first distance between the electronic apparatus 100 and the projection surface may be referred to as a Dr_z. A specific description related to the same is described in FIG. 17.

When the projection surface exists in the y-axis direction of the electronic apparatus 100, a first distance between the electronic apparatus 100 and the projection surface may be set as Dr_y. A specific description related to the same is described in FIG. 24.

When the projection surface is present in the x-axis direction of the electronic apparatus 100, a first distance between the electronic apparatus 100 and the projection surface is indicated as Dr_x. A specific description related to the same is described in FIG. 30.

According to various embodiments, at least one processor 111 may obtain a distance from the electronic apparatus 100 to any one of three axes x, y, z. For example, the at least one processor 111 may obtain a distance value of one of a Dr_z, a Dr_y, and a Dr_x.

According to various embodiments, at least one processor 111 may obtain all distances corresponding to neighboring candidate projection surfaces. For example, the at least one processor 111 may obtain a distance value of all Dr_z, Dr_y, and Dr_x.

The first distance Dr_z, Dr_y, Dr_x may denote the minimum distance among the distances from the electronic apparatus 100 to the projection surface.

In one or more examples, the at least one processor 111 may obtain a second vector V2 indicating a direction from a first position p1 to a projection position p3. In one or more examples, the at least one processor 111 may obtain a second vector V2 based on the first distance Dr_z, Dr_y, Dr_x, a first position p1, and direction information corresponding to a preset gesture. The at least one processor 111 may identify a projection position p3 based on the first vector V1 and the second vector V2. A description related to the first vector V1 and the second vector V2 is described in FIG. 14.

In one or more examples, direction information includes a sub-vector Vsub, and at least one processor 111 obtains a second distance Du_z, Du_y, Du_x between the first position p1 and the projection plane based on a first distance Dr_z, Dr_y, Dr_x and a first position p1, obtains a sub vector Vsub corresponding to a preset gesture based on the first position p1 and the second position p2, and obtains a projection position p3 based on the first vector, the sub vector Vsub, the first position p1, the second position p2, and the second distance Du_z, Du_y, Du_x.

In one or more examples, the subvector Vsub may correspond to a direction component obtained based on a preset gesture.

In one or more examples, the second distance Du_z, Du_y, Du_x may correspond to the distance between the user 10 and the projection surface.

When the projection surface is present in the z-axis direction of the electronic apparatus 100, a second distance between the first position p1 and the projection surface may be set to Du_z. A specific description related to the same is described with reference to FIGS. 18 to 20.

When the projection surface exists in the y-axis direction of the electronic apparatus 100, a second distance between the first position p1 and the projection surface may be set as Du_y. A specific description related to the same is described in FIGS. 25 to 26.

When the projection surface is present in the x-axis direction of the electronic apparatus 100, a second distance between the first position p1 and the projection surface may be set as Du_x. A specific description related to the same is described with reference to FIGS. 31 to 32.

According to various embodiments, at least one processor 111 may obtain a distance from a first position p1 to any one of three axes x, y, z. For example, the at least one processor 111 may obtain a distance value of one of Du_z, Du_y, and Du_x.

According to various embodiments, at least one processor 111 may obtain all distances corresponding to neighboring candidate projection surfaces. For example, the at least one processor 111 may obtain a distance value of both Du_z, Du_y, Du_x.

In one or more examples, the second distance Du_z, Du_y, and Du_x may correspond to a minimum distance among distances from the electronic apparatus 100 to the projection surface.

The at least one processor 111 may obtain an expansion ratio Du_z/|z2-z1|, Du_y/|y2-y1|, Du_x/|x2-x1| based on the first position p1, second position p2, and second distance Du_z, Du_y, Du_x, obtain a second vector V2 indicating a direction from the first position p1 to the projection position p3 based on expansion ratio Du_z/|z2-z1|, Du_y/|y2-y1|, Du_x/|x2-x1|, and obtain position p3 based on the first vector V1 and the second vector V2.

According to various embodiments, at least one processor 111 may obtain a ratio among Du_z/|z2-z1|, Du_y/|y2-y1|, Du_x/|x2-x1| according to the direction in which the projection surface is present (e.g., the axis corresponding to the projection surface).

When the projection surface is present in the z-axis direction of the electronic apparatus 100, the at least one processor 111 may obtain an expansion ratio Du_z/|z2-z1|. A specific description related to the same is described in FIG. 21.

When the projection surface is present in the y-axis direction of the electronic apparatus 100, the at least one processor 111 may obtain an expansion ratio Du_y/|y2-y1|. A specific description related to the same is described in FIG. 27.

When the projection surface is present in the X-axis direction of the electronic apparatus 100, the at least one processor 111 may obtain an expansion ratio Du_x/|x2-x1|. A specific description related to the same is described in FIG. 33.

The projection position may be a first projection position, and the at least one processor 111 may, based on the projection position being not included in a plane corresponding to the projection surface, re-obtain (or update) the first distance Dr_z, Dr_y, Dr_x based on the position p0 of the electronic apparatus 100, the position of the projection surface, and the first projection position, and obtain a second projection position based on the first vector, the re-obtained first distance Dr_z, Dr_y, Dr_x, the first position p1, and the direction information.

According to various embodiments, a projection surface may be a plane. However, according to various embodiments, the projection surface may not be a plane. When the projection surface is not a plane, the least one processor 111 may generate an error in calculating a projection position (P3). The generated error may occur because the distance between the plane corresponding to the electronic apparatus 100 and the plane corresponding to the projection surface is not constant.

Therefore, if the projection plane is not a plane, the at least one processor 111 needs to confirm again whether the calculated projection position is an accurate value. For example, at least one processor 111 may identify whether the calculated projection position is included in a plane corresponding to a projection surface. The at least one processor 111 may obtain plane information corresponding to the projection surface based on the sensing data. In one or more examples, the plane corresponding to the projection surface may correspond to a virtual horizontal plane based on the position of the projection surface.

Accordingly, the at least one processor 111 may obtain coordinate information of a virtual horizontal surface corresponding to a projection surface. When the projection position is included in the coordinate information corresponding to the projection surface, the at least one processor 111 may determine that the calculated projection position is suitable. However, when the projection position is not included in the coordinate information corresponding to the projection surface, the at least one processor 111 may determine that the calculated projection position does not fit the actual projection surface.

Figure 9:
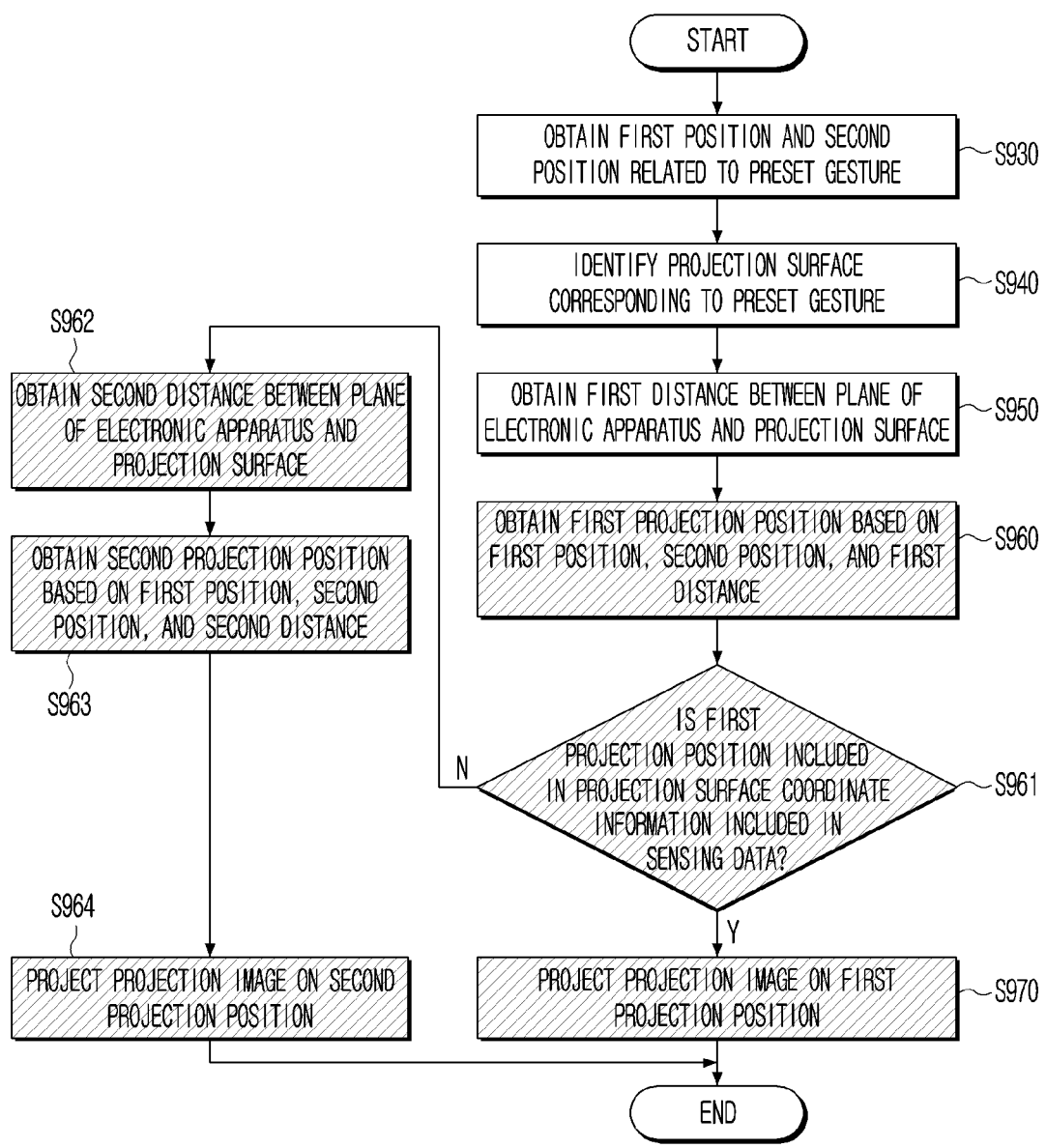
FIG. 9 is a flowchart for describing an operation of determining whether a projection position calculated matches an actual projection surface according to various embodiments.
Figure 10:
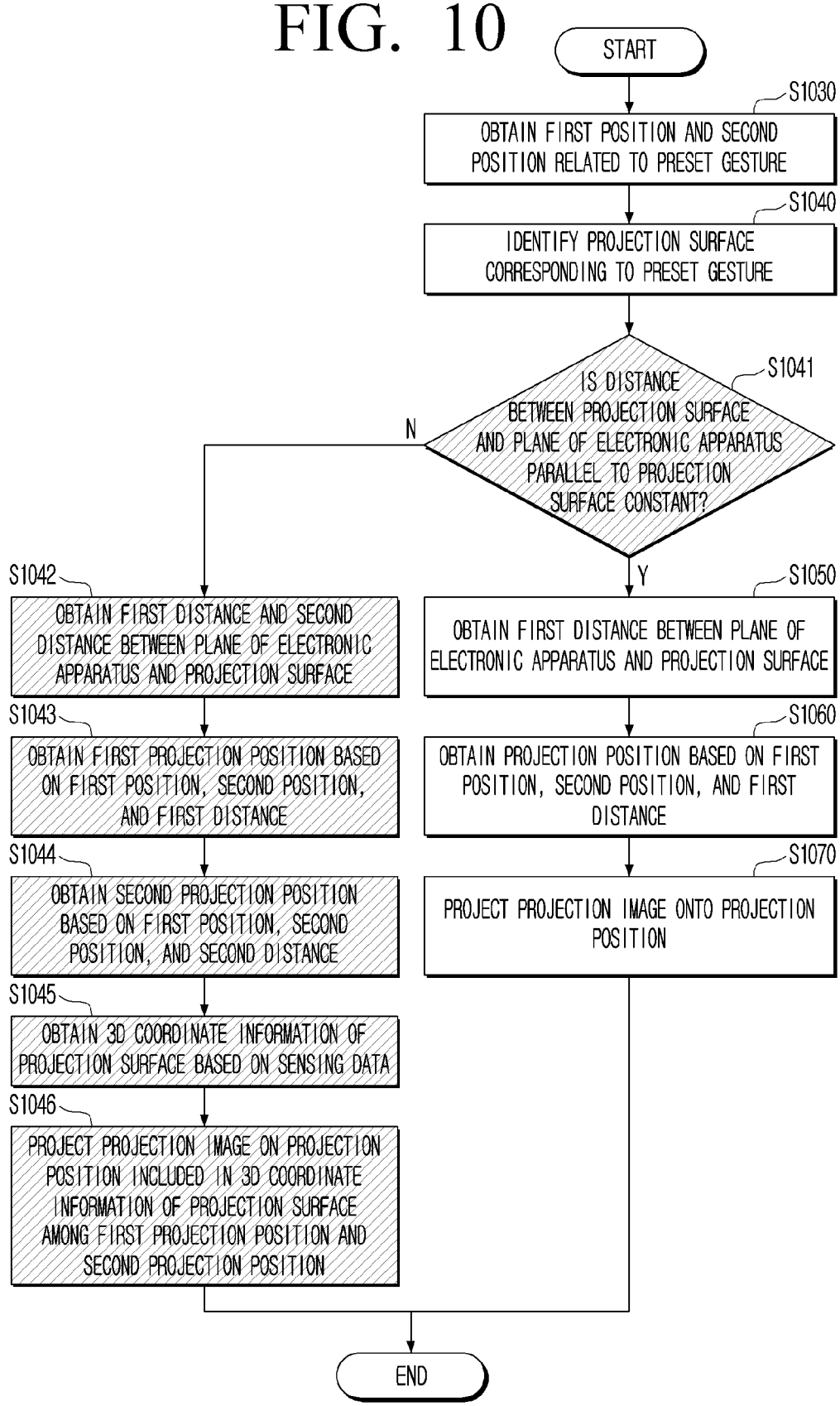
FIG. 10 is a flowchart for describing an operation of determining whether a projection position calculated according to various embodiments matches an actual projection surface.
Figure 11:
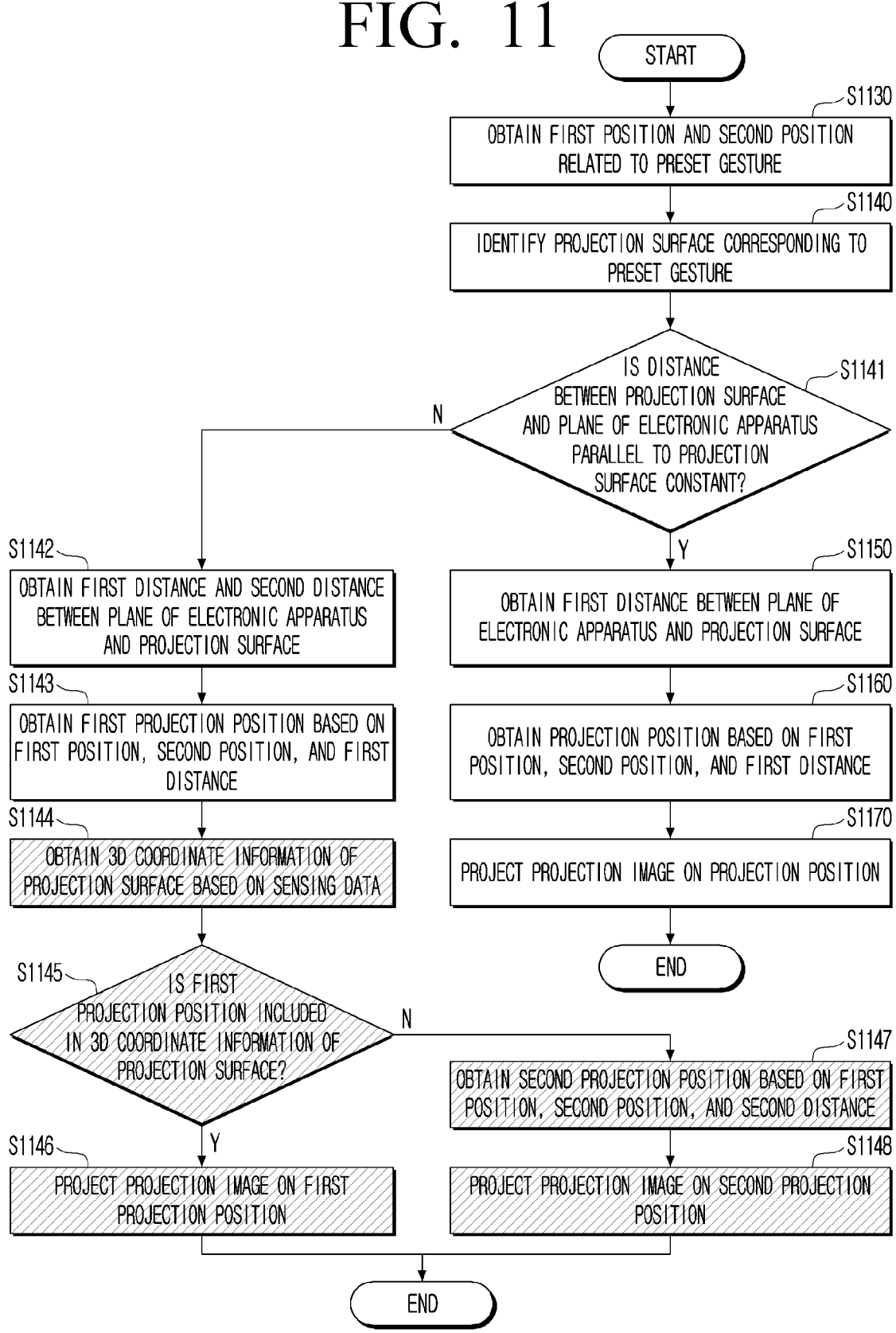
FIG. 11 is a flowchart for describing an operation of determining whether a projection position calculated matches an actual projection surface according to various embodiments.

A detailed description related to the re-verification operation of the projection position is described in FIGS. 9 to 11.

Figure 22:
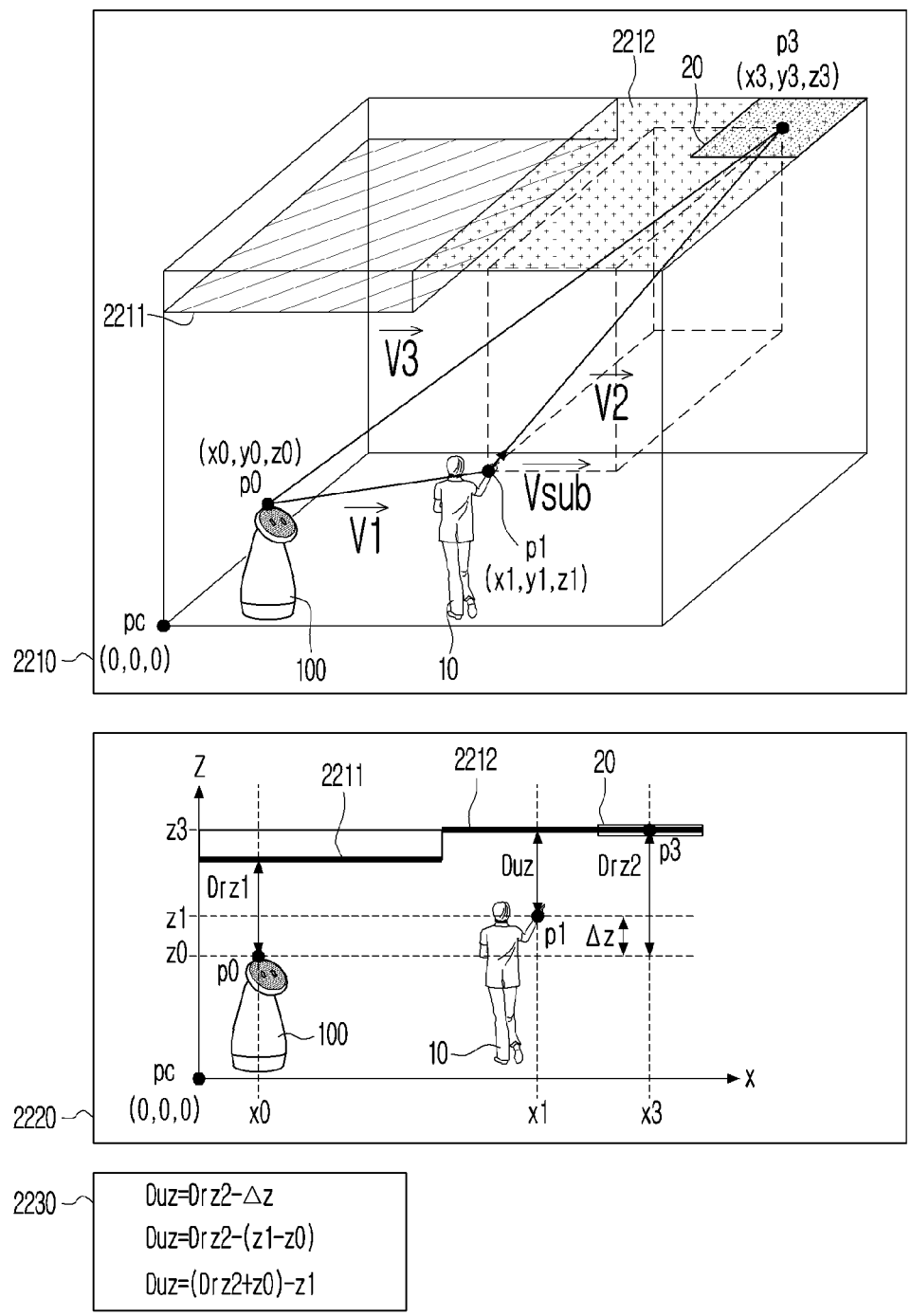
FIG. 22 is a diagram for describing an operation of calculating a projection position when a projection surface which is not flat in a z-axis direction exists, according to various embodiments.
Figure 23:
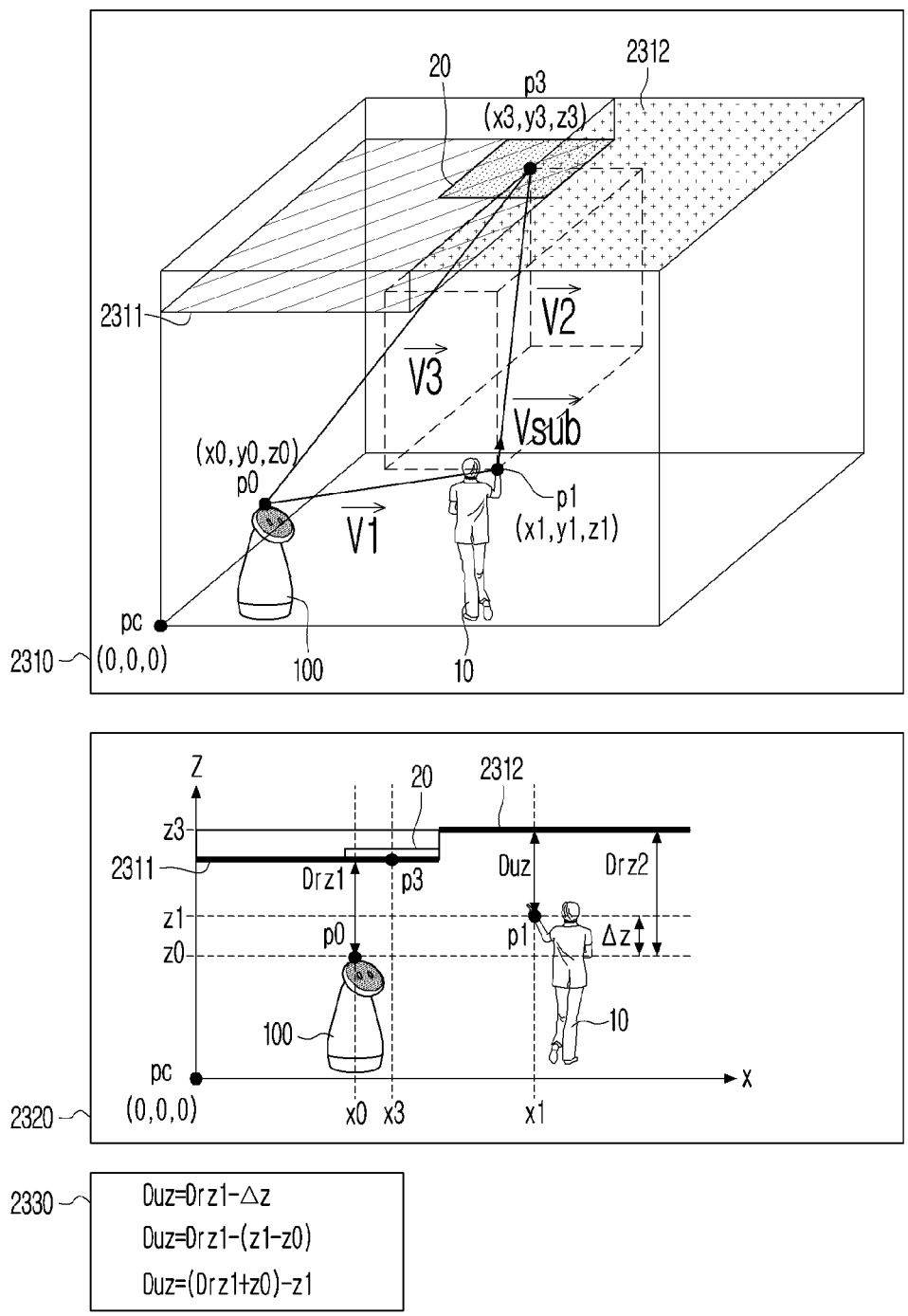
FIG. 23 is a diagram for describing an operation of calculating a projection position when a projection surface that is not flat in a z-axis direction exists, according to various embodiments.

One or more embodiments in which the non-planar projection surface is present in the z-axis direction of the electronic apparatus 100 is described in FIGS. 22 to 23.

One or more embodiments in which the non-planar projection surface is present in the y-axis direction of the electronic apparatus 100 is described in FIGS. 22 to 23.

Figure 34:
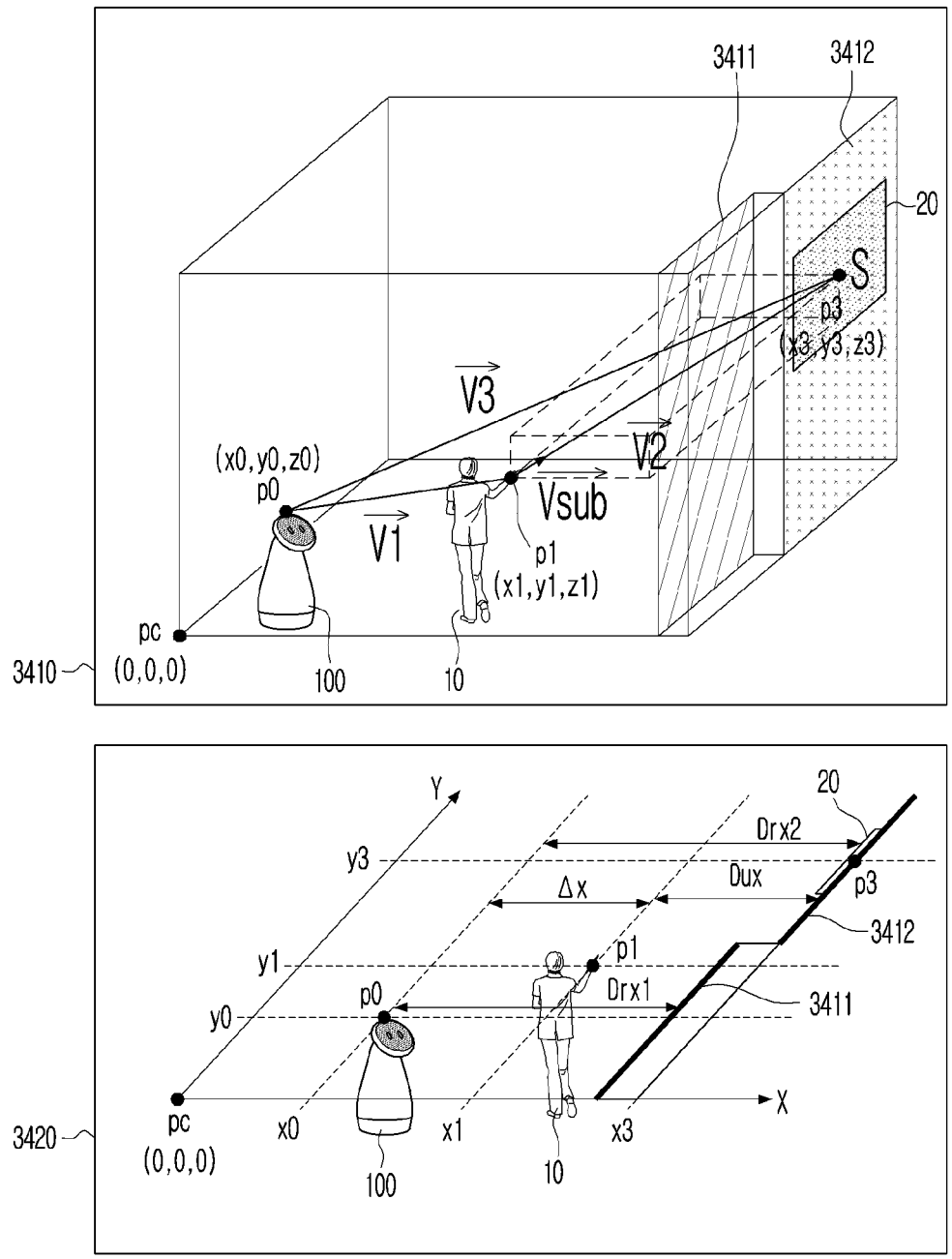
FIG. 34 is a diagram for describing an operation of calculating a projection position when a projection surface that is not flat in the x-axis direction exists, according to various embodiments.
Figure 35:
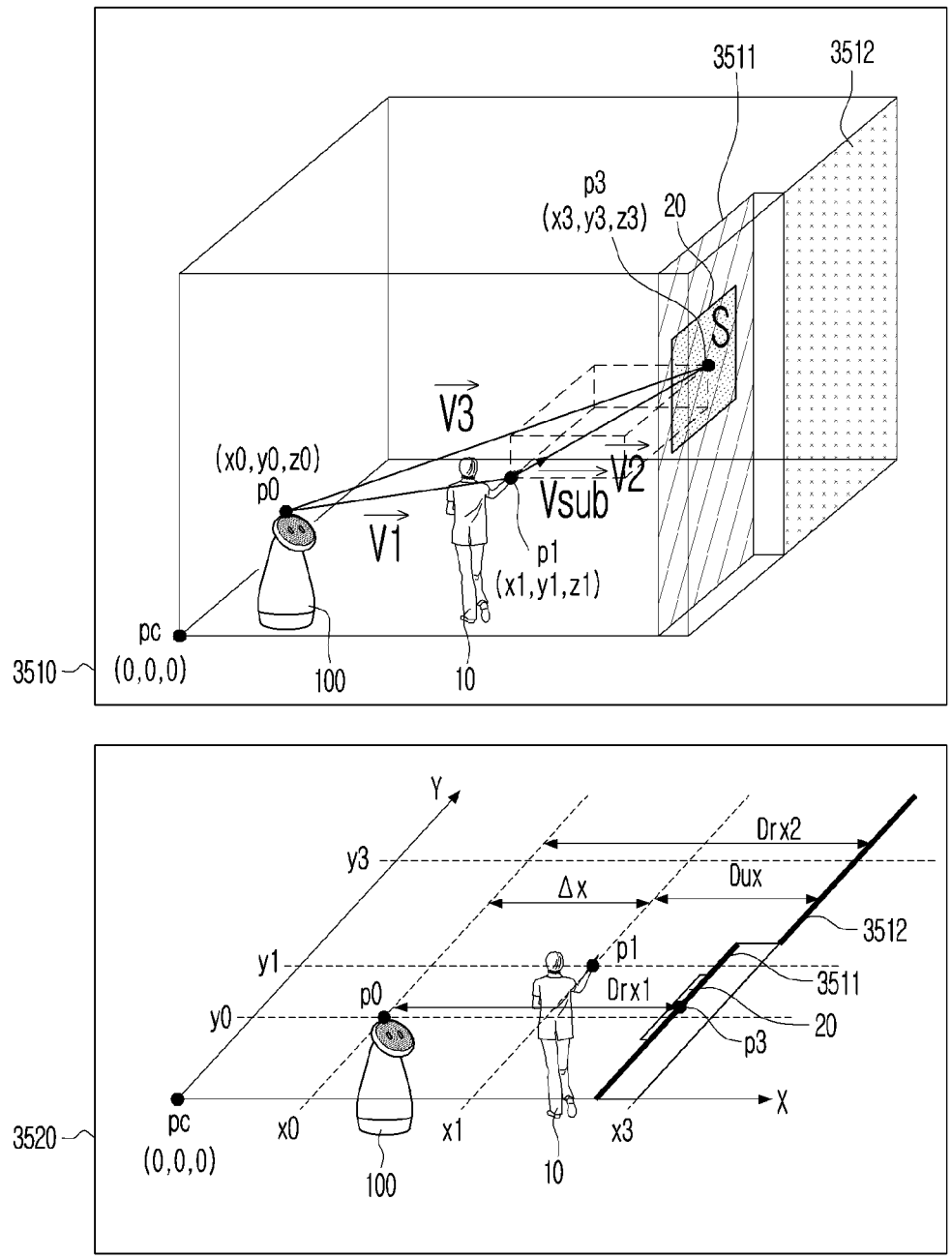
FIG. 35 is a diagram for describing an operation of calculating a projection position when a projection surface that is not flat in the x-axis direction exists, according to various embodiments.

One or more embodiments in which a non-planar projection surface is present in the x-axis direction of the electronic apparatus 100 is described in FIGS. 34 to 35.

The electronic apparatus 100 may further include a microphone 119 and a driving unit 120. The at least one processor 111 may, based on receiving a user voice including a preset user command through the microphone, identify a position of the user 10 who uttered the user voice based on the sensing data, and control the driving unit 120 to move the electronic apparatus 100 based on the position of the user 10.

In one or more examples, the at least one processor 111 may control the driving unit 120 so that the electronic apparatus 100 is positioned within a threshold distance from the position of the user 10. The electronic apparatus 100 may move from the user 10 to an area within a threshold distance. A specific operation related thereto is described in FIG. 41.

The at least one processor 111 may, based on both the first position p1 and the second position p2 being not changed for a threshold time, control the projection unit 112 to project the projection image based on the projection position p3. A specific operation related thereto is described in FIGS. 12 to 13.

The at least one processor 111 may, based on receiving a user command for a multi-view function for projecting a merged image including first content and second content, identify an edge of the projection surface, based on the projection position p3 being within a threshold distance from the edge, change the projection position p3 to a position corresponding to the edge, and control the projection unit 112 to project the merged image based on the changed projection position p4. A specific operation related thereto is described in FIGS. 39 to 40.

In one or more examples, the electronic apparatus 100 according to various embodiments may identify a preset gesture of a user and project a projection image at a position desired by a user. In order to accurately determine a projection position corresponding to a preset gesture, the electronic apparatus 100 may identify two positions p1 and p2 corresponding to a preset gesture. In addition, the electronic apparatus 100 may first determine and expand a sub-vector V2 of a preset gesture based on the two positions p1 and p2.

In one or more examples, the electronic apparatus 100 according to various embodiments may perform an operation of verifying an already obtained projection position. Therefore, as a result, it is possible to confirm an accurate projection position with respect to a non-planar projection surface or a curved projection surface.

Figure 4:
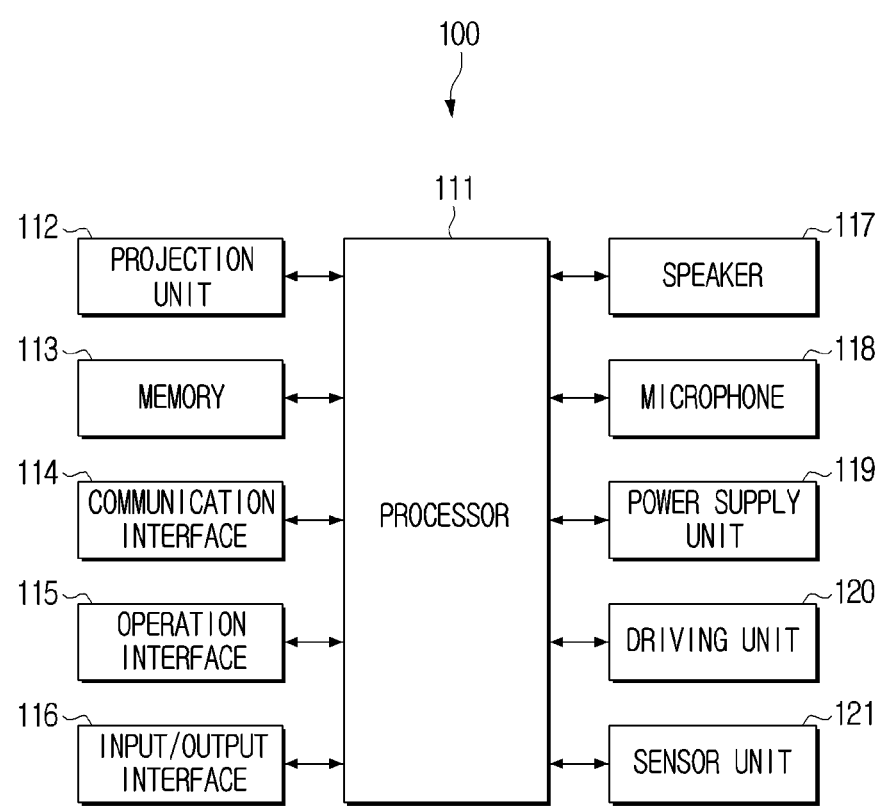
FIG. 4 is a block diagram for describing a specific configuration of the electronic apparatus of FIG. 3 according to various embodiments.

FIG. 4 is a block diagram for describing a specific configuration of the electronic apparatus 100 of FIG. 3.

Referring to FIG. 4, the electronic apparatus 100 may include at least one of the processor 111, a projection unit 112, a memory 113, a communication interface 114, a operation interface 115, an input/output interface 116, a speaker 117, a microphone 118, a power supply unit 119, a driving unit 120, or a sensor unit 121.

As understood by one of ordinary skill in the art, the configuration shown in FIG. 3 is only a variety of possible embodiments, where some configurations may be omitted, and new configurations may be added.

The descriptions overlapped with FIG. 2 will be omitted.

The processor 111 may be implemented with, for example, and without limitation, a digital signal processor (DSP) for processing of a digital signal, a microprocessor, a time controller (TCON), or any other processing structure known to one of ordinary skill in the art. The processor 111 may include, for example, and without limitation, one or more among a central processor (CPU), a micro controller unit (MCU), a micro processor (MPU), a controller, an application processor (AP), a communication processor (CP), an advanced reduced instruction set computing (RISC) machine (ARM) processor, a dedicated processor, or may be defined as a corresponding term. The processor 111 may be implemented in a system on chip (SoC) type or a large scale integration (LSI) type which a processing algorithm is built therein, application specific integrated circuit (ASIC), or in a field programmable gate array (FPGA) type. The processor 111 may perform various functions by executing computer executable instructions stored in the memory 113.

The projection unit 112 may be composed of one or more components that project an image to the outside. According to various embodiments of the disclosure, the projection unit 112 may be implemented in various projection schemes, for example, a cathode-ray tube (CRT), a Liquid Crystal Display (LCD), a Digital Light Processing (DLP), a laser method, or any other configuration known to one of ordinary skill in the art. For example, the CRT method may be considered as the same principle as the CRT monitor. The CRT method may enlarge the image with the lens in front of the CRT and displays the image on the screen (e.g., projection screen). According to the number of cathode tubes, it is divided into 1-tube type and 3-tube type, and in the case of the 3-tube type, the CRT tubes of red, green, and blue may be implemented separately.

In one or more examples, the projection unit 112 may include various types of light sources. For example, the projection unit 112 may include at least one light source among a lamp, an LED, and a laser.

The projection unit 112 may output an image at a 4:3 aspect ratio, a 5:4 aspect ratio, or a 16:9 wide aspect ratio according to the use of the electronic apparatus 100 or the setting of a user. The projection unit 112 may output an image to various resolutions such as WVGA854*480, SVGA800*600, XGA1024*768, WXGA1280*720, WXGA1280*800, SXGA1280*1024, UXGA1600*1200, Full HD1920*1080 according to an aspect ratio.

The projection unit 112 may perform various functions for adjusting the output image by the control of the processor 111. For example, the projection unit 112 may perform functions such as zoom, keystone, quick corner (4 corner) keystone, lens shift, or any other suitable function known to one of ordinary skill in the art.

For example, the projection unit 112 may enlarge or reduce the image according to the distance (projection distance) from the screen. For example, the zoom function may be performed according to the distance from the screen. In this case, the zoom function may include a hardware method for adjusting the size of the screen by moving the lens, and a software method for adjusting the size of the screen by cropping the image. In one or more examples, when the zoom function is performed, adjustment of the focus of the image is necessary. For example, the method of adjusting the focus includes a manual focus scheme, a motorized method, or any other suitable adjustment known to one of ordinary skill in the art. The manual focus method refers to the manual focusing method, and the motorized method refers to a method of automatically focusing using a motor with a built-in projector when the zoom function is performed. When performing the zoom function, the projection unit 112 may provide a digital zoom function through software, and an optical zoom function that performs the zoom function by moving the lens through the driving unit 120 may be provided.

In addition, the projection unit 112 may perform a keystone correction function. For example, if the height does not match the frontal projection, the screen may be distorted up or down. The keystone correction function refers to the function of correcting the distorted screen. For example, if distortion occurs in the left and right direction of the screen, the screen may be corrected using a horizontal keystone. If distortion occurs in the up and down direction, the screen may be corrected using a vertical keystone. Quick corner (4 corner) keystone correction function is a function that calibrates the screen when the center area of the screen is normal, but the corner area is not balanced. The lens shift function is a function that moves the screen as it is when the screen is off the screen (or projection screen).

In one or more examples, the projection unit 112 may automatically analyze the surrounding environment and the projection environment without user input to provide a zoom/keystone/focus function. For example, the projection unit 112 may automatically provide zoom/keystone/focus functions based on information on the distance between the electronic apparatus 100 and the screen detected through the sensor (e.g., depth camera, distance sensor, infrared sensor, illuminance sensor, etc.), information on the space in which the electronic apparatus 100 is currently located, and information on the ambient light amount.

The memory 113 may be implemented as an internal memory such as, for example, and without limitation, a read-only memory (ROM) (for example, electrically erasable programmable read-only memory (EEPROM)), a random-access memory (RAM) or a memory separate from the processor 111. In this case, the memory 113 may be implemented as at least one of a memory embedded within the electronic apparatus 100 or a memory detachable from the electronic apparatus 100 according to the usage of data storage. For example, the data for driving the electronic apparatus 100 may be stored in the memory embedded within the electronic apparatus 100, and the data for upscaling of the electronic apparatus 100 may be stored in the memory detachable from the electronic apparatus 100.

A memory embedded in the electronic apparatus 100 may be implemented as at least one of a volatile memory such as a dynamic random access memory (DRAM), a static random access memory (SRAM), a synchronous dynamic random access memory (SDRAM), or a non-volatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive (HDD) or a solid state drive (SSD). In the case of a memory detachably mounted to the electronic apparatus 100, the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a universal serial bus (USB) memory) connectable to the USB port, or any other memory structure known to one of ordinary skill in the art.

The memory 113 may store at least one instruction for the electronic apparatus 100. In addition, an operating system (O/S) for driving the electronic apparatus 100 may be stored in the memory 113. In addition, various software programs or applications for operating the electronic apparatus 100 may be stored in the memory 113 according to various embodiments of the disclosure. The memory 113 may include semiconductor memory such as flash memory, magnetic storage media such as hard disk, or any other memory structure known to one of ordinary skill in the art.

For example, various software modules for operating the electronic apparatus 100 may be stored in the memory 113 according to various embodiments of the disclosure, and the processor 111 may control the operation of the electronic apparatus 100 by executing various software modules stored in the memory 113. For example, the memory 113 is accessed by the processor 111 and reading/writing/modifying/deleting/updating of data by the processor 111 may be performed.

In the disclosure, the term memory 113 may include read-only memory (ROM) in the processor 111, RAM, or a memory card (for example, a micro secure digital (SD) card, and a memory stick) mounted to the electronic apparatus 100.

The communication interface 114 may communicate with other external devices using various types of communication methods. The communication interface 114 may include a wireless communication module or wired communication module. Each communication module may be implemented as at least one hardware chip.

The wireless communication module may be a module that wirelessly communicates with an external device. For example, the wireless communication module may include at least one of a Wi-Fi module, a Bluetooth module, an infrared communication module, or other communication modules.

The Wi-Fi module and the Bluetooth module perform communication using a Wi-Fi method and a Bluetooth method, respectively. When using the Wi-Fi module or the Bluetooth module, various connection information such as a service set identifier (SSID) and a session key may be transmitted and received first, and communication information may be transmitted after communication connection.

The infrared ray communication module may perform communication according to infrared data association (IrDA) technology that transmits data wireless to a local area using infrared ray between visible rays and millimeter waves.

The other communication module may include at least one communication chip performing communication according to various communication standards such as Zigbee, 3rd generation (3G), 3rd generation partnership project (3GPP), long term evolution (LTE), LTE advanced (LTE-A), 4th generation (4G), 5th generation (5G), or any other communication standard known to one of ordinary skill in the art, in addition to the communication methods as described above.

The wired communication module may include at least one of a local area network (LAN) module, Ethernet module, a pair cable, a coaxial cable, an optical cable, an ultra-wide band (UWB) module, or the like.

The operation interface 115 may include various types of input devices. For example, the operation interface 115 may include a physical button. In this case, the physical button may include a function key, an arrow key (e.g., a four-way key or a dial button). According to various embodiments, the physical button may be implemented with a plurality of keys. According to another embodiment, the physical button may be implemented as one key. In one or more examples, when the physical button is implemented as one key, the electronic apparatus 100 may receive user input in which one key is pressed for more than a critical time. When a user input is received in which one key is pressed for more than a critical time, the processor 111 may perform a function corresponding to the user input. For example, the processor 111 may provide illumination functions based on user input.

In addition, the operation interface 115 may receive a user input by using a non-contact method. When receiving a user input through a contact method, a physical force may be transmitted to the electronic apparatus 100. Therefore, a method for controlling the electronic apparatus 100 may be necessary regardless of a physical force. For examples, the operation interface 115 may receive a user gesture and perform an operation corresponding to the received user gesture. The operation interface 115 may receive a user gesture through a sensor (e.g., an image sensor or an infrared sensor.

In addition, the operation interface 115 may receive a user input by using a touch method. For example, the operation interface 115 may receive a user input via a touch sensor. According to various embodiments, the touch method may be implemented in a non-contact manner. For example, the touch sensor may determine whether the user's body has approached within a threshold distance. In one or more examples, the touch sensor may identify a user input even when the user does not contact the touch sensor. In one or more embodiments, the touch sensor may identify a user input in which a user contacts the touch sensor.

The electronic apparatus 100 may receive a user input in various ways other than the above-described operation interface 115. According to various embodiments, the electronic apparatus 100 may receive a user input through an external remote control device. In one or more examples, the external remote control device may be a remote control device (e.g., a dedicated control device of the electronic apparatus 100 corresponding to the electronic apparatus 100) or a portable communication device (e.g., a smartphone or a wearable device of the user). In one or more examples, the portable communication device of the user may store an application for controlling the electronic apparatus 100. The portable communication device may obtain a user input through the stored application and transmit the obtained user input to the electronic apparatus 100. The electronic apparatus 100 may receive a user input from the portable communication device and perform an operation corresponding to a control command of the user.

In one or more examples, the electronic apparatus 100 may receive a user input by using voice recognition. According to various embodiments, the electronic apparatus 100 may receive a user voice through the microphone 118 included in the electronic apparatus 100. According to one or more embodiments, the electronic apparatus 100 may receive a user voice from the microphone 118 or an external device. For example, the external device may obtain a user voice through the microphone 118 of the external device, and may transmit the obtained user voice to the electronic apparatus 100. The user voice transmitted from the external device may be digital data obtained by converting audio data or audio data for example, audio data converted into a frequency domain, etc. In one or more examples, the electronic apparatus 100 may perform an operation corresponding to the received user voice. For example, the electronic apparatus 100 may receive audio data corresponding to a user voice through a microphone 118. The electronic apparatus 100 may convert the received audio data into digital data. The electronic apparatus 100 may convert the converted digital data into text data using an STT function. According to various embodiments, the STT function may be directly performed in the electronic apparatus 100.

According to one or more embodiments, the Speech To Text (STT) function may be performed on an external server. The electronic apparatus 100 may transmit digital data to an external server. The external server may convert the digital data into text data and obtain control command data based on the converted text data. The external server may transmit control command data, which may also include text data, to the electronic apparatus 100. The electronic apparatus 100 may perform an operation corresponding to the user's voice based on the obtained control command data.

In one or more examples, the electronic apparatus 100 may provide a voice recognition function using one assistant or an artificial intelligence assistant, for example, Bixby™, or any other assistant type known to one of ordinary skill in the art, but this is only a variety of embodiments. In this case, the electronic apparatus 100 may select one of a plurality of assistants based on a trigger word corresponding to the assistant or a specific key existing in the remote control to provide a voice recognition function.

The electronic apparatus 100 may receive a user input by using a screen interaction. The screen interaction may refer to a function of identifying whether a predetermined event occurs through an image projected on a screen (or a projection surface) by the electronic apparatus 100, and obtaining a user input based on the predetermined event. In one or more examples, the predetermined event may refer to an event in which a predetermined object is identified at a specific position at a specific position (for example, a position at which a UI for receiving a user input is projected). The predetermined object may include at least one of a body part for example, a finger, an indication rod, or a laser point of the user. When a predetermined object is identified at a position corresponding to the projected UI, the electronic apparatus 100 may identify that a user input for selecting the projected UI is received. For example, the electronic apparatus 100 may project a guide image to display a UI on a screen. The electronic apparatus 100 may identify whether the user selects the projected UI. For example, when a predetermined event is identified at a position of a projected UI, the electronic apparatus 100 may identify that the user has selected the projected UI. In one or more examples, the projected UI may include at least one item. In one or more examples, the electronic apparatus 100 may perform spatial analysis to identify whether a predetermined event is located in a projected UI. In one or more examples, the electronic apparatus 100 may perform spatial analysis through a sensor (e.g., an image sensor, an infrared sensor, a depth camera, a distance sensor, etc.). The electronic apparatus 100 may identify whether a predetermined event occurs at a specific position at which a UI is projected by performing a spatial analysis. When it is identified that a predetermined event occurs at a specific position at which the UI is projected, the electronic apparatus 100 may identify that a user input for selecting a UI corresponding to a specific position has been received. For example, the electronic apparatus 100 may display one or more controls on a projection surface that may be activated by a user selecting one of the one or more controls.

The input/output interface 116 may be configured to input/output at least one of an audio signal and an image signal. The input/output interface 116 may receive at least one of audio and image signals from an external device and output a control command to an external device.

According to an implementation example, the input/output interface 116 may be implemented as an interface for in/output only an audio signal and an interface for in/output only an image signal, or as an interface for both an audio signal and an image signal.

The input and output interface 116 according to various embodiments may be implemented with at least one input/output interface, such as, for example, and without limitation, at least one of a high-definition multimedia interface (HDMI), mobile high-definition link (MHL), universal serial bus (USB), display port (DP), Thunderbolt, video graphics array (VGA) port, RGB port, d-subminiature (D-SUB), digital visual interface (DVI), and the like. In various embodiments, the wired input and output interface may be implemented as an interface for inputting or outputting an audio signal, or may be implemented as one interface that inputs or outputs all the audio signals or image signals.

In one or more examples, the electronic apparatus 100 may receive data through a wired input/output interface, but this is merely various embodiments and may be supplied with power through a wired input/output interface. For example, the electronic apparatus 100 may receive power from an external battery through a USB C-type or receive power from the outlet through a power adapter. As another example, the electronic apparatus 100 may receive power from an external device e.g., a laptop or a monitor through the DP.

In one or more examples, the audio signal may be input through a wired input/output interface, and the image signal may be implemented to receive input through a wireless input/output interface or a communication interface. Alternatively, the audio signal may be input through a wireless input/output interface or a communication interface, and the image signal may be implemented to receive input through a wired input/output interface.

The speaker 117 may be a component for outputting an audio signal. For example, the speaker 117 may include an audio output mixer, an audio signal processor, and an audio output module. The audio output mixer may synthesize a plurality of audio signals to be output into at least one audio signal. For example, the audio output mixer may synthesize an analog audio signal and another analog audio signal (e.g., an analog audio signal received from the outside) into at least one analog audio signal. The sound output module may include a speaker or an output terminal. According to various embodiments, the sound output module may include a plurality of speakers, and in this case, the sound output module may be disposed inside the main body, and the sound shielding at least a part of the vibration plate of the sound output module may pass through the sound conduit waveguide and may be transmitted to the outside of the main body. The sound output module includes a plurality of sound output units, and the plurality of sound output units are symmetrically arranged on the exterior of the main body so that sound may be radiated in all directions, that is, in all directions of 360 degrees.

The microphone 118 may include an element to receive a user voice or other sound and convert to audio data. The microphone 118 may receive the user voice in an active state. For example, the microphone 118 may be integrally formed as an integral unit on at least one of an upper side, a front side direction, a side direction, or any other suitable direction of the electronic apparatus 100. The microphone 118 may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, or any other suitable configuration.

The power supply unit 119 may supply power to various components of the electronic apparatus 100 by receiving power from the outside. The power supply unit 119 according to various embodiments of the disclosure may be supplied with power through various methods. According to various embodiments, the power supply unit 119 may be supplied with power by using a connector 130 as shown in FIG. 1. In addition, the power supply unit 119 may be supplied with power using a 220V DC power supply code. However, the embodiments are not limited to these configurations, and the electronic apparatus 100 may receive power by using a USB power supply code or may be supplied with power by using a wireless charging method.

In one or more examples, the power supply unit 119 may be supplied with power by using an internal battery or an external battery. The power supply unit 119 according to various embodiments of the disclosure may be supplied with power through an internal battery. For example, the power supply unit 119 may charge the power of the internal battery by using at least one of a 220V DC power supply code, a USB power supply code, and a USB C-type power supply code, and may be supplied with power through the charged internal battery. In addition, the power supply unit 119 according to various embodiments of the disclosure may be supplied with power through an external battery. For example, when a connection between the electronic apparatus 100 and an external battery is performed through various wired communication methods such as a USB power supply cord, a USB C-type power code, and a socket home, the power supply unit 119 may be supplied with power through an external battery. For example, the power supply unit 119 may directly receive power from an external battery, charge the internal battery through an external battery, and receive power from the charged internal battery.

The power supply unit 119 according to the disclosure may be supplied with power by using at least one of the above-described plurality of power supply methods.

In one or more examples, with respect to power consumption, the electronic apparatus 100 may have a power consumption of less than or equal to a preset value for example, 43 W or less for a socket type and other standards. At this time, the electronic apparatus 100 may vary power consumption so as to reduce power consumption when using the battery. For example, the electronic apparatus 100 may vary power consumption based on a power supply method, a power usage amount, or any other power related information known to one of ordinary skill in the art.

The driving unit 120 may drive at least one hardware configuration included in the electronic apparatus 100. The driving unit 120 may generate a physical force and transmit the physical force to at least one hardware configuration included in the electronic apparatus 100.

In one or more examples, the driving unit 120 may generate driving power for movement of a hardware configuration included in the electronic apparatus 100, for example, movement of the electronic apparatus 100 or rotation of a configuration for example, rotation of the projection lens.

The driving unit 120 may adjust a projection direction or a projection angle of the projection unit 122. In addition, the driving unit 120 may move the position of the electronic apparatus 100. In one or more examples, the driving unit 120 may control the moving member 109 to move the electronic apparatus 100. For example, the driving unit 120 may control the moving member 109 by using a motor.

The sensor unit 121 may include at least one sensor. For example, the sensor unit 121 may include at least one of a tilt sensor for sensing a tilt of the electronic apparatus 100, and an image sensor for capturing an image. In one or more examples, the tilt sensor may be an acceleration sensor, a gyro sensor, and the image sensor may refer to a camera or a depth camera. In one or more examples, the tilt sensor may be described as a motion sensor. In addition, the sensor unit 121 may include various sensors in addition to a tilt sensor or an image sensor. For example, the sensor unit 121 may include an illuminance sensor and a distance sensor. The distance sensor may be time of flight (ToF). In addition, the sensor unit 121 may include a LiDAR sensor.

In one or more examples, the electronic apparatus 100 is connected to a portable terminal device for controlling the electronic apparatus 100 to control a screen output from the electronic apparatus 100 through a user input inputted from the portable terminal device. For example, the portable terminal device may be implemented as a smartphone including a touch display, and the electronic apparatus 100 may receive and output screen data provided by the portable terminal device from the portable terminal device, and may control a screen output from the electronic apparatus 100 according to a user input from the portable terminal device.

The electronic apparatus 100 may further include a display.

The display may be implemented as various types of displays such as a liquid crystal display (LCD) panel, organic light emitting diodes (OLED) display panel, a plasma display panel (PDP), or any other display structure known to one of ordinary skill in the art. In the display, a driving circuit which may be implemented in a type of an a-Si thin film transistor (TFT), a low temperature poly silicon (LTPS) TFT, an organic TFT (OTFT), and a backlight may be included. Further, the display may be implemented as at least one of a touch screen coupled with a touch sensor, a flexible display, a three-dimensional (3D) display, or the like. According to various embodiments, the display may include not only a display panel to output an image but also a bezel that houses a display panel. In particular, the bezel according to one or more embodiments may include a touch sensor (not illustrated) for sensing a user interaction.

Figure 5:
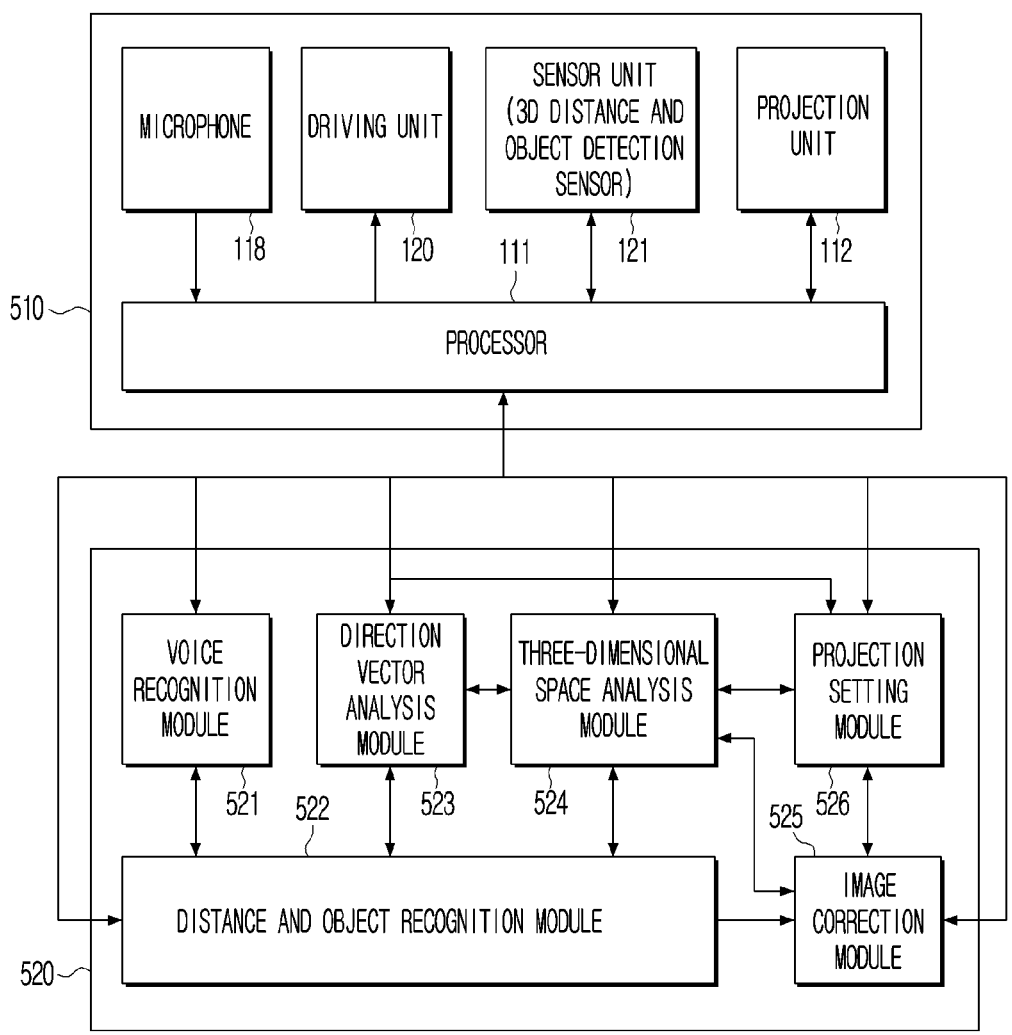
FIG. 5 is a block diagram illustrating a configuration of an electronic apparatus according to various embodiments.

FIG. 5 is a block diagram illustrating a configuration of the electronic apparatus 100 according to various embodiments.

Referring to FIG. 5, the electronic apparatus 100 may include both hardware 510 and software 520. In one or more examples, the software 520 may be stored in the memory 113 in the configuration of the hardware 510.

The hardware 510 of the electronic apparatus 100 may include at least one of at least one processor 111, the projection unit 112, a microphone 118, the driving unit 120, and the sensor unit 121.

The software 520 of the electronic apparatus 100 may include at least one of a voice recognition module 521, a distance and object recognition module 522, a direction vector analysis module 523, a three-dimensional space analysis module 524, an image correction module 525, or a projection setting module 526.

The voice recognition module 521 may be a module for obtaining a voice recognition result corresponding to a user voice by analyzing a user voice.

The distance and object recognition module 522 may refer to a module for obtaining distance data to a specific position based on sensing data or identifying specific object data. The distance and object recognition module 522 may transmit distance data, object data, and the like to at least one of a direction vector analysis module 523 or a three-dimensional space analysis module 524.

Direction vector analysis module 523 may refer to a module for obtaining a direction vector based on sensing data, distance data, object data, or any other suitable data.

A three-dimensional space analysis module 524 may correspond to a module for generating and analyzing a three-dimensional space based on sensing data, distance data, object data, or any other suitable data.

The image correction module 525 may correspond to a module for performing at least one of a size change of an image, a resolution change of an image, a keystone correction, or a leveling correction. The image correction module 525 may receive sensing data, distance data, object data, or any other suitable data from the distance and object recognition module 522 or receive through at least one processor 111.

The projection setting module 526 may correspond to a module for setting projection ratio, focus, brightness, or the like.

The result information obtained by each module included in the software 520 may be transmitted back to the hardware 510.

The electronic apparatus 100 may obtain a user voice through the microphone 118. The microphone 118 may transmit the obtained user voice to at least one processor 111 in the form of digital data. The at least one processor 111 may transmit user voice or voice information obtained from the microphone 118 to the voice recognition module 521.

The speech recognition module 521 may analyze user speech obtained from at least one processor 111. The speech recognition module 521 may transmit a user command corresponding to the user voice to at least one processor 111 as a result of the analysis. The at least one processor 111 may control at least one of the projection unit 112, the driving unit 120, or the sensor unit 121 to perform an operation corresponding to the user command.

For example, according to a user command for projecting a projection image, at least one processor 111 may control the projection unit 112 to project a projection image. In addition, according to a user command for moving the electronic apparatus 100, at least one processor 111 may control the driving unit 120 to move the electronic apparatus 100. In addition, as a preset gesture of the user indicating the projection position is identified, the at least one processor 111 may control the sensor unit 121 to obtain sensing data for analyzing the surrounding space.

The sensor unit 121 may collect sensing data and transmit the sensing data to at least one processor 111. The at least one processor 111 may transmit sensing data to the distance and object recognition module 520. The distance and object recognition module 520 may recognize a distance and an object related to a space around the electronic apparatus 100.

The distance and object recognition module 520 may obtain at least one of distance data or object data as a recognition result. The distance and object recognition module 520 may transmit the recognition result back to the at least one processor 111. In addition, the distance and object recognition module 520 may transmit a recognition result to at least one of a direction vector analysis module 523, a three-dimensional space analysis module 524, or an image correction module 525. According to various embodiments, the distance and object recognition module 520 may transmit the received sensing data to at least one of a direction vector analysis module 523, a three-dimensional space analysis module 524, or an image correction module 525.

For example, the distance and object recognition module 520 may transmit coordinate information of the object to a direction vector analysis module 523. In addition, the distance and object recognition module 520 may transmit information on whether the object is identified to the three-dimensional space analysis module 524.

The direction vector analysis module 523 may transmit vector data indicating a direction to one of the three-dimensional (3D) space analysis module 524 or the projection setting module 526. The 3D space analysis module 524 may generate map data or spatial data related to a 3D space based on sensing data, distance data, object data, and the like. The three-dimensional stereoscopic space analysis module 524 may identify a projection position based on the map data.

The direction vector analysis module 523 may transmit the projection position to the at least one processor 111, the image correction module 525, or the projection setting module 526. The at least one processor 111 may control the projection unit 112 to project the projection image based on the identified projection position. The image correction module 525 may perform keystone correction, adjustment of an image size, based on the projection position. The projection setting module 526 may adjust the setting according to the projection position.

The image correction module 525 and projection setting module 526 may send result information related to the final projection environment to at least one processor 111. The at least one processor 111 may control the projection unit 112 according to the result information setting information, image information transmitted from the image correction module 525 and the projection setting module 526.

Figure 6:
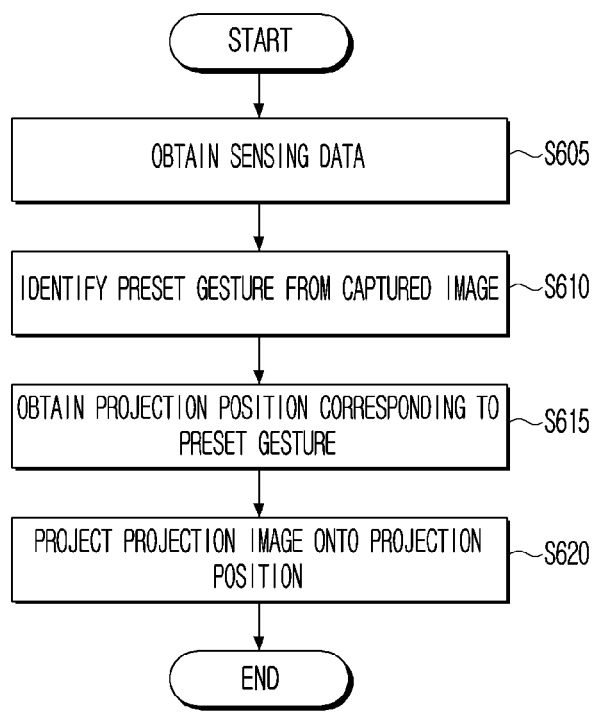
FIG. 6 is a flowchart for describing an operation of projecting a projection image according to a preset gesture of a user according to various embodiments.

FIG. 6 is a flowchart for describing an operation of projecting the projection image 20 according to a preset gesture of the user 10.

Referring to FIG. 6, the electronic apparatus 100 may obtain sensing data S605. The electronic apparatus 100 may obtain sensing data by using the sensor unit 121. In one or more examples, the sensor unit 121 may include an image sensor. Therefore, the electronic apparatus 100 may obtain sensing data through the image sensor.

According to various embodiments, various sensing data for determining a gesture of a user may be used. In one or more examples, the sensing data may include an image. According to various embodiments, the sensing data may include data simultaneously indicating a distance and an object.

The electronic apparatus 100 may identify a preset gesture from the sensing data in operation S610. The preset gesture may be stored in a memory of the electronic apparatus 100 in advance. The preset gesture may be changed according to a user's setting. The electronic apparatus 100 may analyze whether a preset gesture is included in the obtained sensing data.

In one or more examples, if a preset gesture is included in the sensing data, the electronic apparatus 100 may obtain a projection position corresponding to a preset gesture in operation S615. When a gesture indicating a specific direction by the user 10 is included in the sensing data, the electronic apparatus 100 may analyze which direction the user 10 points. The electronic apparatus 100 may obtain a projection position corresponding to a preset gesture.

In one or more examples, the electronic apparatus 100 may project the projection image 20 on the identified projection position in operation S620.

According to various embodiments, the projection position may correspond to a center value or a central point of the identified projection area. For example, if the projection area is a square shape, the projection position may be the center of the square. When the projection position corresponds to the median value, the projection image 20 may be projected according to the size and the projection position of the preset projection image 20.

According to various embodiments, a projection position may correspond to a projection area. When the projection position means the projection area, the electronic apparatus 100 may project the projection image 20 directly to the projection area.

Figure 7:
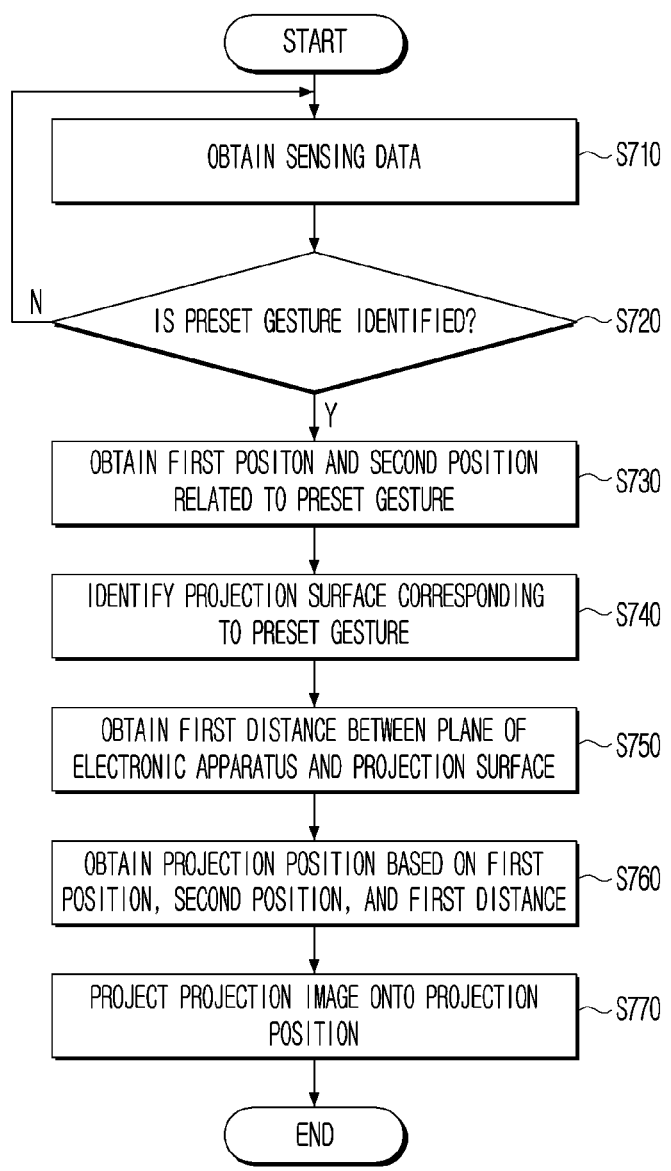
FIG. 7 is a flowchart for describing an operation of projecting a projection image to a projection position identified according to a preset gesture according to various embodiments.

FIG. 7 is a flowchart for describing an operation of projecting the projection image 20 to a projection position identified according to a preset gesture.

Referring to FIG. 7, the electronic apparatus 100 may obtain sensing data in operation S710. The electronic apparatus 100 may determine whether a preset gesture is identified in the sensing data in operation S720. For example, the electronic apparatus 100 may identify whether an object corresponding to a preset gesture among a plurality of objects included in the sensing data exists.

When a preset gesture is not identified from the sensing data operation in operation S720-N (e.g., "N" branch from operation S720), the electronic apparatus 100 may repeatedly obtain sensing data. In one or more examples, the electronic apparatus 100 may repeatedly obtain sensing data for a preset time to determine whether a preset gesture exists.

If a preset gesture is identified from the sensing data in operation S720-Y (e.g., "Y" branch from operation S720), the electronic apparatus 100 may obtain a first position p1 and a second position p2 related to a preset gesture in operation S730. In one or more examples, the first position p1 may correspond to a start position or a start point of a preset gesture. In one or more examples, the second position p2 may correspond to an end position or an end point of a preset gesture. In one or more examples, the first position p1 is one position for identifying the direction of a preset gesture, and the second position p2 may be the other position for identifying the direction of a preset gesture. The electronic apparatus 100 may identify a direction corresponding to a preset gesture based on a first position p1 and a second position p2. The positions p1 and p2 may correspond to different time points in obtained image sensor data. For example, position p1 may correspond to time point t1, and position p2 may correspond to time point t2 that occurs after t1. Positions p1 and p2 may be obtained in the same set of sensor data or different sets of sensor data.

The electronic apparatus 100 may identify a projection surface corresponding to a preset gesture in operation S740. A projection surface corresponding to a preset gesture may refer to a projection surface existing in a direction corresponding to a preset gesture. The projection surface may vary in a three-dimensional space. The electronic apparatus 100 may determine which projection surface the user 10 is pointing before determining the correct projection position. The projection surface may be a projection screen or any suitable surface for displaying a projected image. The electronic apparatus 100 may identify a direction corresponding to a preset gesture based on a first position p1 and a second position p2. In addition, the electronic apparatus 100 may specify a projection surface based on the identified direction.

In one or more examples, the electronic apparatus 100 may obtain a first distance $Dr\_x$, $Dr\_y$, $Dr\_z$ between the plane of the electronic apparatus 100 and the projection surface in operation S750. In one or more examples, the plane of the electronic apparatus 100 may correspond to a plane parallel to the projection surface with respect to the electronic apparatus 100. The plane of the electronic apparatus 100 may correspond to at least one of a plane $x\_y$ plane perpendicular to the z axis, a plane $x\_z$ plane perpendicular to the y axis, and a plane $y\_z$ plane perpendicular to the x axis based on the initial position p0 of the electronic apparatus 100.

Figure 17:
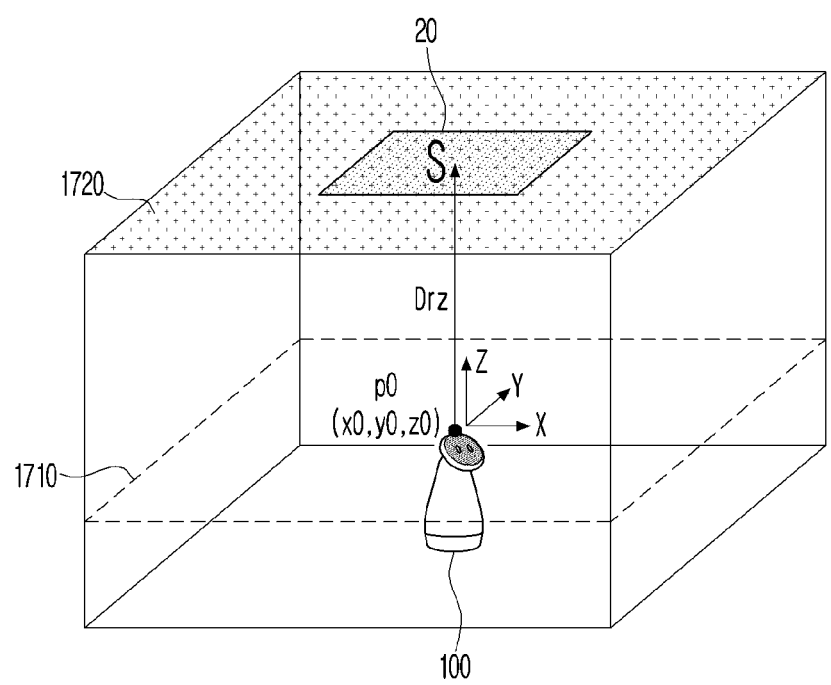
FIG. 17 is a diagram for describing a projection image projected in a Z-axis direction according to various embodiments.

A plane perpendicular to the z axis or $x\_y$ plane or $z=z0$ may be the plane 1710 of FIG. 17. A distance between a Z-axis plane 1710 of the electronic apparatus 100 and a projection surface in the z-axis direction may be $Dr\_z$.

Figure 24:
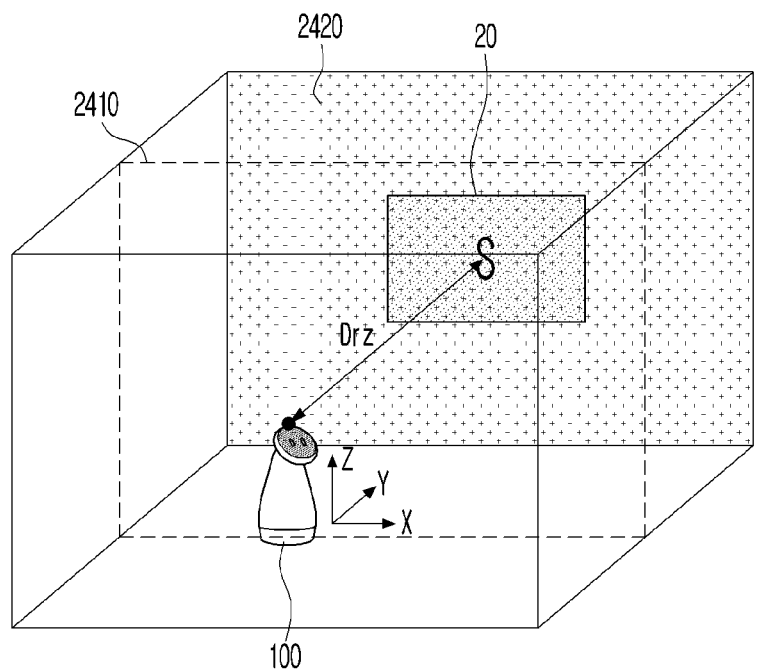
FIG. 24 is a diagram for describing a projection image projected in the y-axis direction.

The plane perpendicular to the y axis, or $x\_z$ plane or $y=y0$ may be the plane 2410 of FIG. 24. A distance between a y-axis plane 2410 of the electronic apparatus 100 and a projection surface in the y-axis direction may be $Dr\_y$.

Figure 30:
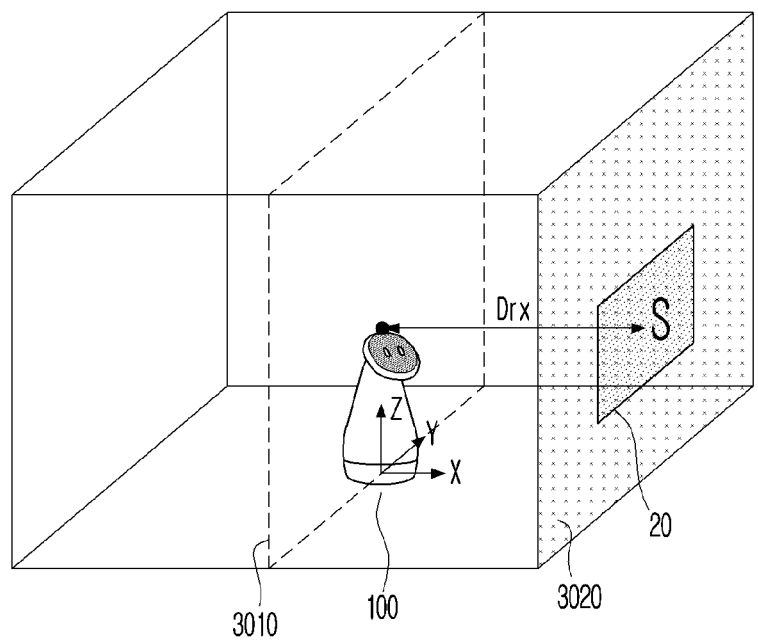
FIG. 30 is a diagram for describing a projection image projected in the x-axis direction according to various embodiments.

The plane perpendicular to the x-axis (or $y\_z$ plane or $x=x0$) may be the plane 3010 of FIG. 30. The distance from the x-axis plane 3010 to the projection surface in the x-axis direction of the electronic apparatus 100 may be $Dr\_x$.

The first distance from the plane of the electronic apparatus 100 to the projection surface may correspond to at least one of $Dr\_x$, $Dr\_y$, and $Dr\_z$. When the projection surface is one surface, the first distance may correspond to one value. However, according to various embodiments, when the projection surface includes two surfaces, a first distance may also have two values.

According to various embodiments, there may be a plurality of distances from the plane of the electronic apparatus 100 to the projection surface even when the projection surface is not flat. In this case, each distance is described as a first distance, a second distance, or any other suitable identification of a distance.

In one or more examples, the electronic apparatus 100 may obtain a projection position based on a first position p1, a second position p, and a first distance $Dr\_x$, $Dr\_y$, $Dr\_z$ in operation S760. A specific calculation operation related thereto is described in FIGS. 21, 27, and 33.

In one or more examples, the electronic apparatus 100 may project the projection image 20 based on the projection position in operation S770. After the projection position is identified, the electronic apparatus 100 may project the projection image 20 in consideration of a throw ratio, a focus, resolution, brightness, and the like, based on the projection position, FIG. 8 is a flowchart for describing an operation of identifying a projection position using a vector.

Figure 8:
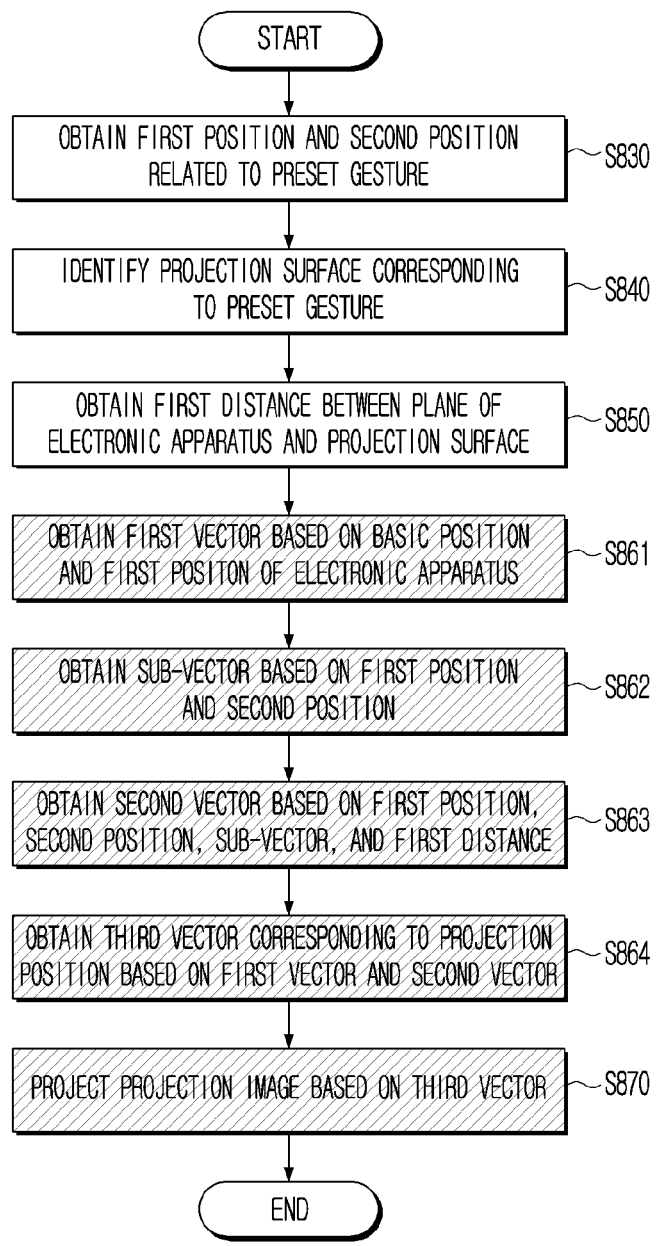
FIG. 8 is a flowchart for describing an operation of identifying a projection position using a vector according to various embodiments.

The operations S830, S840, and S850 of FIG. 8 may correspond to operations S730, S740, and S750 of FIG. 7, respectively. In one or more examples, operations S710 and S720 of FIG. 7 may be performed before step S830. Therefore, a redundant description thereof is omitted.

After a first position, a second position, and a first distance Dr_x, Dr_y, Dr_z are obtained, the electronic apparatus 100 may obtain a first vector V1 based on a initial position p0 and a first position p1 in operation S861. In one or more examples, the first vector V1 may correspond to a direction vector from the electronic apparatus 100 to the user 10.

The electronic apparatus 100 may obtain a sub-vector Vsub based on a first position p1 and a second position p2 in operation S862. In one or more examples, the sub-vector Vsub may indicate a direction indicated by the user 10.

In one or more examples, the electronic apparatus 100 may obtain a second vector V2 based on a first position p1, a second position p2, a sub-vector Vsub, and a first distance Dr_x, Dr_y, Dr_z in operation S863. In one or more examples, the second vector V2 may correspond to a direction vector from the user 10 to the projection position.

The electronic apparatus 100 may obtain a third vector V3 corresponding to the projection position p3 based on the first vector V1 and the second vector V2 in operation S864. In one or more examples, the third vector V3 may correspond to a direction vector from the electronic apparatus 100 to the projection position.

The electronic apparatus 100 may project the projection image 20 based on a third vector V3 in operation S870. The electronic apparatus 100 may determine a projection direction and a projection focus based on a third vector V3. In addition, the electronic apparatus 100 may perform keystone correction based on a third vector V3.

FIG. 9 is a flowchart for describing an operation of determining whether a projection position calculated matches an actual projection surface according to various embodiments.

The operations S930, S940, and S950 of FIG. 9 may correspond to operations S730, S740, and S750 of FIG. 7, respectively. In one or more examples, operations S710 and S720 of FIG. 7 may be performed before step S930. Therefore, a redundant description thereof is omitted.

After obtaining the first distance Dr_x1, Dr_y1, Dr_z1, the electronic apparatus 100 may obtain a first projection position based on the first position p1, the second position p2, and the first distance Dr_x1, Dr_y1, and Dr_z1 in operation S960.

The electronic apparatus 100 may identify whether a first projection position is included in projection plane coordinate information included in the sensing data in operation S961. The electronic apparatus 100 may identify whether the sensing data including the information on the actual projection surface matches the calculated first projection position.

When the first projection position is not included in the projection plane coordinate information included in the sensing data in operation S961-N (e.g., "N" branch of operation S961), the electronic apparatus 100 may obtain a second distance Dr_x2, Dr_y2, Dr_z2 between the plane of the electronic apparatus 100 and the projection surface in operation S962.

When the first projection position is not included in the projection plane coordinate information included in the sensing data, the electronic apparatus 100 may determine that the projection plane is not flat. For example, the electronic apparatus 100 may determine that there is a curve on a projection surface or determine that there is an obstacle on or near the projection surface. The electronic apparatus 100 may further determine that the projection surface includes two or more oblique surfaces.

The electronic apparatus 100 may obtain a second distance Dr_x2, Dr_y2, Dr_z2 based on a direction other than a direction obtained by obtaining a first distance Dr_x1, Dr_y1, Dr_z1.

According to various embodiments, the electronic apparatus 100 may obtain second distance Dr_x2, Dr_y2, Dr_z2 by analyzing the sensing data obtained at the same position.

According to various embodiments, the electronic apparatus 100 may obtain new sensing data by moving a position. In addition, the electronic apparatus 100 may obtain a second distance Dr_x2, Dr_y2, and Dr_z2 based on newly obtained sensing data.

In one or more examples, the electronic apparatus 100 may obtain a second projection position based on the first position p1, the second position p2, and the second distance Dr_x2, Dr_y2, and Dr_z2 in operation S963. The electronic apparatus 100 may project the projection image 20 based on the second projection position in operation S964.

FIG. 10 is a flowchart for describing an operation of determining whether a projection position calculated according to various embodiments matches an actual projection surface.

The operations S1030, S1040, S1050, S1060, and S1070 of FIG. 10 may correspond to operations S730, S740, S750, S760, and S770 of FIG. 7, respectively. In one or more examples, operation S710 and operation S720 of FIG. 7 may be performed before the operation S1030 is performed. Therefore, a redundant description thereof is omitted.

After the projection surface is identified, the electronic apparatus 100 may identify whether the distance between the projection surface and the plane of the electronic apparatus 100 parallel to the projection surface is constant in S1041.

In one or more examples, the plane of the electronic apparatus 100 may correspond to an imaginary plane perpendicular to the axis corresponding to the projection surface relative to the electronic apparatus. For example, the plane of the electronic apparatus 100 may correspond to at least one of z-axis plane 1710 of FIG. 17, y-axis plane 2410 of FIG. 24, and x-axis plane 3010 of FIG. 30.

If the distance between the plane and the projection surface of the electronic apparatus 100 is constant, the electronic apparatus 100 may identify that the projection surface is flat. In one or more examples, if the distance between the plane and the projection surface of the electronic apparatus 100 is not constant, the electronic apparatus 100 may identify that the projection surface is not flat. If the projection surface is not flat, a plurality of distances between the electronic apparatus 100 and the projection surface may be obtained because if the projection surface is not flat, the projection position may differ depending on which part of the projection surface is pointed to by the user 10.

If it is identified that the distance between the projection surface and the plane of the electronic apparatus 100 is not constant in operation S1041-N (e.g., "N" branch operation S1041), the electronic apparatus 100 may obtain the first distances Dr_x1, Dr_y1, Dr_z, and the second distances Dr_x2, Dr_y2, and Dr_z2 between the plane of the electronic apparatus 100 and the projection surface in operation S1042.

In one or more examples, the electronic apparatus 100 may obtain a first projection position based on first position p1, second position p2 and first distance Dr_x1, Dr_y1, and Dr_z1 in operation S1043. In addition, the electronic apparatus 100 may obtain a second projection position based on the first position p1, the second position p2, and the second distance Dr_x2, Dr_y2, and Dr_z2 in operation S1044.

In one or more examples, the electronic apparatus 100 may obtain three-dimensional coordinate information of the projection surface based on the sensing data in operation S1045. In one or more examples, the sensing data may refer to data obtained through a distance sensor or a LiDAR sensor. The electronic apparatus 100 may analyze a space in which the electronic apparatus 100 is disposed, based on the sensing data. The electronic apparatus 100 may obtain three-dimensional coordinate information of the entire space as an analysis result. In addition, the electronic apparatus 100 may obtain three-dimensional coordinate information of the projection surface from the entire three-dimensional coordinate information.

The electronic apparatus 100 may project the projection image 20 to a projection position included in the three-dimensional coordinate information of the projection surface from among the first projection position and the second projection position in operation S1046. One of the first projection position or the second projection position may be present on the projection surface. However, the other one of the first projection position or the second projection position may be calculated as a position other than the actual projection surface. Therefore, the electronic apparatus 100 may identify an accurate position based on three-dimensional coordinate information of the projection surface.

An example embodiment of determining a shape of a projection surface will be described in FIGS. 22, 23, 28, 29, 34, and 35.

If it is identified that the distance between the projection surface and the plane of the electronic apparatus 100 is constant, the electronic apparatus 100 may perform operations S1041-Y (e.g., "Y" branch of operation S1041), and the electronic apparatus 100 may perform operations S1050, S1060, and S1070.

FIG. 11 is a flowchart for describing an operation of determining whether a projection position calculated matches an actual projection surface according to various embodiments.

In FIG. 11, operations S1130, S1140, S1141, S1142, S1143, S1150, S1160, and S1170 may correspond to operations S930, S940, S941, S942, S943, S950, S960, and S970 of FIG. 9, respectively. In one or more examples, operations S710 and S720 of FIG. 7 may be performed before operation S1130. Therefore, a redundant description thereof is omitted.

After the operation of obtaining the first projection position in operation S1143, the electronic apparatus 100 may obtain three-dimensional coordinate information of the projection surface based on the sensing data in operation S1144. The description related to the three-dimensional coordinate information may correspond to operation S945 of FIG. 9. Therefore, a redundant description thereof is omitted.

In one or more examples, the electronic apparatus 100 may identify whether the first projection position is included in the three-dimensional coordinate information of the projection surface in operation S1145. If the first projection position is included in the three-dimensional coordinate information of the projection surface in operation S1145-Y (e.g., "Y" branch of operation S1145), the electronic apparatus 100 may project the projection image 20 to the first projection position in operation S1146.

If the three-dimensional coordinate information of the projection surface does not include the first projection position in operation S1145-N (e.g., "N" branch of operation S1145), the electronic apparatus 100 may identify the second projection position based on the first position p1, second position p2, and the second distance Dr_x2, Dr_y2, and Dr_z2 in operation S1147. The electronic apparatus 100 may project the projection image 20 to the second projection position in operation S1148.

Figure 12:
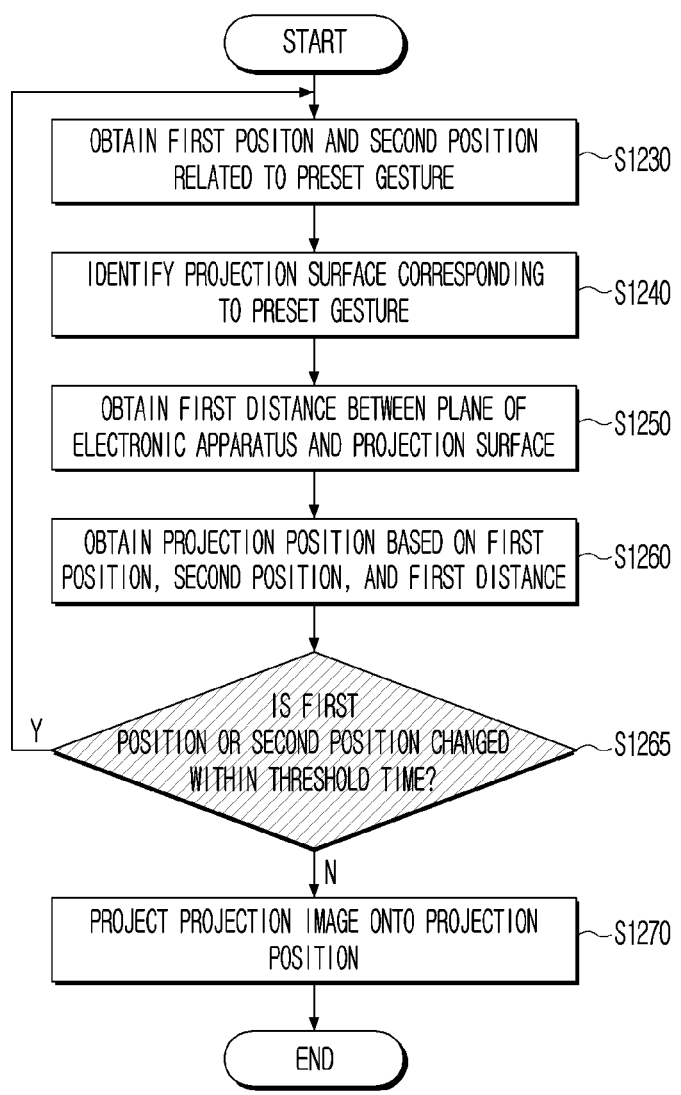
FIG. 12 is a flowchart for describing an operation of determining whether a preset gesture is maintained for a threshold time according to various embodiments.

FIG. 12 is a flowchart for describing an operation of determining whether a preset gesture is maintained for a threshold time.

The operations S1230, S1240, S1250, S1260, S1270 of FIG. 12 may correspond to S730, S740, S750, S760, S770 of FIG. 7, respectively. In one or more examples, operations S710 and S720 of FIG. 7 may be performed before operation S1230. Therefore, a redundant description thereof is omitted.

After obtaining the projection position, the electronic apparatus 100 may identify whether the first position p1 or the second position p2 is changed within a threshold time in operation S1265. The electronic apparatus 100 may identify whether the user 10 maintains a preset gesture for a threshold time. The electronic apparatus 100 needs to determine whether the user 10 maintains the same preset gesture for a critical time since a preset gesture may be taken by chance. Since the first position p1 and the second position p2 correspond to a position corresponding to a preset gesture, the electronic apparatus 100 may track the first position p1 or the second position p2.

When the first position p1 or the second position p2 is changed within a threshold time, S1265-Y (e.g., "Y" branch of operation S1265), and the electronic apparatus 100 may repeat operations S1230 to S1265. The electronic apparatus 100 may determine that the user 10 does not maintain a preset gesture even if only one of the first position p1 or the second position p2 is changed.

If the first position p1 and the second position p2 are not changed within the threshold time in operation S1265-N (e.g., "N" branch of operation 1265), the electronic apparatus 100 may project the projection image 20 at the projection position in operation S1270. When both the first position p1 and the second position p2 are not changed, the electronic apparatus 100 may determine that the user 10 has maintained a preset gesture.

The operation S1265 described in FIG. 12 may be replaced with an operation of identifying whether the first position p1 or the second position p2 is moved in a preset direction according to various embodiments.

After obtaining the projection position, the electronic apparatus 100 may identify whether the first position p1 or the second position p2 is moved in a preset direction. The electronic apparatus 100 may identify whether the user 10 maintains a preset gesture according to the movement of a preset gesture. Since the first position p1 and the second position p2 correspond to a predetermined gesture, the electronic apparatus 100 may track the first position p1 or the second position p2.

In one or more examples, the preset direction may correspond to a direction opposite to the direction from the user 10 to the projection surface. For example, the preset direction may refer to a direction opposite to a direction from the user 10 toward the projection surface. In one or more examples, the opposite direction may be determined based on an axis corresponding to the projection surface with respect to the electronic apparatus.

For example, it is assumed in Example 1810 of FIG. 18 that an axis corresponding to the projection surface is a z-axis and a preset gesture indicates a positive direction of the z-axis. In one or more examples, the preset direction may refer to a negative direction of the z-axis. When the Z value of the first position p1 and the second position p2 decreases, the electronic apparatus 100 may identify that a preset gesture moves in a preset direction. The preset direction may correspond to any one of a plurality of directions in a 360 degree space.

When the first position p1 and the second position p2 are not moved to a preset direction, the electronic apparatus 100 may repeat operations S1230 to S1265 (e.g., "Y" branch of operation S1265).

When the first position p1 and the second position p2 move in a preset direction (e.g., "N" branch of operation S1265), the electronic apparatus 100 may project the projection image 20 at the projection position in operation S1270. When the first position p1 and the second position p2 are moved in a preset direction, the electronic apparatus 100 may determine that a preset gesture has ended. Therefore, the electronic apparatus 100 can stop a tracking operation for a preset gesture and output the projection image 20.

Figure 13:
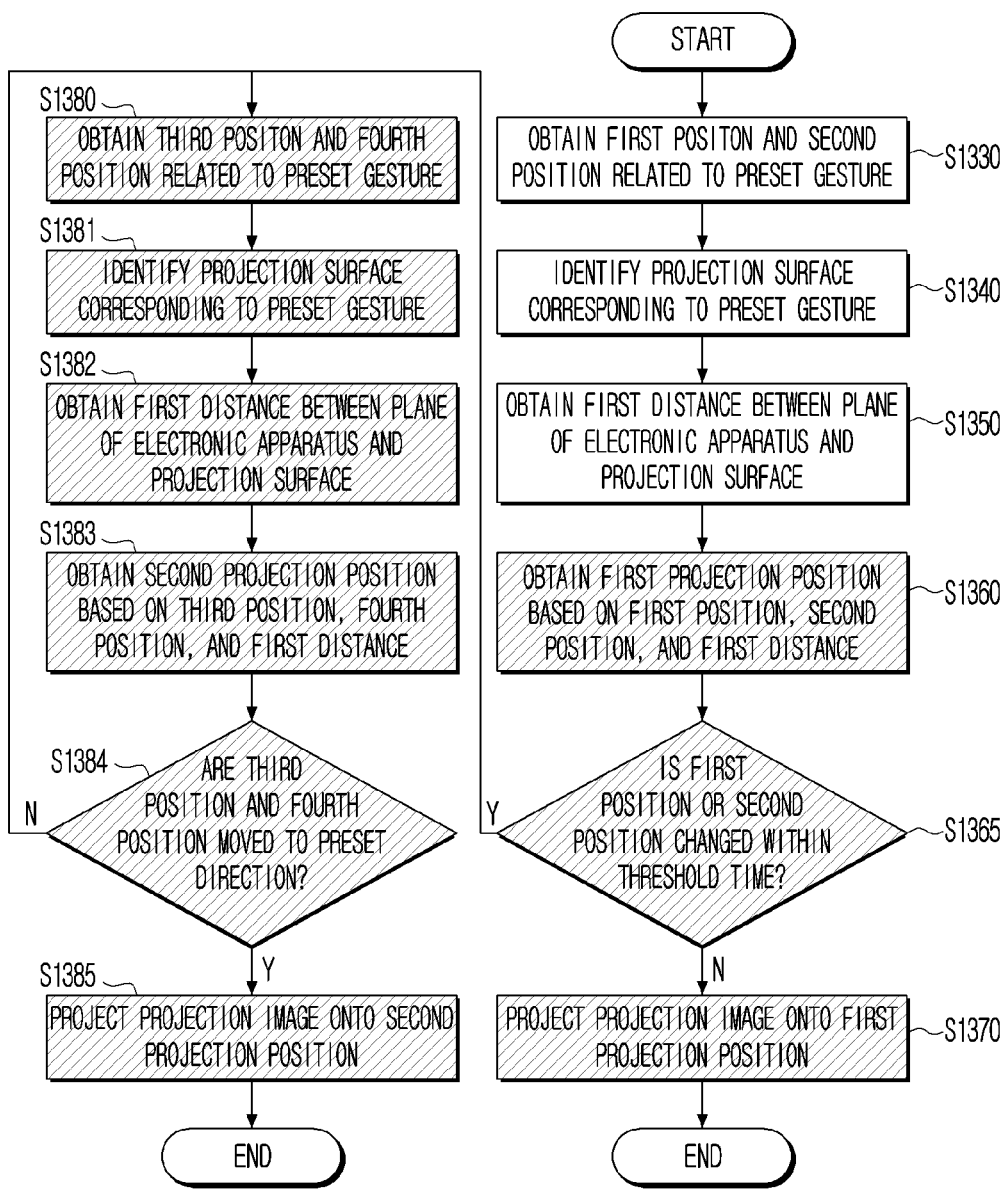
FIG. 13 is a flowchart for describing an operation of determining whether a preset gesture is maintained for a threshold time or a preset direction according to various embodiments.

FIG. 13 is a flowchart for describing an operation of determining whether a preset gesture is maintained for a threshold time or a preset direction.

The operations S1330, S1340, and S1350 of FIG. 13 may correspond to operations S730, S740, and S750 of FIG. 7, respectively. In one or more examples, operations S710 and S720 of FIG. 7 may be performed before operation S1330. Therefore, a redundant description thereof is omitted.

After obtaining the first distance, the electronic apparatus 100 may obtain a first projection position based on the first position p1, the second position p2, and the first distance Dr_x, the Dr_y, and the Dr_z in operation S1360. In addition, the electronic apparatus 100 may identify whether the first position p1 or the second position p2 is changed within a threshold time in operation S1365. Since a position change operation is described in FIG. 11 within a threshold time, a redundant description is omitted.

If the first position p1 and the second position P2 are not changed within a threshold time in operation S1365-N (e.g., "N" branch of operation S1365), the electronic apparatus 100 may project the projection image 20 at the first projection position in operation S1370.

When the first position p1 or the second position p2 is changed within a threshold time in operation S1365-Y (e.g., "Y" branch of operation S1365), the electronic apparatus 100 may identify a third position and a fourth position related to a preset gesture in operation S1380. Since the position of a preset gesture is changed, the electronic apparatus 100 may need to determine a newly projected position.

In one or more examples, the electronic apparatus 100 may identify a projection surface corresponding to a preset gesture in operation S1381. The operation S1381 may refer to an operation of performing the operation S1340 again.

In one or more examples, the electronic apparatus 100 may obtain a first distance between the plane of the electronic apparatus 100 and the projection surface in operation S1382. The operation S1382 may refer to an operation of performing operation S1350 again. For example, the operation of S1350 may be repeated within operation S1382. If the position of the electronic apparatus 100 is not changed, the first distance of operation S1350 and the first distance of operation S1382 may be the same. If the position of the electronic apparatus 100 is changed, the first distance in operation S1350 and the first distance of operation S1382 may have different values.

In one or more examples, the electronic apparatus 100 may identify the second projection position based on the third position, the fourth position, and the first distance in operation S1383. In addition, the electronic apparatus 100 may identify whether the third position and the fourth position move in a preset direction in operation S1384. An operation of determining whether a preset gesture is moved in a preset direction has been described with reference to FIG. 13, and thus a redundant description thereof is omitted.

If the third position and the fourth position do not move in a preset direction in operation S1384-N (e.g., "N" branch of operation S1384), the electronic apparatus 100 may repeat operations S1380 to S1384.

When the third position and the fourth position move in a preset direction in operation S1384-Y (e.g., "Y" branch of operation S1384), the electronic apparatus 100 may project a projection image to a second projection position in operation S1385.

Figure 14:
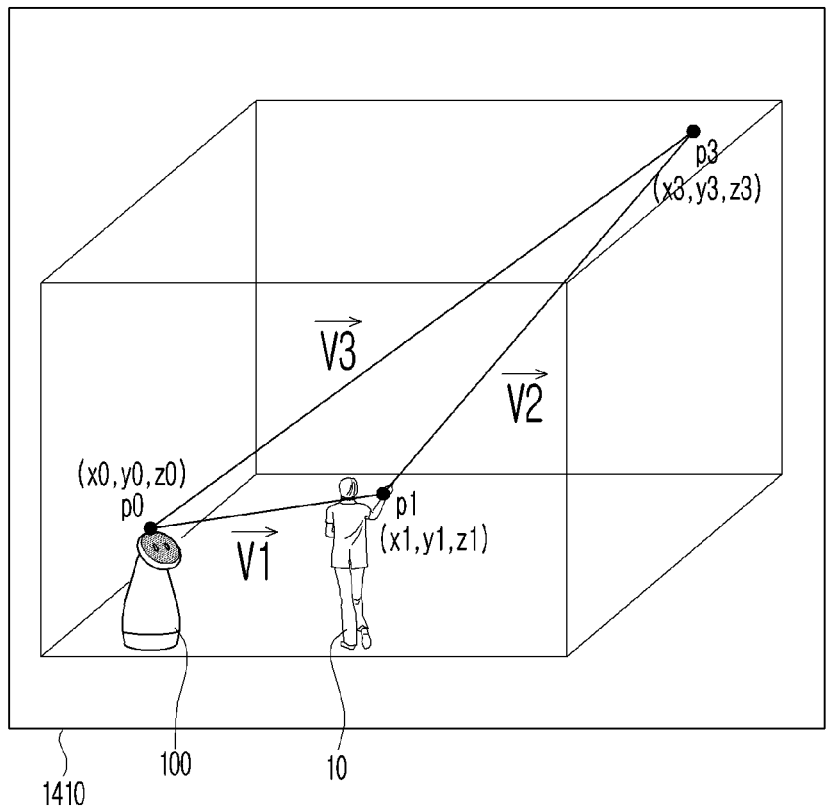
FIG. 14 is a diagram for describing a projection position corresponding to a preset gesture according to various embodiments.

FIG. 14 is a diagram for describing a projection position corresponding to a preset gesture.

The embodiment 1410 of FIG. 14 assumes that the user 10 has taken a preset gesture. In one or more examples, the preset gesture may correspond to a gesture indicating a specific direction with the index finger. The position of the electronic apparatus 100 may be set as an initial position p0. The position of the user 10 may be set to a first position p1 corresponding to a preset gesture. The position indicated by user 10 may be set to projection position p3.

The electronic apparatus 100 may obtain a first vector V1 based on the initial position p0 and the first position p1. In one or more examples, the first vector V1 may indicate a direction from the initial position p0 to the first position p1.

The electronic apparatus 100 may obtain a second vector V2. In one or more examples, the second vector V2 may indicate a direction from the first position p1 to the projection position p3. In one or more examples, a specific calculation process for obtaining the second vector V2 is described in FIG. 15.

The electronic apparatus 100 may obtain a third vector V3 based on the first vector V1 and the second vector V2. According to various embodiments, the electronic apparatus 100 may obtain a third vector V3 based on an initial position p0 and a projection position p3. In one or more examples, the third vector V3 may indicate the direction from the initial position p0 to the projection position p3.

Equation 1420 of FIG. 14 may be V3=V1+V2. Equation 1420 indicates that a third vector V3 may be obtained when the first vector V1 and the second vector V2 are summed.

FIG. 15 is a diagram for describing a process of calculating a projection position corresponding to a preset gesture.

Referring to the embodiment 1510 of FIG. 15, the electronic apparatus 100 may obtain a first position p1 and a second position p2 corresponding to a preset gesture. In one or more examples, the first position p1 may correspond to a start position of a preset gesture, for example, a wrist. In one or more examples, the second position p2 may correspond to an end position of a preset gesture, for example, a detection fingertip portion or a nail portion. The electronic apparatus 100 may identify a sub-vector Vsub based on a first position p1 and a second position p2. In one or more examples, the first position p1 and the second position p2 may be determined based on performing image recognition of obtained sensor data to identify the wrist and fingertip.

Referring to the embodiment 1520 of FIG. 15, the electronic apparatus 100 may extend the sub-vector Vsub to obtain a second vector V2. In one or more examples, the second vector V2 may indicate a direction from the first position p1 to the projection position p3. The electronic apparatus 100 needs to determine whether to extend the sub-vector Vsub by a factor. In one or more examples, the direction of the sub vector Vsub and the direction of the second vector V2 may be the same. A specific calculation process related thereto is described in FIGS. 21, 27, and 33.

In FIG. 15, a preset gesture is illustrated as indicating a specific direction with a finger. However, according to various embodiments, a preset gesture may be a gaze facing a specific direction. The electronic apparatus 100 may obtain an image including an eye of the user 10. For example, the electronic apparatus 100 may analyze an iris position of the user 10 based on the image. The electronic apparatus 100 may calculate a projection position corresponding to a preset gesture based on the iris position.

According to various embodiments, the preset gesture may be a head posture looking in a specific direction of the user 10. In one or more examples, head posture may correspond to turning the head in a certain direction or facing the body. The electronic apparatus 100 may obtain an image including ahead. The electronic apparatus 100 may determine which direction the head is pointing in based on the image.

For example, the electronic apparatus 100 may obtain a sub-vector Vsub by setting the back part of the head to the first position p1 and the front part of the head to the second position p2. In addition, the electronic apparatus 100 may obtain a subvector Vsub by setting one portion of the nose to the first position p1 and the other portion of the nose to the second position p2. In addition, the electronic apparatus 100 may obtain a subvector Vsub by setting one part of the ear to the first position p1 and the other part of the ear to the second position p2. In one or more examples, the preset gesture may correspond to a walking direction of the user. In one or more examples, the preset gesture may correspond to a speed of movement of the user (e.g., the preset gesture is identified if user is moving at or above a specific speed).

FIG. 16 is a diagram for describing a reference coordinate and a rotation angle related to the electronic apparatus 100.

Embodiment 1610 of FIG. 16 is a graph defining a rotation direction along the x, y, and z axes. Rotating around the x-axis may be defined as roll, rotating around the y-axis may be defined as pitch, and rotating around the z-axis may be defined as yaw.

Embodiment 1620 of FIG. 16 may describe the rotation direction of the electronic apparatus 100 in the rotation direction defined in Embodiment 1610. The x-axis rotation information of the electronic apparatus 100 may correspond to a roll rotating based on the x-axis of the electronic apparatus 100. The y-axis rotation information of the electronic apparatus 100 may correspond to a pitch rotating based on the y-axis of the electronic apparatus 100. The z-axis rotation information of the electronic apparatus 100 may correspond to a yaw rotating based on the z-axis of the electronic apparatus 100.

In one or more examples, the x-axis rotation information may be described as first axis rotation information, first axis tilt information, or horizontal skew information. In addition, the y-axis rotation information may be described as second axis rotation information, second axis tilt information, or vertical tilt information. In addition, the z-axis rotation information may be described as third axis rotation information, third axis tilt information, or horizontal tilt information.

The sensor unit 121 may obtain state information or inclination information of the electronic apparatus 100. In one or more examples, the state information of the electronic apparatus 100 may correspond to a rotation state of the electronic apparatus 100. In one or more examples, the sensor unit 121 may include at least one of a gravity sensor, an acceleration sensor, or a gyro sensor. The x-axis rotation information of the electronic apparatus 100 and the y-axis rotation information of the electronic apparatus 100 may be determined based on sensing data obtained through the sensor unit 121. In one or more examples, the z-axis rotation information may be obtained based on whether or not the z-axis rotation information has been rotated by a factor according to the movement of the electronic apparatus 100.

According to various embodiments, the z-axis rotation information may indicate whether the z-axis rotation information has been rotated by a factor of a z-axis for a preset time. For example, the z-axis rotation information may indicate whether the electronic apparatus 100 is rotated by a factor of a z-axis at a second time point based on a first time point.

FIG. 17 is a diagram for describing a projection image projected in a z-axis direction.

Referring to FIG. 17, the electronic apparatus 100 may project a projection image in a z-axis direction. In one or more examples, the electronic apparatus 100 may obtain a distance Dr_z from a plane 1710 of the electronic apparatus 100 to a projection surface 1720.

In one or more examples, a plane of the electronic apparatus 100 may refer to an x_y plane according to an initial position p0 of the electronic apparatus 100. In one or more examples, the x_y plane may correspond to z=z0. In one or more examples, a projection surface 1720 may refer to a surface on which the projection image 20 is output. In one or more examples, the projection surface 1720 may corresponding to a ceiling in a room.

The electronic apparatus 100 may obtain a distance Dr_z from the plane 1710 to the projection surface 1720 of the electronic apparatus 100 based on sensing data obtained through the sensor unit 121. In one or more examples, the sensor unit 121 may include at least one of a distance sensor, a LiDAR sensor, or a 3D camera depth camera.

When the floor surface and the projection surface 1720 are flat, the distance Dr_z from the plane 1710 to the projection surface 1720 of the electronic apparatus 100 may be the same regardless of the position of the electronic apparatus 100.

FIG. 18 is a diagram for describing an operation of calculating a projection position based on the position of the electronic apparatus 100 when a projection surface is present in the z-axis direction, according to various embodiments.

The embodiment 1810 of FIG. 18 indicates that the projection surface is perpendicular to the z-axis of the electronic apparatus 100. The electronic apparatus 100 may obtain a first vector V1 indicating a direction from an initial position p0 of the electronic apparatus 100 to a first position p1 corresponding to a preset gesture. The electronic apparatus 100 may obtain a second vector V2 indicating a direction from a first position p1 to a projection position p3. The electronic apparatus 100 may obtain a third vector V3 indicating a direction from an initial position p0 to a projection position p3. The electronic apparatus 100 may output the projection image 20 on the projection surface based on a third vector V3.

Embodiment 1820 of FIG. 18 may represent x_z coordinate system of Embodiment 1810. The origin of the x_z coordinate system is assumed to be the initial position p0.

The z-axis distance between the x_y plane and the projection surface of the base position p0 may be Dr_z. The distance between the plane x_y plane and the projection surface of the electronic apparatus 100 may be Dr_z.

The z-axis distance between the x_y plane of the first position p1 and the projection surface may be Du_z. The distance between the plane x_y plane of the preset gesture and the projection surface may be Du_z.

In addition, the z-axis distance between the x_y plane of the initial position p0 and the x_y plane of the first position p1 may be $\Delta z$. A distance between a plane x_y plane of the electronic apparatus 100 and a plane xy of a preset gesture may be $\Delta z$.

Equation 1830 of FIG. 18 shows a method for calculating Du_z, which is the z-axis distance between the x_y plane of the first position p1 and the projection surface.

The distance Du_z may be obtained by subtracting $\Delta z$ from the distance Dr_z (Du_z=Dr_z−$\Delta z$).

The electronic apparatus 100 may obtain the distance Dr_z and first position p1 based on the sensing data.

$\Delta z$ may be z1−z0. In one or more examples, z0 is assumed to be the origin, so $\Delta z$ may be z1.

The electronic apparatus 100 may obtain a distance Du_z by subtracting z1, which is the z value of the first position p1, from the distance Dr_z (Du_z=Dr_z−z1).

Figure 19:
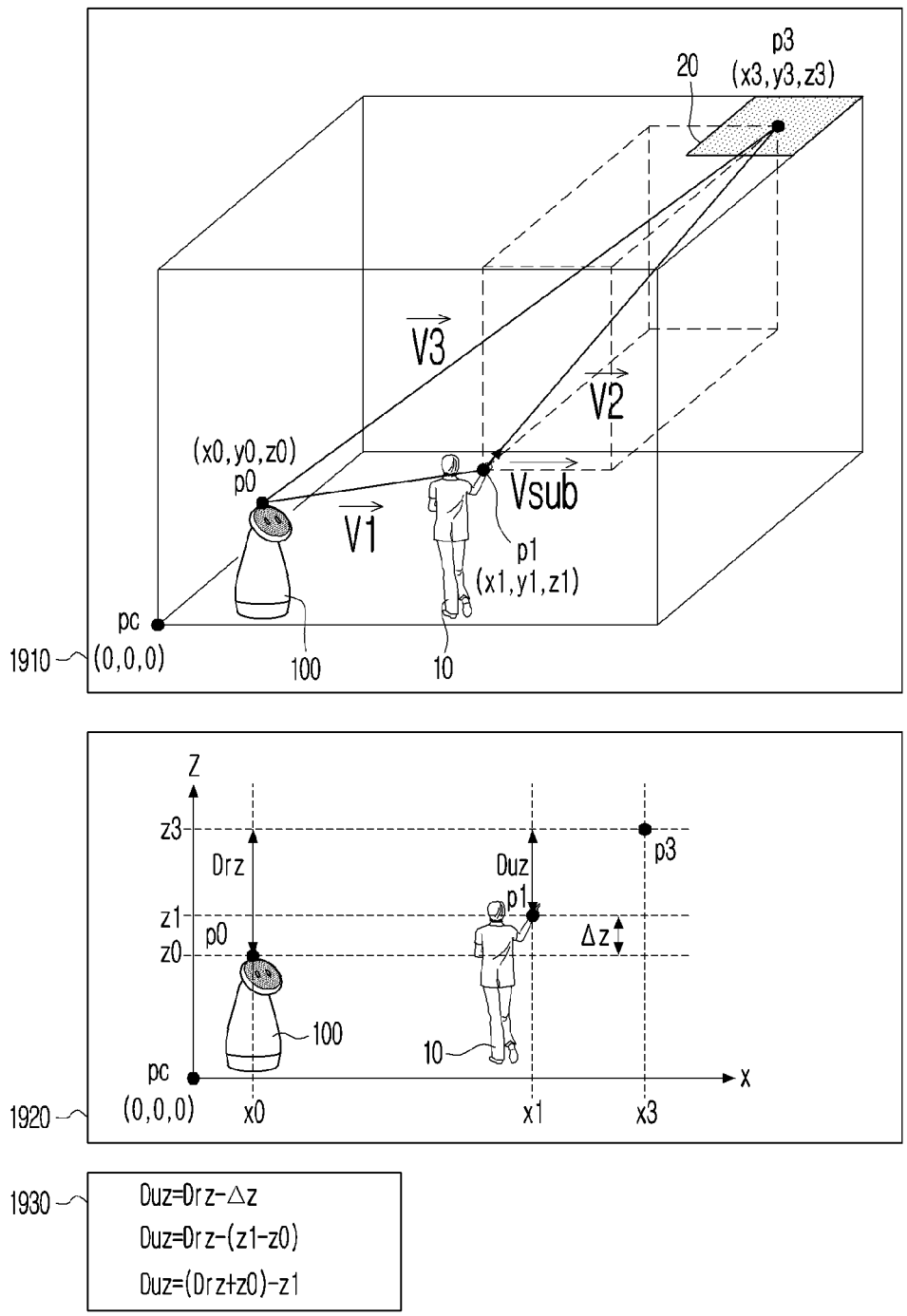
FIG. 19 is a diagram for describing an operation of calculating a projection position when a projection surface is present in a z-axis direction, according to various embodiments.

FIG. 19 is a diagram for describing an operation of calculating a projection position when a projection surface is present in a z-axis direction, according to various embodiments.

Embodiment 1910 of FIG. 19 may correspond to embodiment 1810 of FIG. 18. Thus, a duplicate description will be omitted.

Embodiment 1920 of FIG. 19 may represent the x_z coordinate system of Embodiment 1910. The origin of the x_z coordinate system assumes the floor position pc at the corner of the space in which the electronic apparatus 100 is placed. Since the calculation method of distance Du_z is described in Example 1820 of FIG. 18, duplicate descriptions are omitted.

Equation 1930 of FIG. 19 represents a method of calculating Du_z which is the z-axis distance between x_y plane and the projection surface of the first position p1.

The distance Du_z may be obtained by subtracting $\Delta z$ from the distance Dr_z (Du_z=Dr_z−$\Delta z$).

The electronic apparatus 100 may obtain the distance Dr_z, initial position p0, and first position p1 based on the sensing data.

$\Delta z$ may be z1−z0. The electronic apparatus 100 may obtain $\Delta z$ by subtracting z0, which is the z value of the initial position p0, from z1, which is the z value of the first position p1.

The electronic apparatus 100 may obtain the distance Du_z by subtracting $\Delta z$ from the distance Dr_z (Du_z=Dr_z−z1−z0).

In addition, the electronic apparatus 100 may obtain the distance Du_z by adding z0 and subtracting z1 from the distance Dr_z. As a result, the electronic apparatus 100 may obtain a distance Du_z by subtracting z1, the z value of the first position p1, from the total length Dr_z+z0 to the opposite surface of the projection surface and the opposite surface of the projection surface (Du_z=Dr_z+z0−z1).

In one or more examples, x0, y0, z0 representing the initial position p0; x1, y1, z1 representing the first position p1; x3, y3, z3 representing the projection position p3 of FIG. 18 may have different absolute values of x0, y0, z0 representing the initial position p0; x1, y1, z1 representing the first position p1, and x3, y3, z3 representing the projection position p3. This is because the reference positions are different. The same symbol is used for ease of understanding, and in fact, the value used may vary depending on the standard. Hereinafter, for convenience of understanding, it is assumed that the origin of the x_z coordinate system is the floor position pc of the edge of space.

Figure 20:
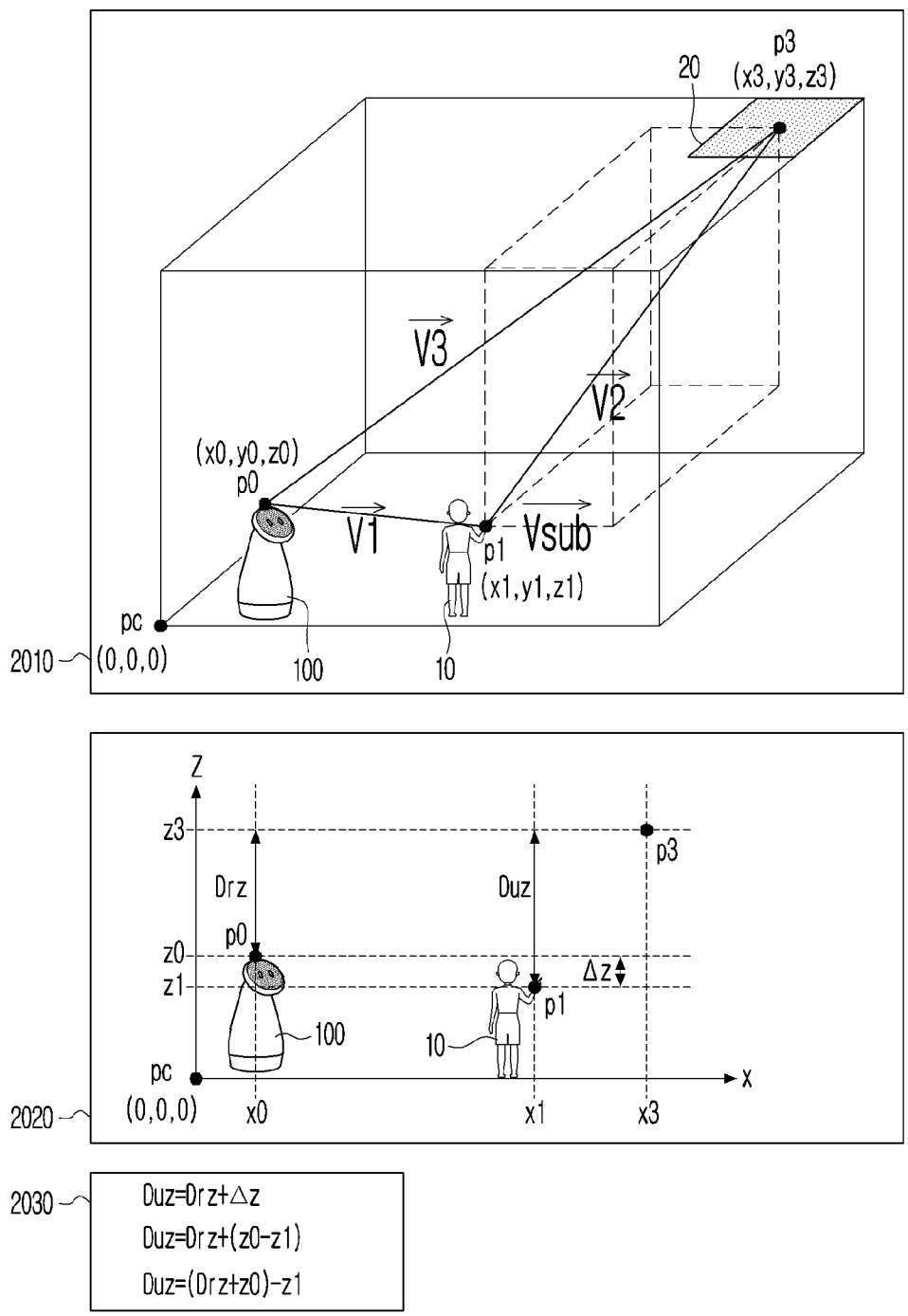
FIG. 20 is a diagram for describing an operation of calculating a projection position when a projection surface is present in a z-axis direction, according to various embodiments.

FIG. 20 is a diagram for describing an operation of calculating a projection position when a projection surface is present in a z-axis direction, according to various embodiments.

The embodiment 2010 and embodiment 2020 of FIG. 20 may correspond to the embodiment 1910 and 1920 of FIG. 19. Therefore, a redundant description thereof is omitted.

Unlike FIG. 19, FIG. 20 assumes a situation in which the z value of the first position p1 corresponding to the preset gesture is lower than the z value of the initial position p0 corresponding to the electronic apparatus 100.

The mathematical formula 2030 of FIG. 20 indicates a method for calculating a distance Du_z, which is the z-axis distance between the x_y plane of the first position p1 and the projection surface.

The distance Du_z may be obtained by adding $\Delta z$ to the distance Dr_z (Du_z=Dr_z+$\Delta z$).

The electronic apparatus 100 may obtain the distance Dr_z, initial position p0, and first position p1 based on sensing data.

$\Delta z$ may be z0−z1. The electronic apparatus 100 may obtain $\Delta z$ by subtracting z1, the z value of the first position p1, from z0, which is the z value of the initial position p0.

Therefore, the electronic apparatus 100 may obtain the distance Du_z by adding $\Delta z$ to the distance Dr_z (Du_z=Dr_z+z0−z1).

In addition, the electronic apparatus 100 may obtain the distance Du_z by adding z0 and subtracting z1 from the distance Dr_z. As a result, the electronic apparatus 100 may obtain a distance Du_z by subtracting z1, the z value of the first position p1, from the total length Dr_z+z0 to the opposite surface of the projection surface and the opposite surface of the projection surface (Du_z=Dr_z+z0−z1).

Figure 21:
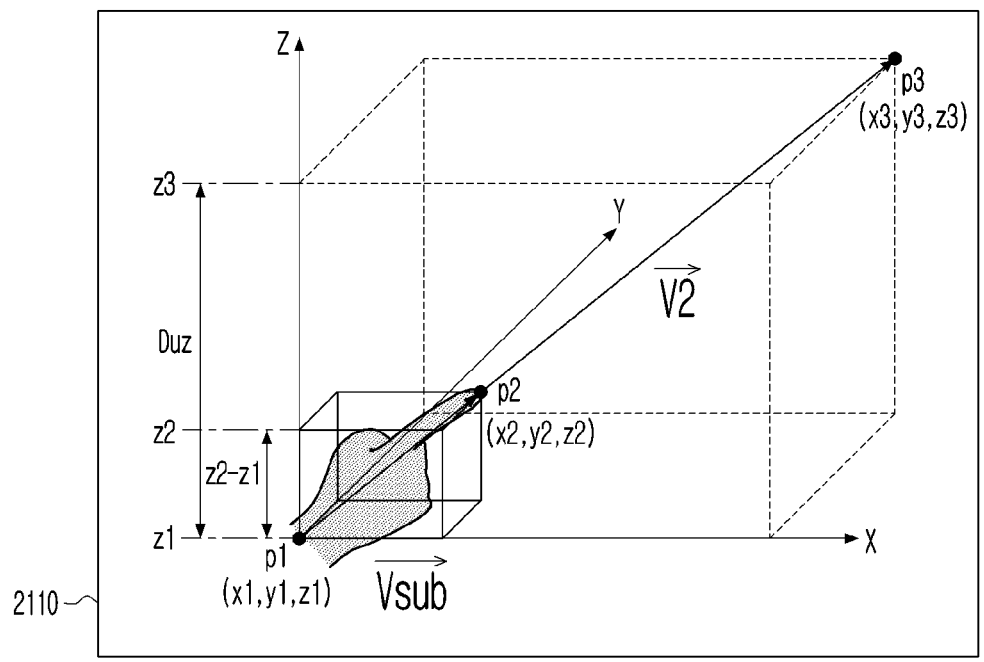
FIG. 21 is a diagram for describing an operation of calculating a vector corresponding to a preset gesture when a projection surface is present in a z-axis direction, according to various embodiments.

FIG. 21 is a diagram for describing an operation of calculating a vector corresponding to a preset gesture when a projection surface is present in a z-axis direction, according to various embodiments.

Embodiment 2110 of FIG. 21 is an xyz coordinate system representing subvector Vsub and the second vector V2.

In one or more examples, the first position p1 may correspond to the starting position of a preset gesture, for example, the wrist. In one or more examples, the second position p2 may correspond to the end position of a preset gesture, for example, an index fingertip or a nail portion. The electronic apparatus 100 may identify a subvector Vsub based on the first position p1 and the second position p2.

In one or more examples, the second vector V2 may indicate the direction from the first position p1 to the projection position p3. In one or more examples, the direction of the subvector Vsub and the direction of the second vector V2 may be the same.

The electronic apparatus 100 may obtain the z-axis distance Du_z between the x_y plane of the first position p1 and the projection surface.

The electronic apparatus 100 may obtain the absolute difference |z2−z1| between z2 which is the z-axis value of the second position p2 and the z1, which is the z-axis value of the first position p1.

The electronic apparatus 100 may expand the sub-vector Vsub according to the distance Du_z and the size proportional to the difference value |z2−z1|.

Equation 2120 of FIG. 21 refers to a calculation formula for obtaining the z-axis distance Du_z between the x_y plane of the first position p1 and the projection surface. Since related contents are described in FIGS. 18 to 20, duplicate descriptions are omitted.

Equation 2130 of FIG. 21 corresponds to the calculation formula of the second vector V2. The electronic apparatus 100 may obtain the second vector V2 by multiplying the subvector Vsub by the distance Du_z and dividing the difference |z2−z1| (V2=Vsub*Du_z/|z2−z1|). In one or more examples, Du_z/|z2−z1| may correspond to the expansion ratio. In one or more examples, the expansion ratio Du_z/|z2−z1| may be greater than 1.

Equation 2140 of FIG. 21 corresponds to the calculation formula of the projection position p3. The electronic apparatus 100 may obtain a projection position p3 based on coordinates (x1, y1, z1) of the first position p1, coordinates (x2, y2, z2) of the second position p2, distance Du_z and the difference value |z2−z1|.

For example, the electronic apparatus 100 may obtain a coordinate difference (x2−x1, y2−y1, z2−z1) of the second position p2 and the first position p1. The electronic apparatus 100 may obtain coordinates (x3, y3, z3) by adding coordinates (x1, y1, z1) to the coordinate difference (x2−x1, y2−y1, z2−z1) multiplied by the extension ratio Du_z/|z2−z1| ([x3,y3,z3=x1,y1,z1+x2−x1,y2−y1,z2−z1*Du_z/|z2−z1|]).

FIG. 22 is a diagram for describing an operation of calculating a projection position when a projection surface which is not flat in a z-axis direction exists, according to various embodiments.

Referring to FIG. 22, the projection surface may not be flat. For example, the projection surface may be divided into a first projection surface 2211 and a second projection surface 2212. For example, the distance of the first projection surface 2211 and the distance of the second projection surface 2212 may be different from each other. The first distance from the bottom surface to the first projection surface 2211 and the second distance from the bottom surface to the second projection surface 2212 may be different from each other.

In addition, the distance Dr_z1 from the x_y plane of the first position p1 to the first projection plane 2211 and the distance Dr_z2 from x_y plane of the first position p1 to the second projection plane 2212 may be different. In one or more examples, the first projection surface, the second projection surface may be described as a first surface, a second surface, a first area, a second area, and the like.

In one or more examples, it is assumed that the electronic apparatus 100 is below the first projection surface 2211. The electronic apparatus 100 may obtain sensing data at a first position p1. The electronic apparatus 100 may obtain distance Dr_z1 from the x_y plane of the first position p1 to the first projection surface 2211 in the z-axis direction based on the sensing data. In one or more examples, the electronic apparatus 100 may use the distance Dr_z1 in calculating the projection position p3.

In the embodiment 2210 of FIG. 22, it is assumed that a projection position p3 indicated by the user 10 is on a second projection surface 2212. When the electronic apparatus 100 uses the distance Dr_z1 in the process of calculating the projection position p3, the actual projection position indicated by the user 10 and the calculated projection position p3 or the third vector V3 may be different from each other because the part desired by the user 10 is not the first projection surface 2211 but the second projection surface 2212. Accordingly, when the electronic apparatus 100 obtains the projection position p3 using the distance Dr_z1, the focus, size, magnification, etc. of the projected projection image 20 may not be correct. In addition, distortion may occur due to an error of keystone correction.

Accordingly, the electronic apparatus 100 needs to identify the projection position Pp or the third vector V3 by using the distance Dr_z2 corresponding to the second projection surface 2212 instead of the distance Dr_z1 corresponding to the first projection surface 2211.

Embodiment 2220 of FIG. 22 may represent the x_z coordinate system of embodiment 2210. The origin of the x_z coordinate system assumes a bottom position pc of the edge of a space in which the electronic apparatus 100 is arranged.

The distance from the x_y plane of the first position p1 to the first projection plane 2211 may be Dr_z1. The distance from the x_y plane of the first position p1 to the second projection plane 2212 may be Dr_z2. In one or more examples, Dr_z1 may be smaller than Dr_z2. Since the calculation method of distance Du_z is described in FIGS. 18 and 19, duplicate descriptions are omitted.

Equation 2230 of FIG. 22 represents an example calculation method of z-axis distance Du_z between x_y plane of first position p1 and second projection surface 2212.

The distance Du_z may be obtained by subtracting $\Delta z$ from the distance Dr_z2 (Du_z=Dr_z2−$\Delta z$).

The electronic apparatus 100 may obtain the distance Dr_z2, initial position p0, and first position p1 based on the sensing data.

$\Delta z$ may be z0−z1. The electronic apparatus 100 may obtain $\Delta z$ by subtracting z1, the z value of the first position p1, from z0, which is the z value of the initial position p0.

Therefore, the electronic apparatus 100 may obtain the distance Du_z by subtracting $\Delta z$ from the distance Dr_z2 (Du_z=Dr_z2−z1−z0).

In addition, the electronic apparatus 100 may obtain the distance Du_z by adding z0 and subtracting z1 from the distance Dr_z2. As a result, the electronic apparatus 100 may obtain a distance Du_z by subtracting z1, the z value of the first position p1, from the total length Dr_z2+z0 to the opposite surface of the second projection surface 2212 and the second projection surface 2212 (Du_z=Dr_z2+z0−z1).

FIG. 23 is a diagram for describing an operation of calculating a projection position when a projection surface that is not flat in a z-axis direction exists, according to various embodiments.

First projection surface 2311 and second projection surface 2312 of FIG. 23 may be the same as first projection surface 2211 and second projection surface 2212 of FIG. 22. Therefore, a duplicate description will be omitted.

The embodiment 2310 of FIG. 23 assumes that a projection position p3 indicated by the user 10 is on the first projection surface 2311. When the electronic apparatus 100 uses the distance Dr_z1 in the process of calculating the projection position p3, the actual projection position indicated by the user 10 and the calculated projection position p3 or the third vector V3 may be the same. Therefore, unlike FIG. 22, an additional calculation operation may not be required.

Embodiment 2320 of FIG. 23 may represent the x_z coordinate system of embodiment 2310. The origin of the x_z coordinate system assumes a bottom position pc of the edge of a space in which the electronic apparatus 100 is arranged.

The distance from the x_y plane of the first position p1 to the first projection surface 2311 may be Dr_z1. The distance from the x_y plane of the first position p1 to the second projection surface 2312 may be Dr_z2. In one or more examples, Dr_z1 may be smaller than Dr_z2. A method for calculating a distance Du_z has been described with reference to FIGS. 18 and 19, and thus, a redundant description thereof is omitted.

Equation 2330 of FIG. 23 represents an example calculation method of z-axis distance Du_z between x_y plane of first position p1 and first projection surface 2311.

The distance Du_z may be obtained by subtracting $\Delta z$ from the distance Dr_z1 (Du_z=Dr_z1−$\Delta z$).

The electronic apparatus 100 may obtain the distance Dr_z1, initial position p0, and first position p1 based on the sensing data.

$\Delta z$ may be z1-z0. The electronic apparatus 100 may obtain $\Delta z$ by subtracting z0, which is the z value of the initial position p0, in z1, which is the z value of the first position p1.

$\Delta z$ may be z0-z1. The electronic apparatus 100 may obtain the Du_z by subtracting $\Delta z$ from the distance Dr_z1 (Du_z=Dr_z1−z1−z0).

In addition, the electronic apparatus 100 may obtain a distance Du_z by adding z0 in the distance Dr_z1 and subtracting z1. As a result, the electronic apparatus 100 may obtain the distance Du_z by subtracting z1, which is the z value of the first position p1, from the entire length Dr_z1+z0 from the first projection surface 2311 to the opposite surface of the first projection surface 2311 (Du_z=Dr_z1+z0−z1).

FIG. 24 is a diagram for describing the projection image 20 projected in the y-axis direction.

Referring to FIG. 24, the electronic apparatus 100 may project a projection image in a y-axis direction. In one or more examples, the electronic apparatus 100 may obtain a distance Dr_y from the plane 2410 to the projection surface 2420 of the electronic apparatus 100.

In one or more examples, a plane 2410 of the electronic apparatus 100 may refer to an x_z plane according to an initial position P0 of the electronic apparatus 100. In one or more examples, the x_z plane may correspond to y=y0. In one or more examples, the projection surface 2420 may refer to a surface on which the projection image 20 is output.

The electronic apparatus 100 may obtain a distance Dr_y from the plane 2410 to the projection surface 2420 of the electronic apparatus 100 based on sensing data obtained through the sensor unit 121. In one or more examples, the sensor unit 121 may include at least one of a distance sensor, a LiDAR sensor, or a 3D camera depth camera.

When the bottom surface and the projection surface 2420 are flat, the distance Dr_y from the plane 2410 to the projection surface 2420 of the electronic apparatus 100 may be the same regardless of the position of the electronic apparatus 100.

FIG. 25 is a diagram for describing an operation of calculating a projection position based on the position of the electronic apparatus 100 when a projection surface is present in the y-axis direction, according to various embodiments.

The embodiment 2510 of FIG. 25 indicates that the projection surface is perpendicular to the y-axis of the electronic apparatus 100. The electronic apparatus 100 may obtain a first vector V1 indicating a direction from an initial position p0 of the electronic apparatus 100 to a first position p1 corresponding to a preset gesture. The electronic apparatus 100 may obtain a second vector V2 indicating a direction from the first position p1 to the projection position p3. The electronic apparatus 100 may obtain a third vector V3 indicating a direction from an initial position p0 to the projection position p3. The electronic apparatus 100 may output a projection image 20 on the projection surface based on a third vector V3.

Embodiment 2520 of FIG. 25 may represent the x_y coordinate system of embodiment 2510. The origin of the x_y coordinate system is assumed to be initial position p0.

The y-axis distance between the x_z plane and the projection surface of the initial position p0 may be Dr_y. The distance between the plane x_z plane and the projection surface of the electronic apparatus 100 may be Dr_y.

In addition, the y-axis distance between the x_z plane and the projection surface of the first position p1 may be Du_y. The distance between the plane x_z plane and the projection surface of the preset gesture may be Du_y.

In addition, the y-axis distance between the x_z plane of the initial position p0 and the x_z plane of the first position p1 may be $\Delta y$. A distance between the x_z plane of the electronic apparatus 100 and the x_z plane of a preset gesture may be $\Delta y$.

Equation 2530 of FIG. 25 represents an example calculation method of y-axis distance Du_y between x_y plane of first position p1 and first projection surface.

The distance Du_y may be obtained by subtracting $\Delta y$ from the distance Dr_y (Du_y=Dr_y−$\Delta y$).

The electronic apparatus 100 may obtain the distance Dr_y and first position p1 based on the sensing data.

$\Delta y$ may be y1-y0. In one or more examples, y0 is assumed to be the origin, so $\Delta y$ may be y1.

The electronic apparatus 100 may obtain the distance Du_y by subtracting y1, which is the y value of the first position p1, from the distance Dr_y (Du_y=Dr_y−y1).

FIG. 26 is a diagram for describing an operation of calculating a projection position when a projection surface is present in a y-axis direction, according to various embodiments.

Embodiment 2610 of FIG. 26 may correspond to embodiment 2510 of FIG. 25. Therefore, a duplicate description will be omitted.

The embodiment 2620 of FIG. 26 may represent the xy coordinate system of the embodiment 2610. The origin of the xy coordinate system is assumed to be the bottom position pc of the edge of the space in which the electronic apparatus 100 is arranged. Since the method for calculating the distance Du_y has been described in the embodiment 2520 of FIG. 25, a redundant description is omitted.

Equation 2630 of FIG. 26 represents an example calculation method of y-axis distance Du_y between the x_z plane of p1 of the first position and projection surface.

The distance Du_y may be obtained by subtracting $\Delta y$ from the distance Dr_y (Du_y=Dr_y−$\Delta y$).

The electronic apparatus 100 may obtain the distance Dr_y, initial position p0, and first position p1 based on the sensing data.

$\Delta y$ may be y1-y0. The electronic apparatus 100 may obtain $\Delta y$ by subtracting y0, which is the y value of the initial position p0, from y1, which is the y value of the first position p1.

Therefore, the electronic apparatus 100 may obtain the distance Du_y by subtracting $\Delta y$ from the distance Dr_y (Du_y=Dr_y−y1−y0).

In addition, the electronic apparatus 100 may obtain a distance Du_y by adding y0 in a distance Dr_y and subtracting y1. As a result, the electronic apparatus 100 may obtain a distance Du_y by subtracting y1, which is the y value of the first position p1, from the entire length Dr_y+y0 between the projection surface and the opposite surface of the projection surface (Du_y=Dr_y+y0−y1).

In one or more examples, x1, y1, z1 representing the initial position p; x1, y1, z1 representing the first position p1; x3, y3, z3 representing the projection position p3, which represent the initial position p0 set forth in FIG. 25, may have different absolute values from x0, y0, z0 representing the initial position p0; x1, y1, z1 representing the first position p1; and x3, y3, z3 representing the projection position p3. This is because the reference position p1 is different. For convenience of understanding, the same symbol is used, and a value used according to a criterion may vary. Hereinafter, for convenience of understanding, it is assumed that the origin of the xy coordinate system is the bottom position pc of the edge of the space.

Figure 27:
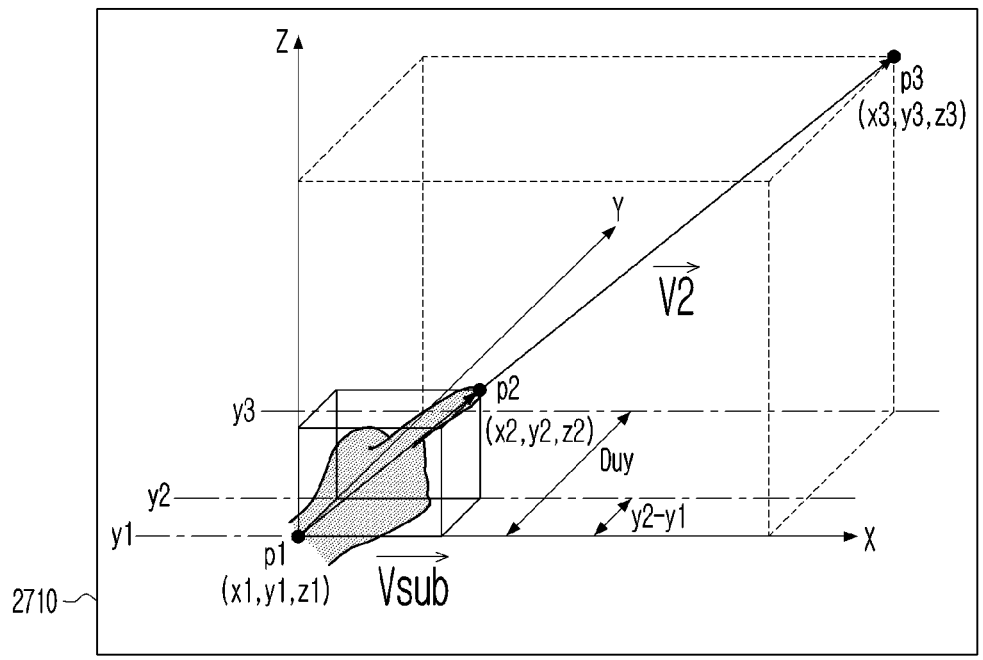
FIG. 27 is a diagram for describing an operation of calculating a vector corresponding to a preset gesture when a projection surface is present in a y-axis direction, according to various embodiments.

FIG. 27 is a diagram for describing an example operation of calculating a vector corresponding to a preset gesture when a projection surface is present in a y-axis direction, according to various embodiments.

Embodiment 2710 of FIG. 27 is an xyz coordinate system representing Vsub and second vector V2.

In one or more examples, the first position p1 may refer to a start position of a preset gesture, for example, a wrist. In one or more examples, the second position p2 may correspond to an end position of a preset gesture, for example, a detection fingertip or a nail portion. The electronic apparatus 100 may identify a sub-vector Vsub based on a first position p1 and a second position p2.

In one or more examples, the second vector V2 may indicate a direction from a first position p1 to a projection position p3. In one or more examples, the direction of the sub vector Vsub and the direction of the second vector V2 may be the same.

The electronic apparatus 100 may obtain the y-axis distance Du_y between the x_z plane and the projection surface of the first position p1.

The electronic apparatus 100 may obtain the difference value |y2−y1| between the y2 which is the y-axis value of the second position p2 and y1 which is the y-axis value of the first position p1.

The electronic apparatus 100 may expand Vsub in proportion to the size of the distance Du_y and difference value |y2−y1|.

Equation 2720 of FIG. 27 refers to a calculation formula for obtaining a y-axis distance Du_y between an x_z plane and a projection surface of the first position p1. Since the above description has been described with reference to FIGS. 25 to 26, a redundant description thereof is omitted.

Equation 2730 of FIG. 27 corresponds to the calculation formula of the second vector V2. The electronics 100 may obtain the second vector V2 by multiplying the subvector Vsub by the distance Du_y and dividing the difference |y2−y1| (V2=Vsub*Du_y/|y2−y1|). In one or more examples, Du_y/|y2−y1| may correspond to the expansion ratio. In one or more examples, the expansion ratio Du_y/|y2−y1| may be greater than 1.

Equation 2740 of FIG. 27 corresponds to the calculation formula of the projection position p3. The electronic apparatus 100 may obtain a projection position p3 based on coordinates x1, y1, z1 of the first position p1, coordinates x2, y2, z2 of the second position p2, distance Du_y and the difference value |y2−y1|.

For example, the electronic apparatus 100 may obtain a coordinate difference x2−x1, y2−y1, y2−y1 of the second position p2 and the first position p1. The electronic apparatus 100 may obtain coordinates x3, y3, z3 by adding coordinates x1, y1, z1 to the coordinate difference x2−x1, y2−y1, y2−y1 multiplied by the extension ratio Du_y/|y2−y1| ([x3,y3,z3=x1,y1,z1+x2−x1,y2−y1,y2−y1*Du_y/|y2−y1|]).

FIG. 28 is a diagram for describing an example operation of calculating a projection position when a projection surface which is not flat in a y-axis direction exists, according to various embodiments.

Referring to FIG. 28, the projection surface may not be flat. For example, the projection surface may be divided into a first projection surface 2811 and a second projection surface 2812. For example, the distance to the first projection surface 2811 and the distance of the second projection surface 2812 may be different from each other. The first distance from the opposite surface of the projection surface to the first projection surface 2811 and the second distance from the opposite surface of the projection surface to the second projection surface 2812 may be different from each other.

In addition, the distance Dr_y1 from the x_z plane of the first position p1 to the first projection plane 2811 and the distance Dr_y2 from the x_z plane of the first position p1 to the second projection plane 2812 may be different. In one or more examples, the first projection surface may be described as a first surface or first area, and the second projection surface may be described as a second surface or a second area.

In one or more examples, it is assumed that the electronic apparatus 100 is in an area corresponding to the first projection plane 2811. The electronic apparatus 100 may obtain sensing data at the first position p1. The electronic apparatus 100 may obtain a distance Dr_y1 from the x_z plane of the first position p1 to the first projection plane 2811 in the y-axis direction based on the sensing data. In one or more examples, the electronic apparatus 100 may use the distance Dr_y1 in calculating the projection position p3.

Embodiment 2810 of FIG. 28 assumes that the projection position p3 indicated by the user 10 is in the second projection plane 2812. When the electronic apparatus 100 uses distance Dr_y1 in the process of calculating the projection position p3, the actual projection position indicated by the user 10 and the calculated projection position p3 or the third vector V3 may be different from each other. This is because the part that user 10 wants is not the first projection surface 2811, but the second projection surface 2812. Therefore, when the electronic apparatus 100 obtains the projection position p3 using the distance Dr_y1, the focus, size, magnification, etc. of the projected projection image 20 may not match. In addition, distortion may occur due to an error in keystone correction.

Therefore, the electronic apparatus 100 needs to identify the projection position p3 or the third vector V3 using the distance Dr_y2 corresponding to the second projection surface 2812 instead of the distance Dr_y1 corresponding to the first projection surface 2811.

The embodiment 2820 of FIG. 28 may represent the xy coordinate system of the embodiment 2810. The origin of the xy coordinate system is assumed to be the bottom position pc of the edge of the space in which the electronic apparatus 100 is arranged.

The distance from the x_z plane of the first position p1 to the first projection plane 2811 may be Dr_y1. The distance from the x_z plane of the first position p1 to the second projection plane 2812 may be Dr_y2. In one or more examples, Dr_y1 may be smaller than Dr_y2. Since the calculation method of distance Du_y is described in FIGS. 25 and 26, duplicate descriptions are omitted.

Equation 2830 of FIG. 28 represents an example calculation method of y-axis distance Du_z between x_y plane of first position p1 and first projection surface 2812.

The distance Du_y may be obtained by subtracting Δy from the distance Dr_y2 (Du_y=Dr_y2−Δy).

The electronic apparatus 100 may obtain the distance Dr_y2, initial position p0, and first position p1 based on the sensing data.

Δy may be y1−y0. The electronic apparatus 100 may obtain Δy by subtracting y0 which is the y value of the initial position p0 from the y1 which is the y value of the first position p1.

The electronic apparatus 100 may obtain the Du_y by subtracting Δy from the distance Dr_y2 (Du_y=Dr_y2−y1−y0).

In addition, the electronic apparatus 100 may obtain a distance Du_y by adding y0 and subtracting y1 from the distance Dr_y2. As a result, the electronic apparatus 100 may obtain a distance Du_y by subtracting y1, which is the y value of the first position p1, from the total length Dr_y2+y0 to the opposite surface of the second projection surface 2812 and the second projection surface 2812 (Du_y=Dr_y2+y0−y1).

Figure 29:
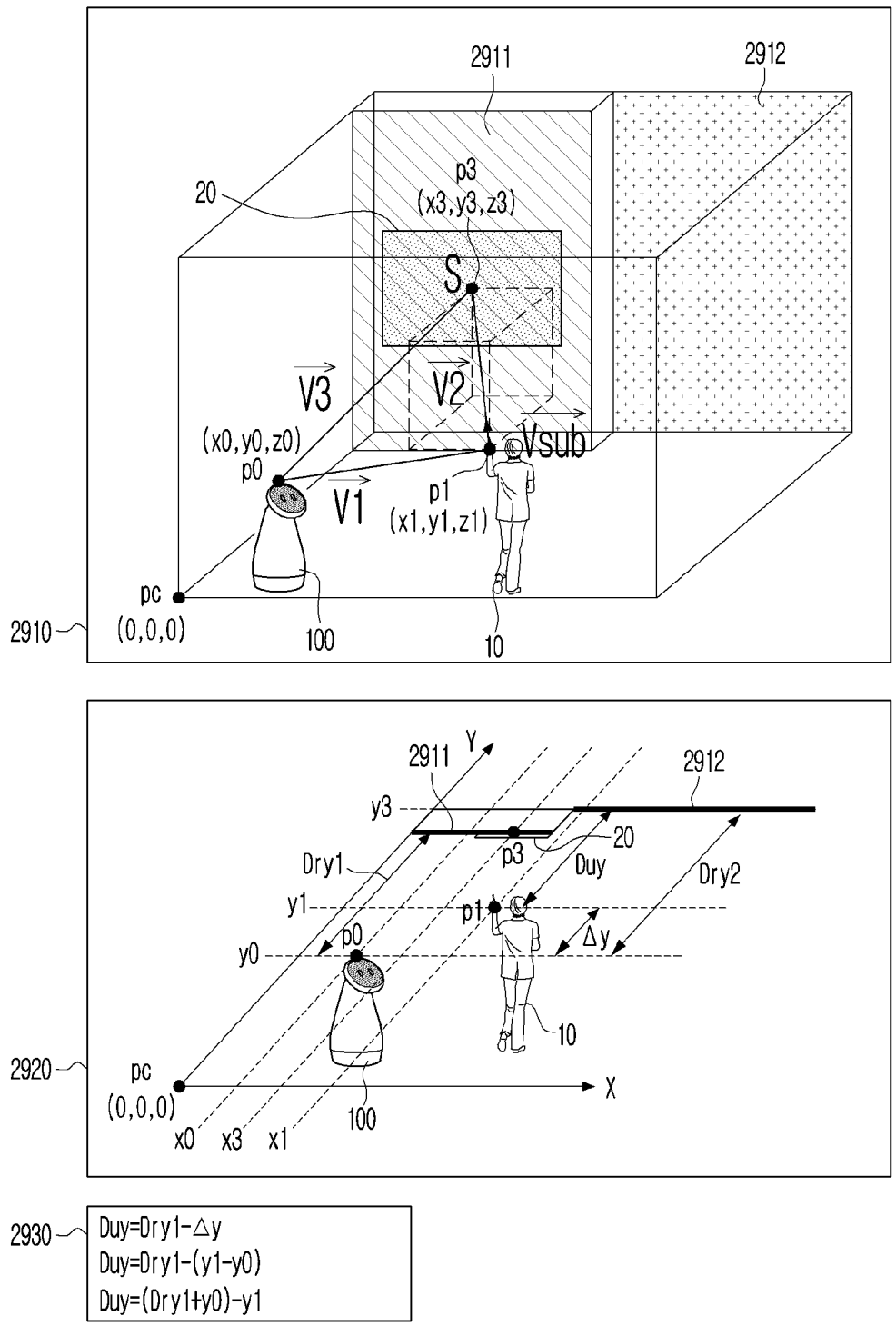
FIG. 29 is a diagram for describing an operation of calculating a projection position when a projection surface that is not flat in the y-axis direction exists, according to various embodiments.

FIG. 29 is a diagram for describing an operation of calculating a projection position when a projection surface that is not flat in the y-axis direction exists, according to various embodiments.

The first projection surface 2911 and the second projection surface 2912 of FIG. 29 may be the same as the first projection surface 2811 and the second projection surface 2812 of FIG. 28. Therefore, a redundant description thereof is omitted.

Embodiment 2910 of FIG. 29 assumes that the projection position p3 indicated by user 10 is in the first projection plane 2911. When the electronic apparatus 100 uses distance Dr_y1 in the process of calculating the projection position p3, the actual projection position indicated by the user 10 and the calculated projection position p3 or the third vector V3 may be the same. Therefore, unlike FIG. 28, additional calculation operations may not be required.

Embodiment 2920 of FIG. 29 represents the xy coordinate system of embodiment 2910. The origin of xy coordinate system assumes floor position pc of the edge of the space where the electronic apparatus 100 is disposed.

The distance from the x_z plane of the first position p1 to the first projection plane 2911 may be Dr_y1. The distance from the x_z plane of the first position p1 to the second projection plane 2912 may be Dr_y2. In one or more examples, Dr_y1 may be smaller than Dr_y2. Since the calculation method of distance Du_y is described in FIGS. 25 and 26, duplicate descriptions are omitted.

Equation 2930 of FIG. 29 represents an example calculation method of y-axis distance Du_y between x_y plane of first position p1 and first projection surface 2911.

The distance Du_y may be obtained by subtracting Δy from distance Dr_y1 (Du_y=Dr_y1−Δy).

The electronic apparatus 100 may obtain the distance Dr_y1, initial position p0, and first position p1 based on sensing data.

Δy may be y1−y0. The electronic apparatus 100 may obtain Δy by subtracting y0 which is the y value of the initial position p0 from y1 which is the y value of the first position p1.

Therefore, the electronic apparatus 100 may obtain distance Du_y by subtracting Δy from the distance Dr_y1 (Du_y=Dr_y1−y1−y0).

In addition, the electronic apparatus 100 may obtain distance Du_y by adding y0 and subtracting y1 from the distance Dr_y1. As a result, the electronic apparatus 100 may obtain a distance due by subtracting y1, which is the y value of the first position p1, from the total length Dr_y1+y0 to the opposite surface of the first projection plane 2911 and the first projection surface 2911 (Du_y=Dr_y1+y0−y1).

FIG. 30 is a diagram for describing the projection image 20 projected in the x-axis direction.

Referring to FIG. 30, the electronic apparatus 100 may project a projected image in the x-axis direction. In one or more examples, the electronic apparatus 100 may obtain the distance Dr_x from plane 3010 of the electronic apparatus 100 to the projection surface 3020.

In one or more examples, plane 3010 of the electronic apparatus 100 may correspond to a y_z plane according to the initial position p0 of the electronic apparatus 100. In one or more examples, the y_z plane may correspond to x=x0. In one or more examples, the projection surface 3020 may correspond to the surface on which the projection image 20 is output.

The electronic apparatus 100 may obtain a distance Dr_x from plane 3010 to projection surface 3020 of the electronic apparatus 100 based on sensing data obtained through the sensor unit 121. In one or more examples, the sensor unit 121 may include at least one of a distance sensor, a LiDAR sensor, or a 3D depth camera.

If the floor plane and the projection surface 3020 are flat, the distance Dr_x from plane 3010 to the projection surface 3020 of the electronic apparatus 100 may be the same regardless of the position of the electronic apparatus 100.

FIG. 31 is a diagram for describing an operation of calculating a projection position based on the position of the electronic apparatus 100 when a projection surface is present in the x-axis direction, according to various embodiments.

Embodiment Example 3110 of FIG. 31 shows that the projection surface is perpendicular to the x-axis of the electronic apparatus 100. The electronic apparatus 100 may obtain a first vector V1 indicating a direction from the initial position p0 of the electronic apparatus 100 to the first position p1 corresponding to a predetermined gesture. The electronic apparatus 100 may obtain a second vector V2 indicating a direction from the first position p1 to the projection position p3. The electronic apparatus 100 may obtain a third vector V3 indicating a direction from initial position p0 to projection position p3. The electronic apparatus 100 may output the projection image 20 to the projection surface based on the third vector V3.

Embodiment 3120 of FIG. 31 represents the xy coordinate system of embodiment 3110. The origin of the xy coordinate system is assumed to be initial position p0.

The x-axis distance between the y_z plane and the projection surface of the base position p0 may be Dr_x. The distance between the plane yz of the electronic apparatus 100 and the projection surface may be Dr_x.

In addition, the x-axis distance between the y_z plane and the projection surface of the first position p1 may be Du_x. The distance between the plane y_z plane and the projection surface of the preset gesture may be Du_x.

In addition, the x-axis distance between the y_z plane of the initial position p0 and the y_z plane of the first position p1 may be Δx. The distance between the plane (y_z plane) of the electronic apparatus 100 and the plane (y_z plane) of the preset gesture may be Δx.

Equation 3130 of FIG. 31 represents an example calculation method of x-axis distance Du_x between x_y plane of first position p1 and first projection surface.

The distance Du_x may be obtained by subtracting Δx from the distance Dr_x (Du_x=Dr_x−Δx).

The electronic apparatus 100 may obtain the distance Dr_x and first position p1 based on the sensing data.

Δx may be x1-x0. In one or more examples, x0 is assumed to be the origin, so Δx may be x1.

The electronic apparatus 100 may obtain a distance Du_x by subtracting x1, which is the x value of the first position p1, from the distance Dr_x (Du_x=Dr_x−x1).

FIG. 32 is a diagram for describing an operation of calculating a projection position when a projection surface is present in an x-axis direction, according to various embodiments.

Embodiment 3210 of FIG. 32 may correspond to 3110 of FIG. 31. A duplicate description will be omitted.

Embodiment 3220 of FIG. 32 may represent the xy coordinate system of Embodiment 3210. The origin of the x-y coordinate system assumes the floor position pc of the corner of the space in which the electronic apparatus 100 is placed. Since the calculation method of distance Du_x is described in Embodiment 3120 of FIG. 31, duplicate descriptions are omitted.

Equation 3230 of FIG. 32 represents an example calculation method of x-axis distance Du_x between y_z plane of first position p1 and projection surface.

The distance Du_x may be obtained by subtracting Δx from the distance Dr_x (Du_x=Dr_x−Δx).

The electronic apparatus 100 may obtain the distance Dr_x, initial position p0, and first position p1 based on the sensing data.

Δx may be x1-x0. The electronic apparatus 100 may obtain Δx by subtracting x0 which is the x value of the initial position p0 from the x1 which is the x value of the first position p1.

Therefore, the electronic apparatus 100 may obtain the distance Du_x by subtracting Δx from the distance Dr_x (Du_x=Dr_x−x1−x0).

In addition, the electronic apparatus 100 may obtain the distance Du_x by adding x0 and subtracting x1 from the distance Dr_x. As a result, the electronic apparatus 100 may obtain a distance Du_x by subtracting x1, which is the x value of the first position p1, from the total length Dr_x+x0 to the opposite surface of the projection surface and the projection surface (Du_x=Dr_x+x0−x1).

In one or more examples, (x0, y0, z0) representing the initial position p0, (x1, y1, z1) representing the first position p1, (x3, y3, z3) representing the projection position p3 of FIG. 31 may have different absolute values with (x0, y0, z0), representing the first position p1, (x3, y3, z3) representing the projection position p3, and (x0, y0, z0) representing the initial position p0 of FIG. 32. This is because the reference position is different. The same symbol is used for ease of understanding, and in fact, the value used may vary depending on the standard. Hereinafter, for ease of understanding, it is assumed that the origin of the xy coordinate system is the floor position pc of the corner of the space.

Figure 33:
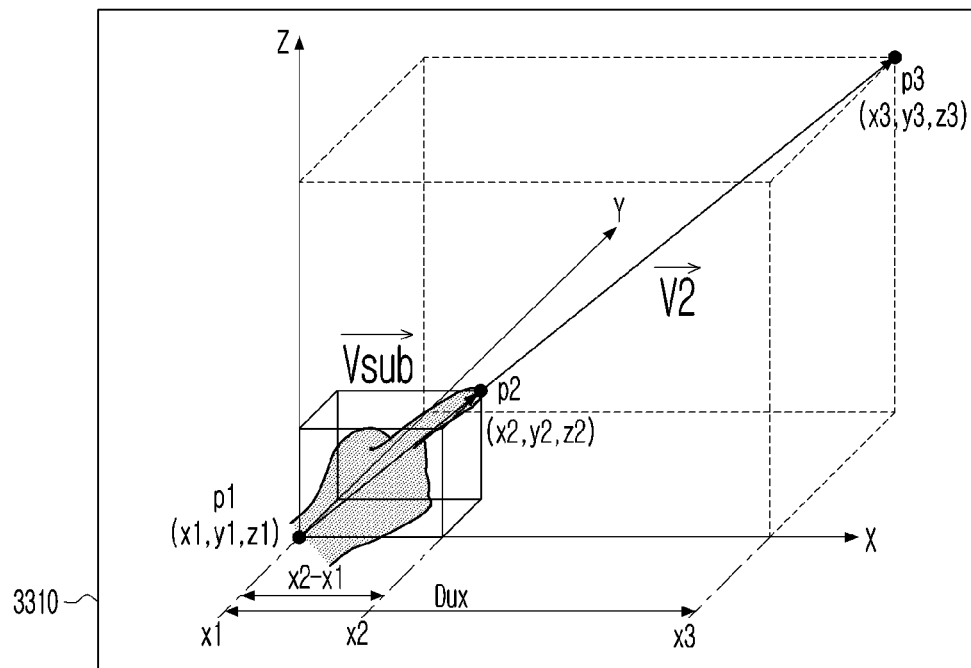
FIG. 33 is a diagram for describing an operation of calculating a vector corresponding to a preset gesture when a projection surface is present in an x-axis direction, according to various embodiments.

FIG. 33 is a diagram for describing an operation of calculating a vector corresponding to a preset gesture when a projection surface is present in an x-axis direction, according to various embodiments.

Embodiment 3310 of FIG. 33 is an xyz coordinate system representing Vsub and second vector V2.

In one or more examples, the first position p1 may correspond to the starting position of a preset gesture, for example, the wrist. In one or more examples, the second position p2 may correspond to the end position of a preset gesture, for example, an index fingertip or a nail portion. The electronic apparatus 100 may identify a subvector Vsub based on the first position p1 and the second position p2.

In one or more examples, the second vector V2 may indicate a direction from the first position p1 to the projection position p3. In one or more examples, the direction of the sub vector Vsub and the direction of the second vector V2 may be the same.

The electronic apparatus 100 may obtain the x-axis distance Du_x between the x_y plane of the first position p1 and the projection surface.

The electronic apparatus 100 may obtain the difference |x2−x1| between x2 which is the x-axis value of the second position p2 and the x1 which is the x-axis value of the first position p1.

The electronic apparatus 100 may expand the sub-vector Vsub according to the distance Du_x and the size proportional to the difference value |x2−x1|.

Equation 3320 of FIG. 33 corresponds to a calculation formula for finding the x-axis distance Du_x between the y_z plane and the projection plane of the first position p1. Since the contents related to this are described in FIGS. 31 to 32, duplicate descriptions are omitted.

Equation 3330 of FIG. 33 corresponds to the calculation formula of the second vector V2. The electronics 100 may obtain the second vector V2 by multiplying the subvector Vsub by the distance Du_x and dividing the difference|x2−x1| (V2=Vsub*Du_x/|x2−x1|). In one or more examples, Du_x/|x2−x1| may correspond to the expansion ratio. In one or more examples, the expansion ratio Du_x/|x2−x1| may be greater than 1.

Equation 3340 of FIG. 33 refers to a calculation formula of projection position p3. The electronic apparatus 100 may obtain a projection position p3 based on the coordinates x1, y1, z1 of the first position p1, the coordinates (x2, y2, z2), the distance Du_x, and the difference |x2−x1| of the second position p2.

For example, the electronic apparatus 100 may obtain a coordinate difference (x2−x1, x2−x1, x2−x1, x2−x1) of the second position p2 and the first position p1. The electronic apparatus 100 may obtain coordinates (x3, y3, z3) by adding coordinates (x1, y1, z1) to the coordinate difference (x2−x1, x2−x1,x2−x1) multiplied by the extension ratio Du_x/|x2−x1| [x3,y3,z3=x1,y1,z1+x2−x1,x2−x1,x2−x1*Du_x/|x2−x1|].

FIG. 34 is a diagram for describing an operation of calculating a projection position when a projection surface that is not flat in the x-axis direction exists, according to various embodiments.

Referring to FIG. 34, the projection surface may not be flat. For example, the projection surface may be divided into a first projection surface 3411 and a second projection surface 3412. For example, the distance to the first projection surface 3411 and the distance to the second projection surface 3412 may be different from each other. The first distance from the opposite surface of the projection surface to the first projection surface 3411 and the second distance from the opposite surface of the projection surface to the second projection surface 3412 may be different from each other.

In addition, the distance Dr_x1 from the y_z plane of the first position p1 to the first projection plane 3411 and the distance Dr_x2 from the y_z plane of the first position p1 to the second projection plane 3412 may be different. In one or more examples, the first projection surface, the second projection surface may be described as a first surface, a second surface, a first area, a second area, and the like.

In one or more examples, it is assumed that the electronic apparatus 100 is in an area corresponding to the first projection plane 3411. The electronic apparatus 100 may obtain sensing data at the first position p1. The electronic apparatus 100 may obtain a distance Dr_x1 from the y_z plane of the first position p1 to the first projection plane 3411 in the x-axis direction based on the sensing data. In one or more examples, the electronic apparatus 100 may use the distance Dr_x1 in calculating the projection position p3.

Embodiment 3410 of FIG. 34 assumes that the projection position p3 indicated by user 10 is in the second projection plane 3412. When the electronic apparatus 100 uses distance Dr_x1 in the process of calculating the projection position p3, the actual projection position indicated by the user 10 and the calculated projection position p3 or the third vector V3 may be different from each other. This is because the part that user 10 wants is not the first projection plane 3411, but the second projection plane 3412. Therefore, when the electronic apparatus 100 obtains the projection position p3 using the distance Dr_x1, the focus, size, magnification, etc. of the projected projection image 20 may not match. In addition, distortion may occur due to an error in keystone correction.

Therefore, the electronic apparatus 100 needs to identify the projection position p3 or the third vector V3 using the distance Dr_x2 corresponding to the second projection plane 3412 instead of the distance Dr_x1 corresponding to the first projection plane 3411.

Embodiment 3420 of FIG. 34 represents the xy coordinate system of embodiment. The origin of xy coordinate system assumes floor position pc of the edge of the space where the electronic apparatus 100 is disposed.

The distance from the y_z plane of the first position p1 to the first projection plane 3411 may be Dr_x1. The distance from the y_z plane of the first position p1 to the second projection plane 3412 may be Dr_x2. In one or more examples, Dr_x1 may be smaller than Dr_x2. Since the calculation method of distance Du_x is described in FIGS. 31 and 32, duplicate descriptions are omitted.

Equation 3430 of FIG. 34 represents an example calculation method of x-axis distance Du_x between y_z plane of first position p1 and second projection surface 3412.

The distance Du_x may be obtained by subtracting Δx from the distance Dr_x2 (Du_x=Dr_x2−Δx).

The electronic apparatus 100 may obtain the distance Dr_x2, initial position p0, and first position p1 based on the sensing data.

Δx may be x1−x0. The electronic apparatus 100 may obtain Δx by subtracting x0 which is the x value of the initial position p0 from the x1 which is the x value of the first position p1.

The distance Du_x may be obtained by subtracting Δx from the distance Dr_x2 (Du_x=Dr_x2−x1−x0).

In addition, the electronic apparatus 100 may obtain distance Du_x by adding x0 and subtracting x1 from the distance Dr_x2. As a result, the electronic apparatus 100 may obtain a distance Du_x by subtracting x1, which is the x value of the first position p1, from the total length Dr_x2+x0 to the opposite surface of the second projection plane 3412 and the second projection surface 3412 (Du_x=Dr_x2+x0−x1).

FIG. 35 is a diagram for describing an operation of calculating a projection position when a projection surface that is not flat in the x-axis direction exists, according to various embodiments.

First projection surface 3511 and second projection surface 3512 of FIG. 35 may be the same as first projection surface 3411 and second projection surface 3412 of FIG. 34. Thus, a duplicate description will be omitted.

Embodiment 3510 of FIG. 35 assumes that the projection position p3 indicated by user 10 is in the first projection plane 3511. When the electronic apparatus 100 uses distance Dr_x1 in the process of calculating the projection position p3, the actual projection position indicated by the user 10 and the calculated projection position p3 or the third vector V3 may be the same. Therefore, unlike FIG. 34, additional calculation operations may not be required.

The embodiment 3520 of FIG. 35 may represent the xy coordinate system of the embodiment 3510. The origin of the xy coordinate system is assumed to be the bottom position pc of the edge of the space in which the electronic apparatus 100 is arranged.

The distance from the y_z plane of the first position p1 to the first projection plane 3511 may be Dr_x1. The distance from the y_z plane of the first position p1 to the second projection plane 3512 may be Dr_x2. In one or more examples, Dr_x1 may be smaller than Dr_x2. Since the calculation method of distance Du_x is described in FIGS. 31 and 32, duplicate descriptions are omitted.

Equation 3530 of FIG. 35 represents an example calculation method of x-axis distance Du_x between y_z plane of first position p1 and first projection surface 3511.

The distance Du_x may be obtained by subtracting Δx from the distance Dr_x1 (Du_x=Dr_x1−Δx).

The electronic apparatus 100 may obtain the distance Dr_x1, initial position p0, and first position p1 based on the sensing data.

The electronic apparatus 100 may obtain Δx by subtracting x0, which is the x value of the initial position p0, from x1, which is the x value of the first position p1.

Therefore, the electronic apparatus 100 may obtain the distance Du_x by subtracting Δx from the distance Dr_x1 (Du_x=Dr_x1−x1−x0).

In addition, the electronic apparatus 100 may obtain distance Du_x by adding x0 and subtracting x1 from the distance Dr_x1. As a result, the electronic apparatus 100 may obtain a distance Du_x by subtracting x1, which is the x value of the first position p1, from the total length Dr_x1+x0 to the opposite surface of the first projection plane 3511 and the first projection surface 3511 (Du_x=Dr_x1+x0−x1).

FIG. 36 is a diagram for describing an operation of changing a projection position when an obstacle object is identified.

Embodiment 3610 of FIG. 36 indicates that there is an obstacle object 30 in the projection position p3 indicated by the user 10. When the electronic apparatus 100 projects the projected image 20 based on the projection position p3, some projection image 20 may be projected onto the obstacle object 30. Therefore, the user 10 may feel uncomfortable.

Embodiment 3620 of FIG. 36 shows that the electronic apparatus 100 avoids the obstacle object 30 and projects the projection image 20. The electronic apparatus 100 may identify the position of the obstacle object 30 based on the sensing data. The electronic apparatus 100 may change the projection position p3 to the projection position p4 in consideration of the position of the obstacle object 30. The electronic apparatus 100 can output a projection image 20 based on the new projection position p4.

In the embodiment of FIG. 36, there may be a guide image displayed in the process of changing the projection position.

The guide image may include at least one of a UI representing a plurality of grids or a UI representing a center point.

FIG. 37 is a diagram for describing an operation of changing the size of the projection image 20 according to a gesture of the user 10.

One or more embodiments 3710 of FIG. 37 illustrates that the user 10 takes a preset gesture indicating a projection position p3. The electronic apparatus 100 may project the projection image 20 to the projection position p3.

Embodiment 3720 of FIG. 37 shows a situation in which the user 10 changes a preset gesture. It is assumed that a preset gesture is a gesture pointing to a specific position. The user 10 may take a gesture indicating the projection position p3. The user 10 may then pull the arm inward while maintaining the direction of the gesture. The gesture towards the projection position p3 is maintained, but the absolute position of the gesture may be changed. For example, position p1 of a preset gesture may be changed to position p1'. In one or more examples, the direction of position p1 and the direction of the new position p1' may be similar within the same or critical range and different in size.

The electronic apparatus 100 may identify a position change corresponding to a preset gesture. The electronic apparatus 100 may change the size of the projected image 20 based on the position p1 before the change and the position p1' after the change.

As the distance between the projection position p3 and the first position p1 corresponding to the preset gesture becomes smaller, the electronic apparatus 100 may control the projection image 20 to be projected to be large. In addition, as the distance between the projection position P3 and the first position P1 corresponding to the preset gesture increases, the electronic apparatus 100 may control the projection image 20 to be projected small.

FIG. 38 is a diagram for describing an operation in which the electronic apparatus 100 moves based on the projection position.

The embodiment 3810 of FIG. 38 illustrates that the user 10 takes a preset gesture pointing to the projection position p3. The electronic apparatus 100 may project the projection image 20 to the projection position p3.

The embodiment 3820 of FIG. 38 illustrates a situation in which the electronic apparatus 100 moves to project the projection image 20 at the projection position p3. In the embodiment 3810, the electronic apparatus 100 may analyze the base position p0 and the projection position p3, thereby making it impossible or suitable for the projection image 20 to be projected on the projection position p3. In one or more examples, to provide an optimal projection environment, the electronic apparatus 100 may move to a suitable position.

FIG. 39 is a diagram for describing an operation of performing a multi-view function based on an edge, according to various embodiments.

In one or more embodiments 3910 of FIG. 39, a multi-view function of projecting the projection image 20 including a first content 21 and a second content 22 is provided. When the projection position p3 indicated by the user 10 is near the corner portion of the wall, the first content 21 or the second content 22 may overlap the corner portion. Therefore, the user 10 may feel inconvenience.

Embodiment 3920 of FIG. 39 illustrates a situation in which the electronic apparatus 100 changes a projection position to corner portions 3921 in providing a multi-view function. The electronic apparatus 100 may identify the position of the projection position p3 and the edge portion (3921). In one or more examples, the corner portion 3921 may refer to a boundary between one projection surface 3921-1 and another projection surface 3921-2. The edge portion 3921 may be described as an edge line.

The electronic apparatus 100 may obtain a new projection position p4 based on the projection position p3 and the edge portion 3921. In one or more examples, the z value of the projection position p4 and the z value of the projection position p3 may be the same. In one or more examples, the electronic apparatus 100 may obtain the projection position p4 by correcting any one of the x value x3 or the y value y3 of the projection position p3 to coincide with the corner portion 3921.

The electronic apparatus 100 may change the projection position p3 to the projection position p4. The electronic apparatus 100 may project the projection image 20 based on the projection position p4.

FIG. 40 is a diagram for describing an operation of performing a multi-view function on the basis of an edge, according to various embodiments.

The embodiment 4010 of FIG. 40 indicates that a multi-view function for projecting the projection image 20 including first content 21 and second content 22 provided in the projected image. When the projection position p3 indicated by the user 10 is near the corner portion of the wall, the first content 21 or the second content 22 may overlap the corner portion. Therefore, the user 10 may feel inconvenience.

The embodiment 4020 of FIG. 40 indicates a situation in which the electronic apparatus 100 provides a multi-view function so as to change the projection position to the corner portion 4021. The electronic apparatus 100 may identify the position of the projection position p3 and the edge 4021. In one or more examples, the corner portion 4021 may refer to a boundary between one projection surface 4021-1 and another projection surface 4021-2. The corner portion 4021 may be described as an edge line.

The electronic apparatus 100 may obtain a new projection position p4 based on the projection position p3 and the edge portion 4021. In one or more examples, the x value of the projection position p4 and the x value of the projection position p3 may be the same. In one or more examples, the electronic apparatus 100 may obtain projection position p4 by correcting any one value of z value z3 or y value y3 of projection position p3 to coincide with corner portion 4021.

The electronic apparatus 100 may change the projection position p3 to the projection position p4. The electronic apparatus 100 may project the projection image 20 based on the projection position p4.

Figure 41:
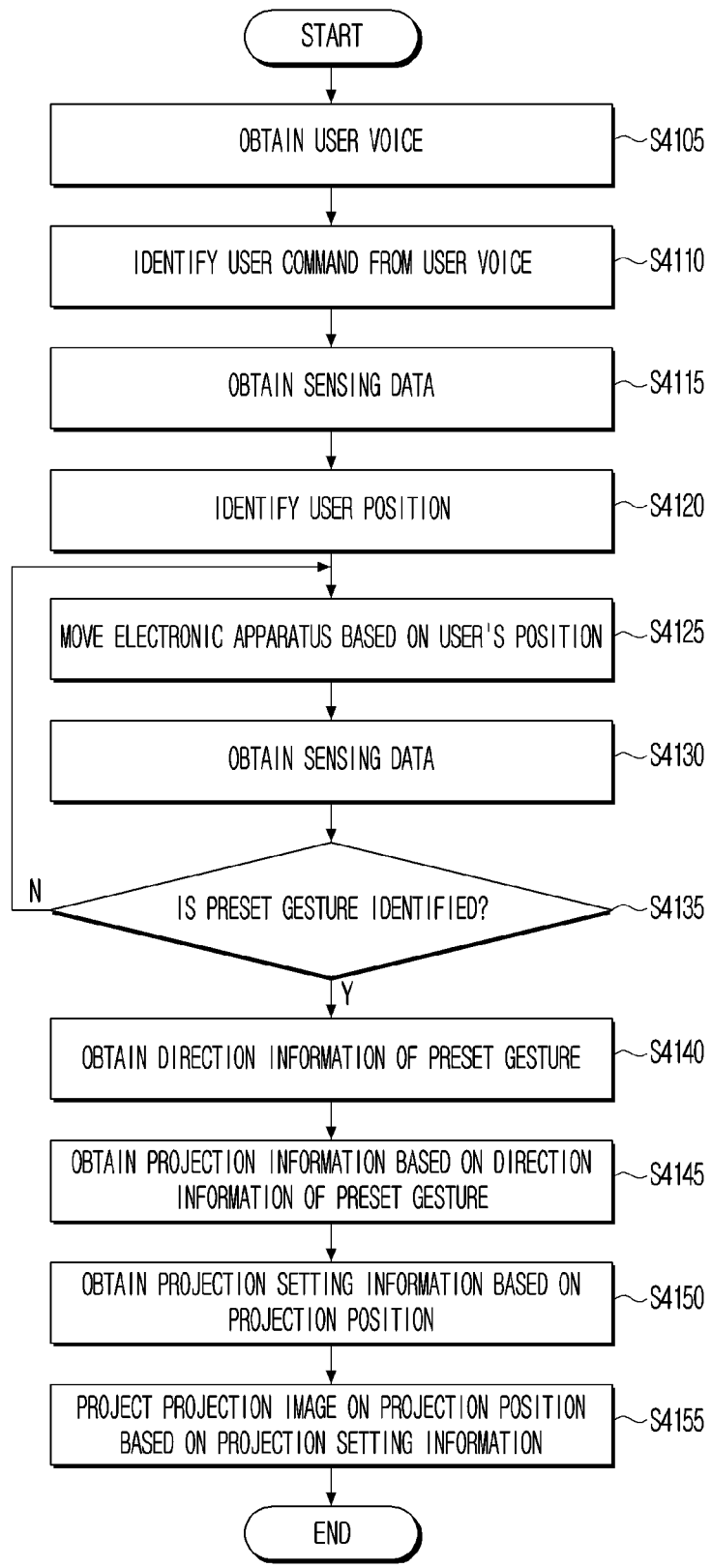
FIG. 41 is a diagram for describing an operation of moving an electronic apparatus based on a position of a user according to various embodiments.

FIG. 41 is a diagram for describing an operation of moving the electronic apparatus 100 on the basis of a position of the user 10 according to various embodiments.

Referring to FIG. 41, the electronic apparatus 100 may obtain a user voice through a microphone 118 in operation S4105. The electronic apparatus 100 may identify a user command in a user voice in operation S4110. The user command may correspond to various preset commands for operating the electronic apparatus 100.

If a preset user command is included in the user voice, the electronic apparatus 100 may obtain sensing data in operation S4115. The electronic apparatus 100 may obtain a position of the user 10 based on the sensing data in operation S4120.

The electronic apparatus 100 may control to move the electronic apparatus 100 based on the user position in operation S4125. For example, the electronic apparatus 100 may move within a threshold distance of the user 10. The reason for moving the electronic apparatus 100 is to clearly identify a preset gesture taken by the user 10 and to provide an optimal projection function to a desired position by the user 10.

The electronic apparatus 100 can obtain sensing data again after the position movement in operation S4130. In addition, the electronic apparatus 100 may determine whether a preset gesture is identified based on the sensing data in operation S4135.

When a preset gesture is not identified based on the sensing data in operation S4135-N, the electronic apparatus 100 may repeat steps S4125 to S4135. The electronic apparatus 100 may repeatedly change the position of the electronic apparatus 100 so that a preset gesture is better identified. For example, when the electronic apparatus 100 is in the left position of the user 10, the electronic apparatus 100 may move to the right position of the user 10.

When a preset gesture is identified based on the sensing data in operation S4135-Y, the electronic apparatus 100 may obtain direction information of a preset gesture in operation S4140. In one or more examples, the direction information may include a third vector V3 corresponding to a preset gesture.

The electronic apparatus 100 may obtain a projection position p3 based on the direction information in operation S4145. The electronic apparatus 100 may obtain projection setting information based on the projection position p3 in operation S4150. In one or more examples, the projection setting information may correspond to setting information such as a projection ratio, an image size, brightness, focus, resolution, and the like. The electronic apparatus 100 may obtain projection setting information based on the projection position p3. The electronic apparatus 100 may project the projection image 20 to the projection position p3 based on the projection setting information in operation S4155.

Figure 42:
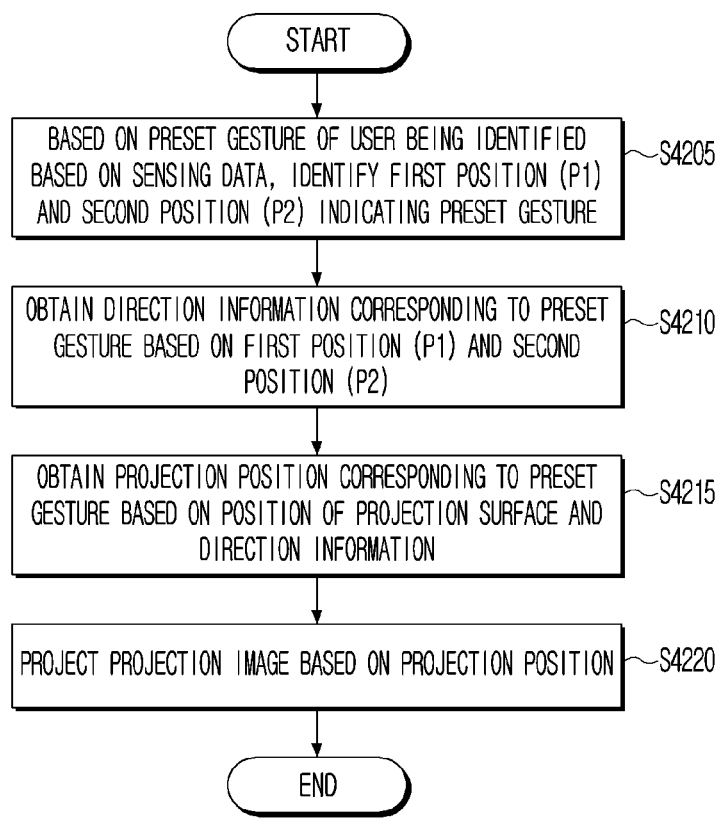
FIG. 42 is a flowchart illustrating a control method of an electronic apparatus according to various embodiments.

FIG. 42 is a flowchart illustrating a control method of the electronic apparatus 100 according to various embodiments.

Referring to FIG. 42, a method of controlling an electronic apparatus may include, based on a preset gesture of a user being identified based on the sensing data, identifying a first position and a second position indicating the preset gesture in operation S4205; obtaining direction information corresponding to the preset gesture based on the first position and the second position in operation S4210; obtaining a projection position corresponding to the preset gesture based on a position of a projection surface and the direction information in operation S4215; and projecting a projection image based on the projection position in operation S4220.

The first position may denote a start position of a direction indicated by the preset gesture, and the second position may denote an end position of a direction indicated by the preset gesture.

The identifying the first position and the second position may include identifying the preset gesture based on image data included in the sensing data, and identifying the position of the projection surface, the first position, and the second position based on distance data included in the sensing data.

The obtaining the projection position may include obtaining a first vector representing a direction from a position of the electronic apparatus to the first position, obtaining a first distance between the electronic apparatus and the projection surface based on a position of the electronic apparatus and a position of the projection surface, and obtaining the projection position based on the first vector, the first distance, the first position, and the direction information.

The direction information may include a sub-vector, and the obtaining the direction information may include obtaining a second distance between the first position and the projection surface based on the first distance and the first position, obtaining the sub-vector corresponding to the preset gesture based on the first position and the second position, and the obtaining the projection position may include obtaining the projection position based on the first vector, the sub-vector, the first position, the second position, and the second distance.

The obtaining the projection position may include obtaining an expansion ratio based on the first position, the second position, and the second distance, obtaining a second vector indicating a direction from the first position to the projection position based on the sub-vector and the expansion ratio, and obtaining the projection position based on the first vector and the second vector.

The projection position may be a first projection position, and the method may include, based on the projection position being not included in a plane corresponding to the projection surface, re-obtaining the first distance based on the position of the electronic apparatus, the position of the projection surface, and the first projection position, and obtaining a second projection position based on the first vector, the re-obtained first distance, the first position, and the direction information.

Based on receiving a user voice including a preset user command through the microphone, the method may further include identifying a position of the user who uttered the user voice based on the sensing data, and controlling to move the electronic apparatus based on the position of the user.

Based on the first position and the second position being not changed for a threshold time, the projecting the projection image may include projecting the projection image based on the projection position.

The projecting the projection image may include, based on receiving a user command for a multi-view function for projecting a merged image including first content and second content, identify an edge of the projection surface, based on the projection position being within a threshold distance from the edge, changing the projection position to a position corresponding to the edge, and projecting the merged image based on the changed projection position.

The method for controlling an electronic apparatus as shown in FIG. 42 may be executed on an electronic apparatus having the configuration of FIG. 3 or 4, and may also be executed on an electronic apparatus having other configurations.

The methods according to various embodiments may be implemented as a format of software or application installable to a related art electronic apparatus.

The methods according to various embodiments may be implemented by software upgrade of a related art electronic apparatus, or hardware upgrade only.

Also, various embodiments of the disclosure described above may be performed through an embedded server provided in an electronic apparatus, or through an external server of at least one of an electronic apparatus and a display device.

Meanwhile, various embodiments of the disclosure may be implemented in software, including instructions stored on machine-readable storage media readable by a machine (e.g., a computer). An apparatus may call instructions from the storage medium, and execute the called instruction, including an image processing apparatus (for example, image processing apparatus A) according to the disclosed embodiments. When the instructions are executed by a processor, the processor may perform a function corresponding to the instructions directly or using other components under the control of the processor. The instructions may include a code generated by a compiler or a code executable by an interpreter. A machine-readable storage medium may be provided in the form of a non-transitory storage medium. Herein, the "non-transitory" storage medium may not include a signal but is tangible, and does not distinguish the case in which a data is semi-permanently stored in a storage medium from the case in which a data is temporarily stored in a storage medium.

According to one or more embodiments, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™) or distributed online directly. In the case of online distribution, at least a portion of the computer program product may be at least temporarily stored or temporarily generated in a server of the manufacturer, a server of the application store, or a machine-readable storage medium such as memory of a relay server.

According to various embodiments, the respective elements (e.g., module or program) of the elements mentioned above may include a single entity or a plurality of entities. According to the embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While various embodiments have been illustrated and described with reference to various embodiments, the disclosure is not limited to specific embodiments or the drawings, and it will be understood by those of ordinary skill in the art that various changes in form and details may be made therein without departing from the spirit and scope of the disclosure, including the appended claims and their equivalents.

The invention claimed is:

1. An electronic apparatus comprising:
sensor circuitry to obtain sensing data;
projection circuitry; and
at least one processor configured to:
based on a preset gesture of a user being identified based on the sensing data comprising an image of the preset gesture, identify a first position corresponding to a first part of the user included in the image and a second position corresponding to a second part of the user included in the image, the first position and the second position indicating the preset gesture in the image,
obtain direction information corresponding to the preset gesture based on the first position and the second position,
obtain a projection position corresponding to the preset gesture based on a position of a projection surface and the direction information, and
control the projection circuitry to project a projection image based on the projection position.

2. The electronic apparatus of claim 1, wherein the first position denotes a start position of a direction indicated by the preset gesture in the image, and wherein the second position denotes an end position of a direction indicated by the preset gesture in the image.

3. The electronic apparatus of claim 1, wherein the at least one processor is further configured to:
identify the position of the projection surface, the first position, and the second position based on distance data included in the sensing data.

4. The electronic apparatus of claim 3, wherein the at least one processor is further configured to:
obtain a first vector representing a direction from a position of the electronic apparatus to the first position,
obtain a first distance between the electronic apparatus and the projection surface based on a position of the electronic apparatus and a position of the projection surface, and
obtain the projection position based on the first vector, the first distance, the first position, and the direction information.

5. The electronic apparatus of claim 4, wherein the direction information comprises a sub-vector,
wherein the at least one processor is further configured to:
obtain a second distance between the first position and the projection surface based on the first distance and the first position,
obtain the sub-vector corresponding to the preset gesture based on the first position and the second position, and
obtain the projection position based on the first vector, the sub-vector, the first position, the second position, and the second distance.

6. The electronic apparatus of claim 5, wherein the at least one processor is further configured to:
obtain an expansion ratio based on the first position, the second position, and the second distance,
obtain a second vector indicating a direction from the first position to the projection position based on the sub-vector and the expansion ratio, and
obtain the projection position based on the first vector and the second vector.

7. The electronic apparatus of claim 4, wherein the projection position is a first projection position,
wherein the at least one processor is further configured to:
based on the projection position being not included in a plane corresponding to the projection surface, update the first distance based on the position of the electronic apparatus, the position of the projection surface, and the first projection position, and
obtain a second projection position based on the first vector, the re-obtained first distance, the first position, and the direction information.

8. The electronic apparatus of claim 1, further comprising:
a microphone; and
driving circuitry,
wherein the at least one processor is further configured to:
based on receiving a user voice including a preset user command through the microphone, identify a position of the user who uttered the user voice based on the sensing data, and control the driving circuitry to move the electronic apparatus based on the position of the user.

9. The electronic apparatus of claim 1, wherein the at least one processor is further configured to:
based on the first position and the second position not changing for a threshold time, control the projection circuitry to project the projection image based on the projection position.

10. The electronic apparatus of claim 1, wherein the at least one processor is further configured to:
based on receiving a user command for a multi-view function for projecting a merged image including first content and second content, identify an edge of the projection surface,
based on the projection position being within a threshold distance from the edge, change the projection position to a position corresponding to the edge, and
control the projection circuitry to project the merged image based on the changed projection position.

11. A method of controlling an electronic apparatus, the method comprising:
based on a preset gesture of a user being identified based on the sensing data comprising an image of the preset gesture, identifying a first position corresponding to a first part of the user included in the image and a second position corresponding to a second part of the user included in the image, the first position and the second position indicating the preset gesture in the image;
obtaining direction information corresponding to the preset gesture based on the first position and the second position;
obtaining a projection position corresponding to the preset gesture based on a position of a projection surface and the direction information; and
projecting a projection image based on the projection position.

12. The method of claim 11, wherein the first position denotes a start position of a direction indicated by the preset gesture in the image, and
wherein the second position denotes an end position of a direction indicated by the preset gesture in the image.

13. The method of claim 11, wherein the identifying the first position and the second position comprises:
identifying the position of the projection surface, the first position, and the second position based on distance data included in the sensing data.

14. The method of claim 13, wherein the obtaining the projection position comprises:
obtaining a first vector representing a direction from a position of the electronic apparatus to the first position,
obtaining a first distance between the electronic apparatus and the projection surface based on a position of the electronic apparatus and a position of the projection surface, and
obtaining the projection position based on the first vector, the first distance, the first position, and the direction information.

15. The method of claim 14, wherein the direction information comprises a sub-vector,
wherein the obtaining the direction information comprises:
obtaining a second distance between the first position and the projection surface based on the first distance and the first position, obtaining the sub-vector corresponding to the preset gesture based on the first position and the second position,
wherein the obtaining the projection position comprises obtaining the projection position based on the first vector, the sub-vector, the first position, the second position, and the second distance.

16. An electronic apparatus comprising:
projection circuitry;
at least one memory storing instructions; and
at least one processor configured to execute the instructions to:
identify a preset gesture of a user based on an image including the preset gesture;
identify, based on the identification of the preset gesture, a first position corresponding to a first part of the user included in the image and a second position corresponding to a second part of the user included in the image, the first position and the second position indicating the preset gesture in the image;
obtain direction information corresponding to the preset gesture based on the first position and the second position,
obtain a projection position corresponding to the preset gesture based on a position of a projection surface and the direction information, and
control the projection circuitry to project a projection image based on the projection position.

17. The electronic apparatus of claim 16, wherein the first position denotes a start position of a direction indicated by the preset gesture in the image, and
wherein the second position denotes an end position of a direction indicated by the preset gesture in the image.

18. The electronic apparatus of claim 16, wherein the at least one processor is further configured to execute the instructions to:
identify the position of the projection surface, the first position, and the second position based on distance data.

19. The electronic apparatus of claim 18, wherein the at least one processor is further configured to execute the instructions to:
obtain a first vector representing a direction from a position of the electronic apparatus to the first position,
obtain a first distance between the electronic apparatus and the projection surface based on a position of the electronic apparatus and a position of the projection surface, and
obtain the projection position based on the first vector, the first distance, the first position, and the direction information.

20. The electronic apparatus of claim 19, wherein the direction information comprises a sub-vector,
wherein the at least one processor is further configured to execute the instructions to:
obtain a second distance between the first position and the projection surface based on the first distance and the first position,
obtain the sub-vector corresponding to the preset gesture based on the first position and the second position, and
obtain the projection position based on the first vector, the sub-vector, the first position, the second position, and the second distance.

* * * * *